(12) United States Patent
Supramaniam et al.

(10) Patent No.: US 11,102,334 B2
(45) Date of Patent: Aug. 24, 2021

(54) SUBSCRIPTION-NOTIFICATION MECHANISMS FOR SYNCHRONIZATION OF DISTRIBUTED STATES

(71) Applicant: Google LLC, Mountain View, CA (US)

(72) Inventors: Senthilvasan Supramaniam, Sunnyvale, CA (US); Osborne B. Hardison, Palo Alto, CA (US); Jay D. Logue, San Jose, CA (US); Jared A. Luxemberg, San Francisco, CA (US)

(73) Assignee: Google LLC, Mountain View, CA (US)

( * ) Notice: Subject to any disclaimer, the term of this patent is extended or adjusted under 35 U.S.C. 154(b) by 211 days.

(21) Appl. No.: 16/510,415

(22) Filed: Jul. 12, 2019

(65) Prior Publication Data

US 2019/0335018 A1    Oct. 31, 2019

Related U.S. Application Data

(60) Continuation of application No. 14/150,675, filed on Jan. 8, 2014, now Pat. No. 10,356,218, which is a
(Continued)

(51) Int. Cl.
*H04L 29/06* (2006.01)
*H04L 29/08* (2006.01)

(52) U.S. Cl.
CPC .............. *H04L 67/42* (2013.01); *H04L 63/08* (2013.01); *H04L 67/1095* (2013.01)

(58) Field of Classification Search
CPC .......................... H04L 67/1095; G06F 16/26
See application file for complete search history.

(56) References Cited

U.S. PATENT DOCUMENTS 5,224,648 A     7/1993  Simon et al.
5,774,717 A *   6/1998  Porcaro ............... G06F 11/1435
(Continued)

FOREIGN PATENT DOCUMENTS

CN        1794207 A      6/2006
CN      101051925 A     10/2007
(Continued)

OTHER PUBLICATIONS

Chatzigiannakis, et al., Priority Based Adaptive Coordination of Wireless Sensors and Actors, Q2SWinet '06, Oct. 2006, pp. 37-44.
(Continued)

*Primary Examiner* — Douglas B Blair
(74) *Attorney, Agent, or Firm* — Kilpatrick Townsend & Stockton LLP

(57) ABSTRACT

Apparatus, systems, methods, and related computer program products for synchronizing distributed states amongst a plurality of entities and authenticating devices to access information and/or services provided by a remote server. Synchronization techniques include client devices and remote servers storing buckets of information. The client device sends a subscription request to the remote serve identifying a bucket of information and, when that bucket changes, the remote server sends the change to the client device. Authentication techniques include client devices including unique default credentials that, when presented to a remote server, provide limited access to the server. The client device may obtain assigned credentials that, when presented to the remote server, provide less limited access to the server.

20 Claims, 46 Drawing Sheets

Related U.S. Application Data division of application No. 13/624,892, filed on Sep. 22, 2012, now Pat. No. 8,635,373.

(56) References Cited

U.S. PATENT DOCUMENTS

| | | | |
|---|---|---|---|
| 6,072,784 A | 6/2000 | Agrawal et al. | |
| 6,098,893 A | 8/2000 | Berglund et al. | |
| 6,289,334 B1 | 9/2001 | Reiner et al. | |
| 6,317,754 B1* | 11/2001 | Peng | H04L 29/06 |
| | | | 707/610 |
| 6,363,422 B1 | 3/2002 | Hunter et al. | |
| 6,453,687 B2 | 9/2002 | Sharood et al. | |
| 6,513,723 B1 | 2/2003 | Mueller et al. | |
| 6,619,055 B1 | 9/2003 | Addy | |
| 6,891,838 B1 | 5/2005 | Petite et al. | |
| 7,135,965 B2 | 11/2006 | Chapman, Jr. et al. | |
| 7,289,887 B2 | 10/2007 | Rodgers | |
| 7,529,780 B1* | 5/2009 | Braginsky | H04L 67/42 |
| 7,537,171 B2 | 5/2009 | Mueller et al. | |
| 7,567,967 B2 | 7/2009 | Chopra et al. | |
| 7,680,876 B1* | 3/2010 | Cioli | H04L 61/1511 |
| | | | 709/201 |
| 7,702,424 B2 | 4/2010 | Cannon et al. | |
| 7,837,958 B2 | 11/2010 | Crapser et al. | |
| 8,037,022 B2 | 10/2011 | Rahman et al. | |
| 8,090,681 B2 | 1/2012 | Lukiyanov et al. | |
| 8,131,207 B2 | 3/2012 | Hwang et al. | |
| 8,255,571 B2 | 8/2012 | Sharp et al. | |
| 8,316,438 B1* | 11/2012 | Bush | H04L 12/66 |
| | | | 726/22 |
| 8,503,984 B2 | 8/2013 | Winbush, III et al. | |
| 8,533,363 B2 | 9/2013 | Sharp et al. | |
| 8,539,567 B1 | 9/2013 | Logue et al. | |
| 8,635,373 B1 | 1/2014 | Supramaniam et al. | |
| 8,843,239 B2 | 9/2014 | Mighdoll et al. | |
| 9,046,898 B2 | 6/2015 | Mucignat et al. | |
| 9,098,279 B2 | 8/2015 | Mucignat et al. | |
| 9,143,560 B2 | 9/2015 | Koganti et al. | |
| 9,633,068 B2 | 4/2017 | Didcock et al. | |
| 10,102,242 B2 | 10/2018 | Ireland et al. | |
| 10,356,218 B2 | 7/2019 | Supramaniam et al. | |
| 2003/0005099 A1 | 1/2003 | Sven | |
| 2004/0095237 A1 | 5/2004 | Chen et al. | |
| 2004/0205748 A1 | 10/2004 | Iyer | |
| 2004/0210909 A1 | 10/2004 | Dominguez, Jr. et al. | |
| 2005/0022210 A1 | 1/2005 | Zintel et al. | |
| 2005/0055432 A1 | 3/2005 | Rodgers | |
| 2005/0090915 A1 | 4/2005 | Geiwitz | |
| 2005/0125083 A1 | 6/2005 | Kiko | |
| 2005/0246408 A1 | 11/2005 | Chung | |
| 2005/0270151 A1 | 12/2005 | Winick | |
| 2006/0069702 A1 | 3/2006 | Moeller et al. | |
| 2006/0147003 A1 | 7/2006 | Archacki et al. | |
| 2006/0208099 A1 | 9/2006 | Chapman et al. | |
| 2006/0215569 A1 | 9/2006 | Khosravy et al. | |
| 2007/0023507 A1* | 2/2007 | Starbuck | G06F 16/20 |
| | | | 235/382 |
| 2007/0038787 A1 | 2/2007 | Harris et al. | |
| 2007/0043478 A1 | 2/2007 | Ehlers et al. | |
| 2007/0255763 A1* | 11/2007 | Beyerle | G06F 16/275 |
| 2007/0288510 A1 | 12/2007 | Dominguez et al. | |
| 2008/0091688 A1 | 4/2008 | Yun et al. | |
| 2008/0208919 A1 | 8/2008 | i Dalfo et al. | |
| 2008/0244008 A1* | 10/2008 | Wilkinson | H04L 67/28 |
| | | | 709/205 |
| 2008/0307246 A1 | 12/2008 | Rahman et al. | |
| 2009/0057427 A1 | 3/2009 | Geadelmann et al. | |
| 2009/0077263 A1* | 3/2009 | Koganti | G06F 16/27 |
| | | | 709/248 |
| 2009/0143918 A1 | 6/2009 | Amundson et al. | |
| 2009/0215411 A1 | 8/2009 | Tucker et al. | |
| 2009/0261174 A1 | 10/2009 | Butler et al. | |
| 2009/0264734 A1 | 10/2009 | Degani et al. | |
| 2009/0265734 A1 | 10/2009 | Dion et al. | |
| 2009/0327292 A1 | 12/2009 | Janssen et al. | |
| 2009/0327354 A1 | 12/2009 | Resnick et al. | |
| 2009/0327358 A1 | 12/2009 | Lukiyanov et al. | |
| 2010/0057785 A1* | 3/2010 | Khosravy | G06F 16/2365 |
| | | | 707/E17.005 |
| 2010/0058450 A1 | 3/2010 | Fein et al. | |
| 2010/0156608 A1 | 6/2010 | Bae et al. | |
| 2010/0211224 A1 | 8/2010 | Keeling et al. | |
| 2010/0318227 A1 | 12/2010 | Steinberg et al. | |
| 2010/0332682 A1* | 12/2010 | Sharp | H04L 67/2842 |
| | | | 709/248 |
| 2011/0078675 A1 | 3/2011 | Van Camp et al. | |
| 2011/0151837 A1 | 6/2011 | Winbush, III | |
| 2011/0197032 A1 | 8/2011 | Patey et al. | |
| 2011/0208695 A1* | 8/2011 | Anand | G06F 16/273 |
| | | | 707/610 |
| 2011/0225417 A1 | 9/2011 | Maharajh et al. | |
| 2012/0179654 A1 | 7/2012 | Lukiyanov et al. | |
| 2012/0239620 A1 | 9/2012 | Masini et al. | |
| 2012/0297012 A1 | 11/2012 | Sharp et al. | |
| 2013/0024420 A1* | 1/2013 | Rao | G06F 16/1787 |
| | | | 707/610 |
| 2013/0064336 A1 | 3/2013 | Schadt et al. | |
| 2013/0124638 A1* | 5/2013 | Barreto | G06F 15/16 |
| | | | 709/205 |
| 2013/0226886 A1 | 8/2013 | Kamimura | |
| 2017/0193071 A1 | 7/2017 | Didcock et al. | |
| 2017/0357682 A1 | 12/2017 | Matsuda | |

FOREIGN PATENT DOCUMENTS

| | | |
|---|---|---|
| CN | 101316256 A | 12/2008 |
| CN | 101617509 A | 12/2009 |
| CN | 101681320 A | 3/2010 |
| CN | 101742475 A | 6/2010 |
| CN | 101789963 A | 7/2010 |
| CN | 101819577 A | 9/2010 |
| CN | 104813685 A | 7/2015 |
| EP | 2898709 | 7/2015 |
| JP | 09-298780 | 11/1997 |
| JP | 2004-318619 A | 11/2004 |
| JP | 2005-292868 A | 10/2005 |
| JP | 2007-095051 A | 4/2007 |
| JP | 2007-188394 A | 7/2007 |
| JP | 2008-500622 A | 1/2008 |
| WO | 2013-058820 A1 | 4/2013 |
| WO | 2014-047385 | 3/2014 |

OTHER PUBLICATIONS

Non-Final Office Action dated Jun. 7, 2013 in U.S. Appl. No. 13/624,892, all pages.

Notice of Allowance dated Nov. 25, 2013 in U.S. Appl. No. 13/624,892.

International Search Report and Written Opinion dated Apr. 4, 2014, in International Patent Application No. PCT/US2013/060819, all pages.

International Preliminary Report on Patentability dated Mar. 24, 2015, in International Patent Application No. PCT/US2013/060819, all pages.

Supplementary European Search Report dated May 9, 2016 in European Patent Application No. 13838995.2, all pages.

First Examination Report dated Nov. 29, 2018 in Australian Patent Application No. 2017276261, all pages.

Notice of Acceptance dated Apr. 8, 2019 in Australian Patent Application No. 2017276261, all pages.

Notice of Decision to Grant dated Dec. 29, 2018 in Chinese Patent Application No. 201380061082.4, all pages.

Extended European Search Report dated Mar. 22, 2019 in European Patent Application No. 19151706.9, all pages.

Notice of Publication dated May 15, 2019 in European Patent Application No. 19151706.9, all pages.

First Examination Report dated Sep. 30, 2016 in Australian Patent Application No. 2013317936, all pages.

Notice of Allowance dated Aug. 30, 2017 in Australian Patent Application No. 2013317936, all pages.

(56) References Cited

OTHER PUBLICATIONS

Office Action dated Jul. 24, 2019 in Canadian Patent Application No. 2,885,426, all pages.
Office Action dated Nov. 29, 2017 in Chinese Patent Application No. 201380061082.4, all pages.
Office Action dated Jul. 26, 2018 in Chinese Patent Application No. 201380061082.4, all pages.
Office Action dated Oct. 30, 2017 in Japanese Patent Application No. 2015-533203, all pages.
Office Action dated Aug. 29, 2018 in Japanese Patent Application No. 2015-533203, all pages.
Notice of Decision to Grant dated Feb. 8, 2019 in Japanese Patent Application No. 2015-533203, all pages.
Office action dated Mar. 6, 2018 in European Patent Application No. 13838995.2, all pages.
Decision to Grant dated Jan. 24, 2019 in European Patent Application No. 13838995.2, all pages.
Notice of Publication dated Jun. 24, 2019 in Chinese Patent Application No. 201910151587.9, 1 page.
European Office Action for EP 19151706.9 dated Apr. 8, 2020, all pages.
Chinese Second Office Action for CN 201910151587.9 dated Apr. 28, 2020, all pages.
First Examination Report dated Jun. 25, 2020 in Australian Patent Application No. 2019204772, 6 pages.
Office Action dated Jul. 9, 2020 in Canadian Patent Application No. 2,885,426, 3 pages.
Notice of Decision to Grant dated Aug. 5, 2020 in Chinese Patent Application No. 201910151587.9, 6 pages.
Notice of Reason for Refusal dated Aug. 18, 2020 in Japanese Patent Application No. 2019-072680, 4 pages.
Extended European Search Report dated May 28, 2021 in European Patent Application No. 21164002.4, 10 pages.

\* cited by examiner

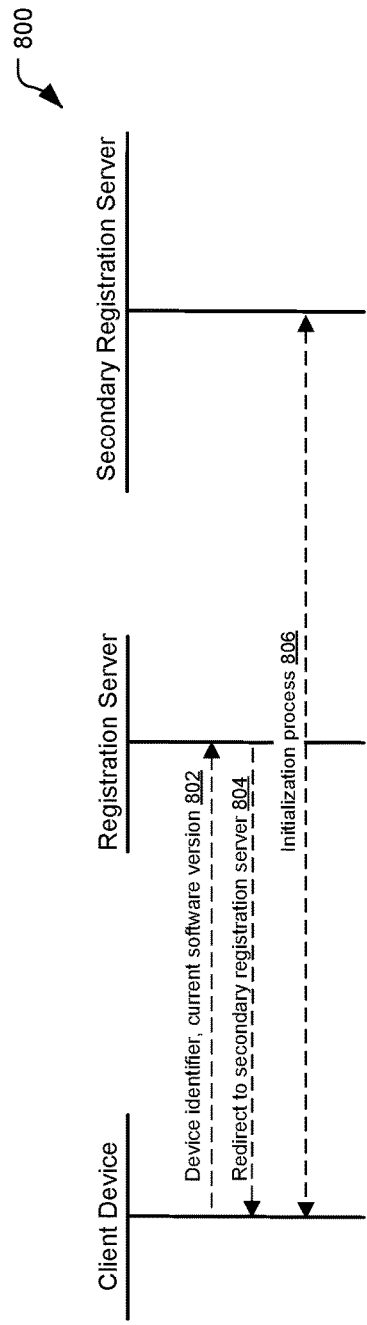
FIG. 15A
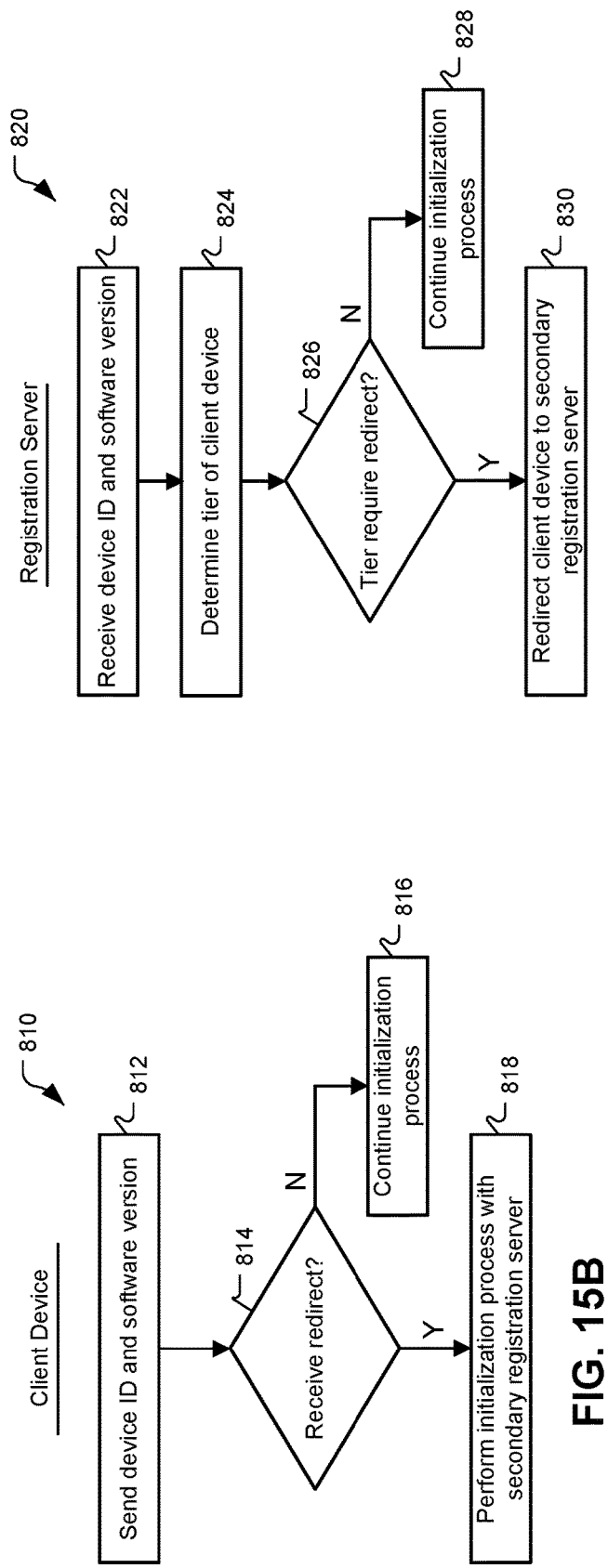
FIG. 15C
FIG. 15B

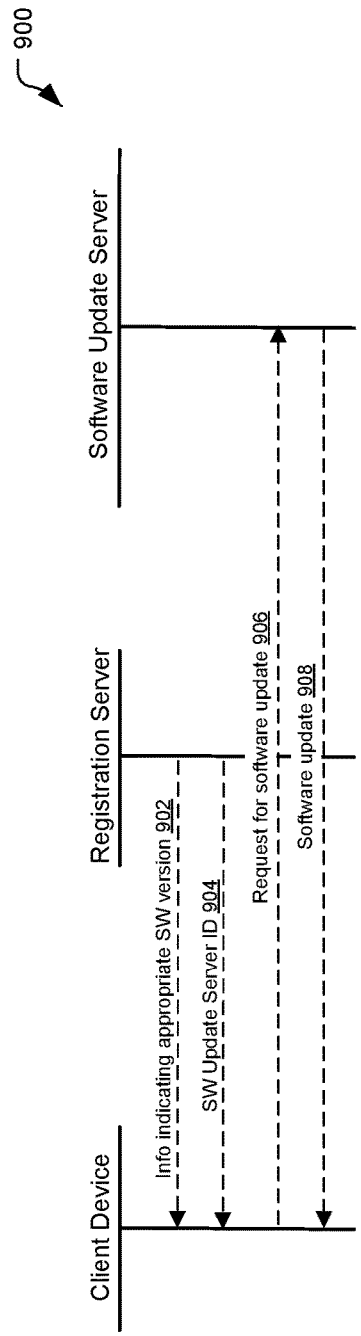
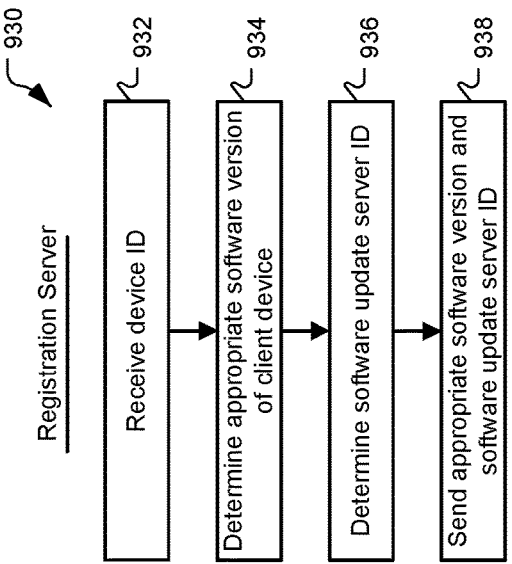
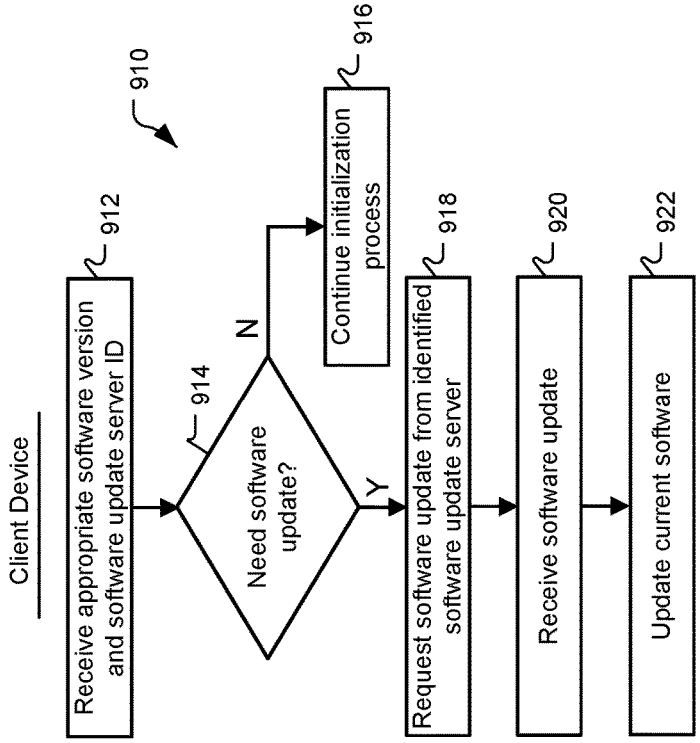

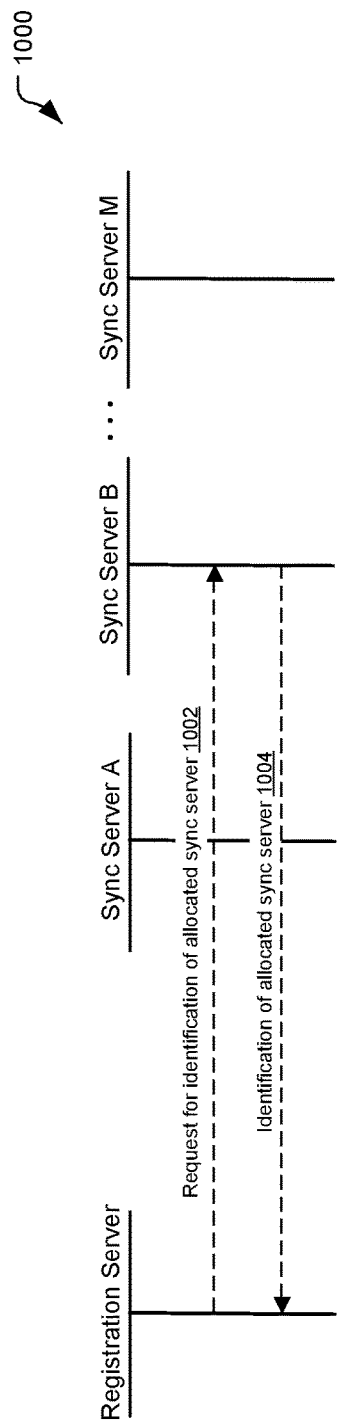
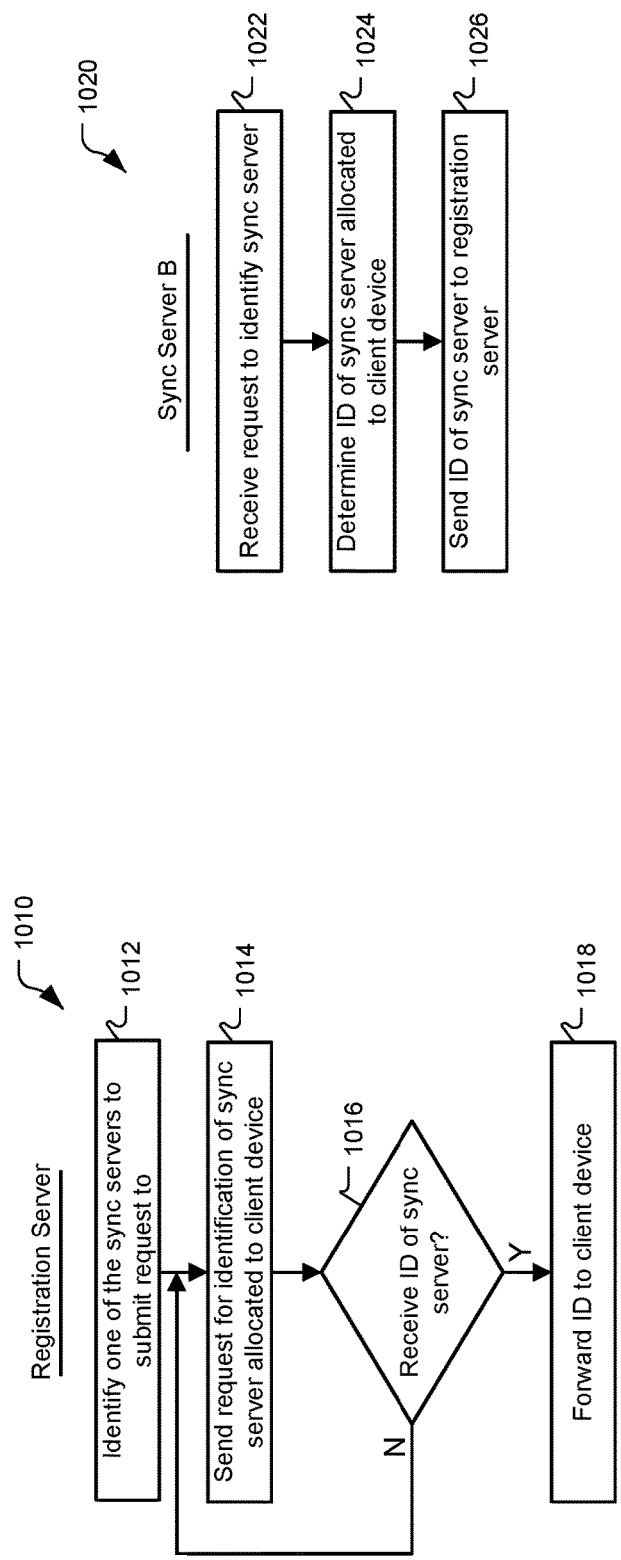

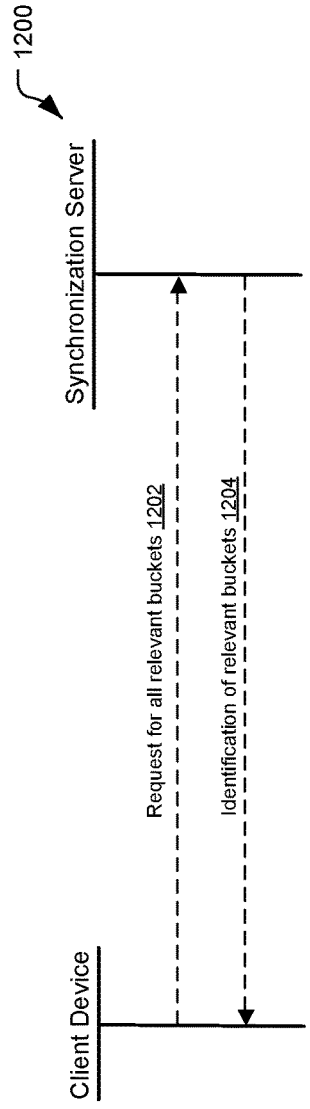
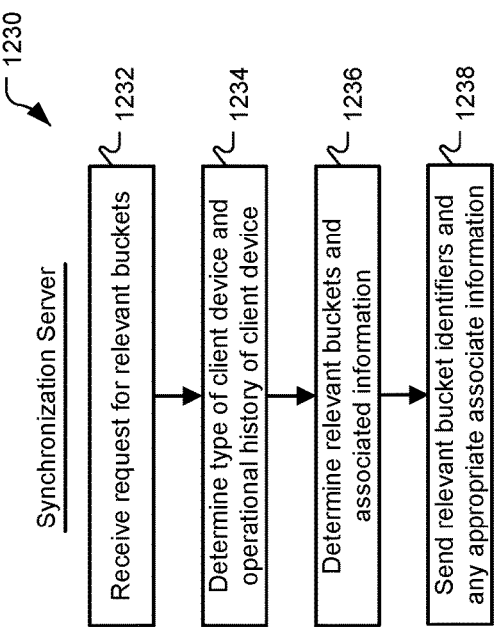
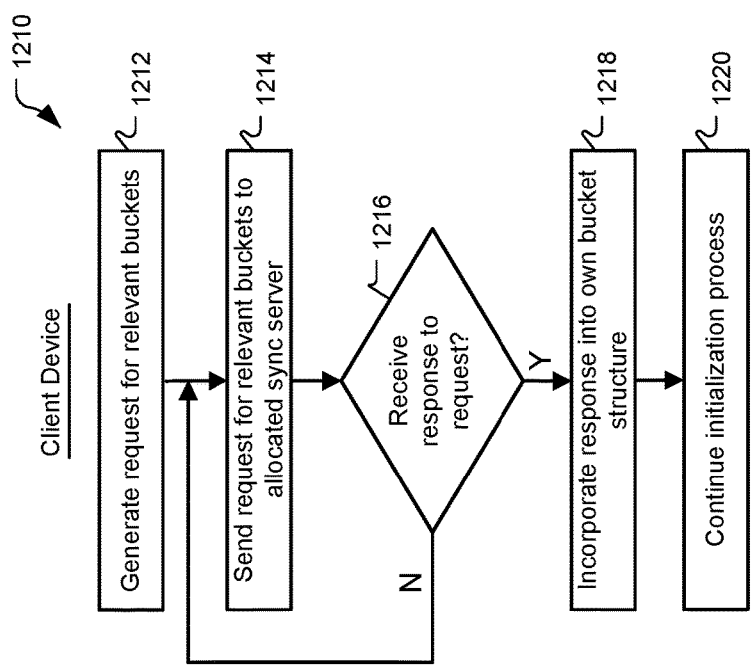

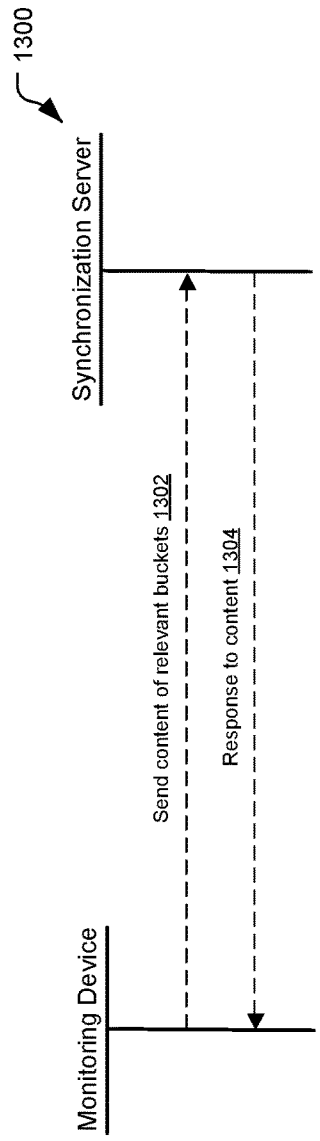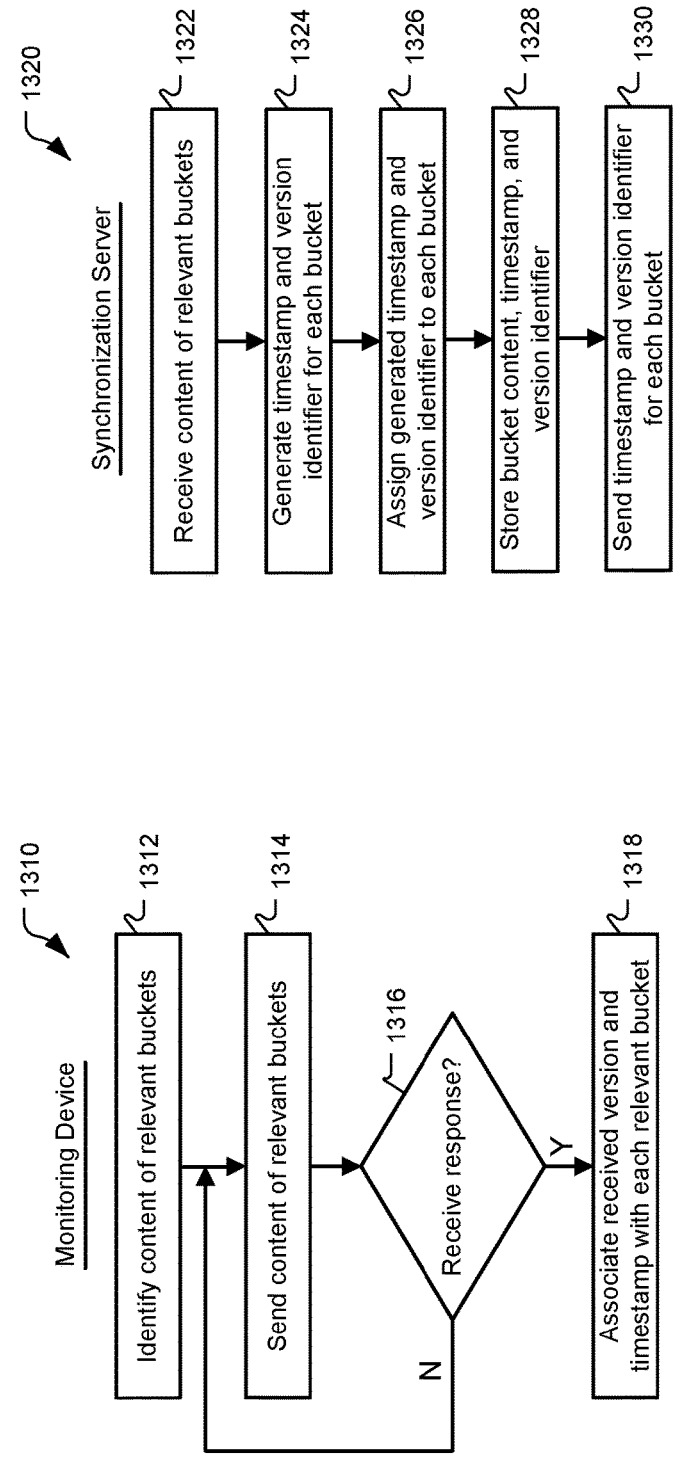
FIG. 20A
FIG. 20B
FIG. 20C

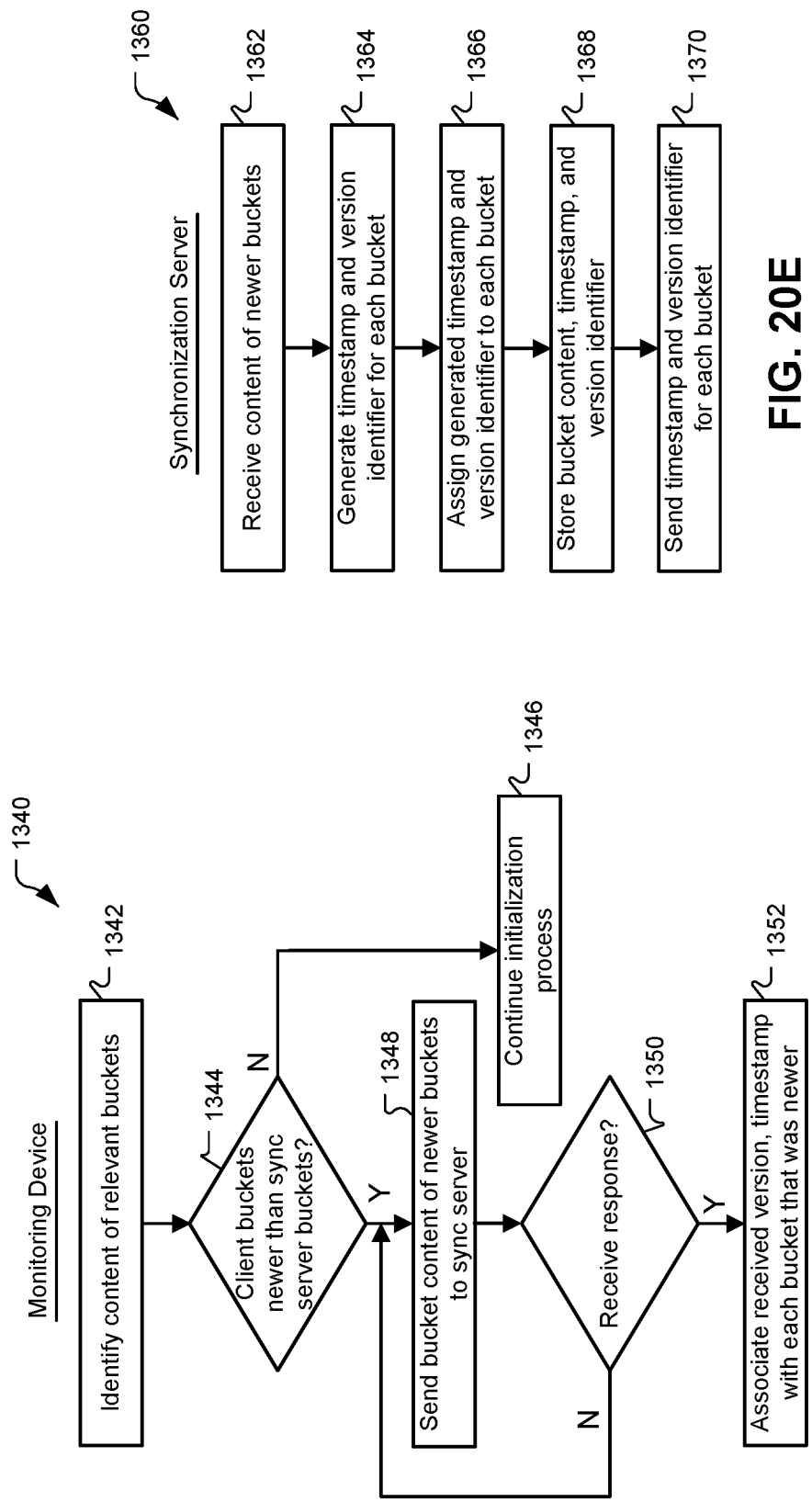

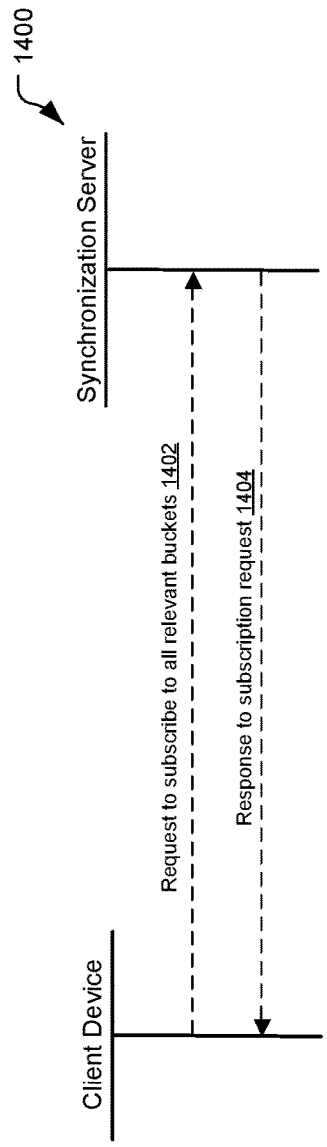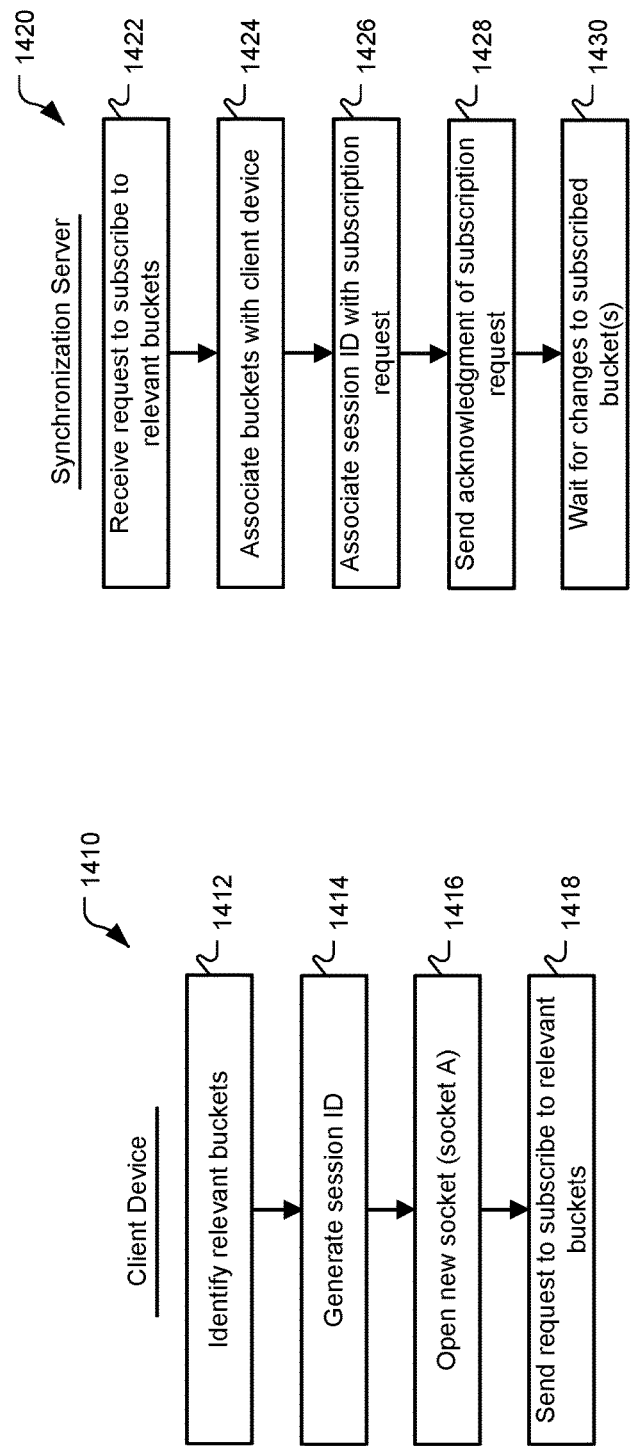

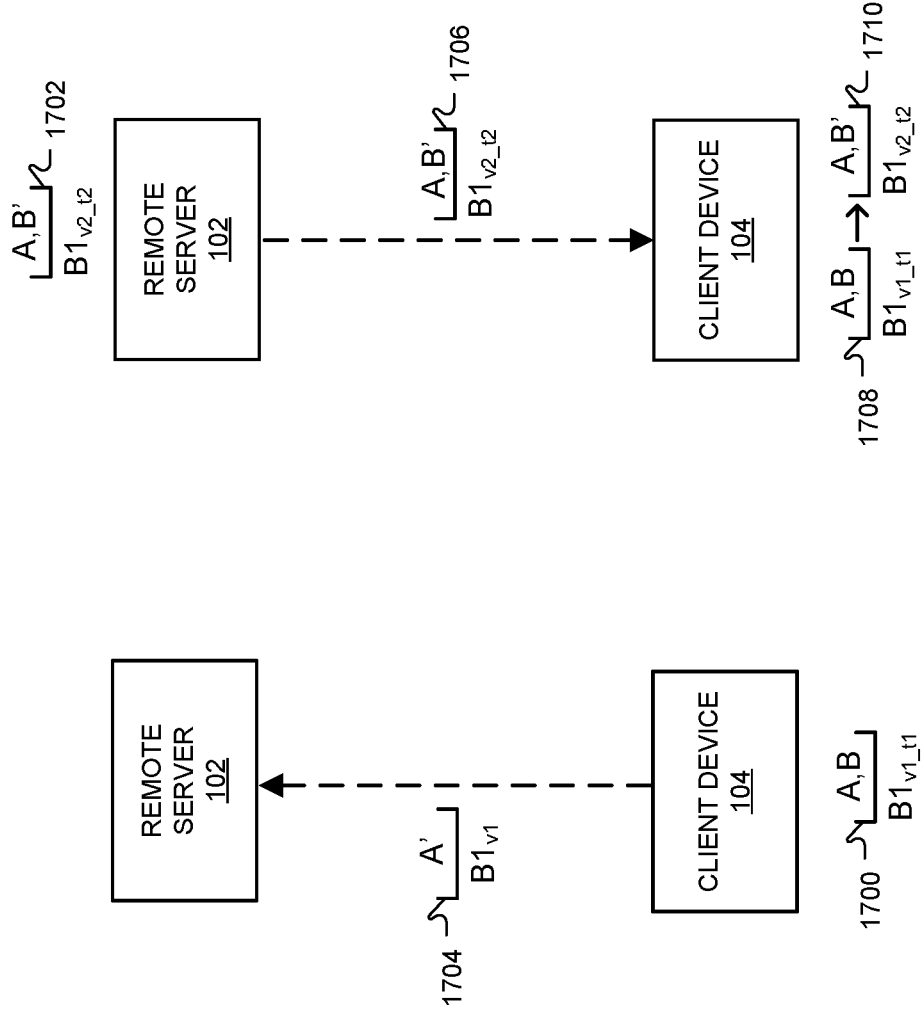

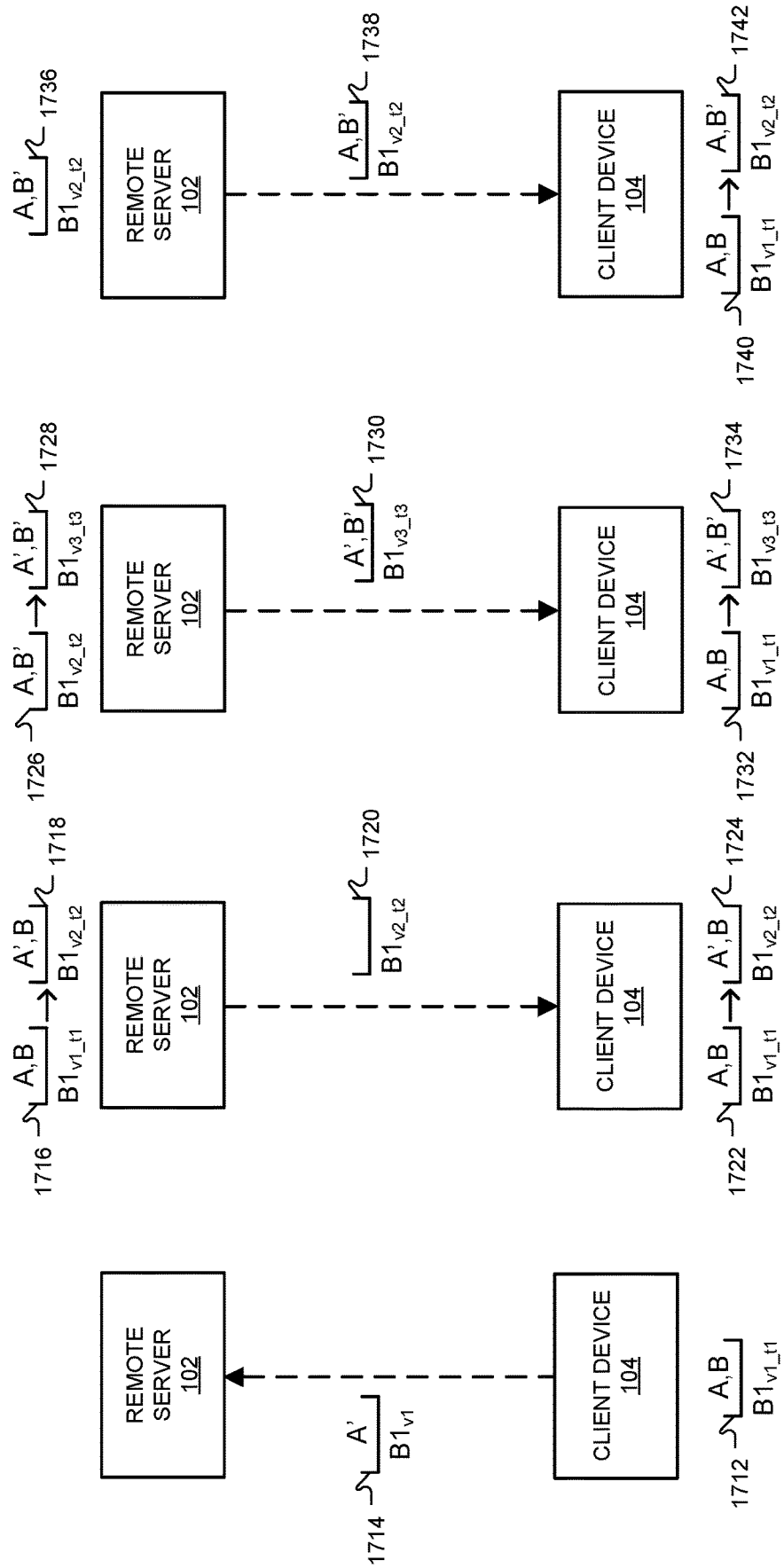

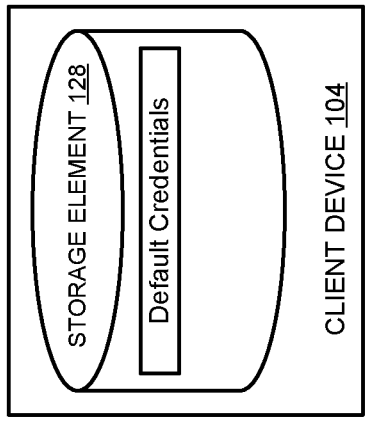
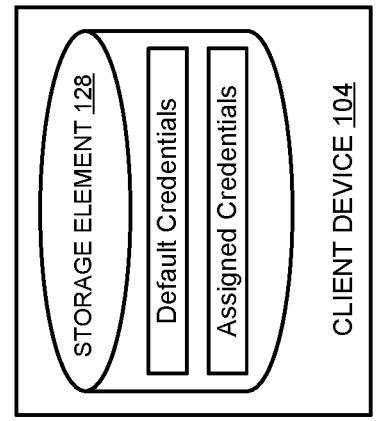
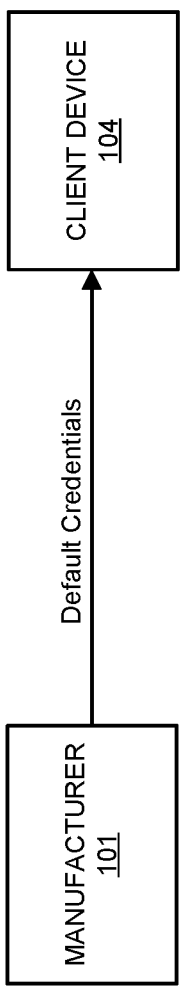
FIG. 27A
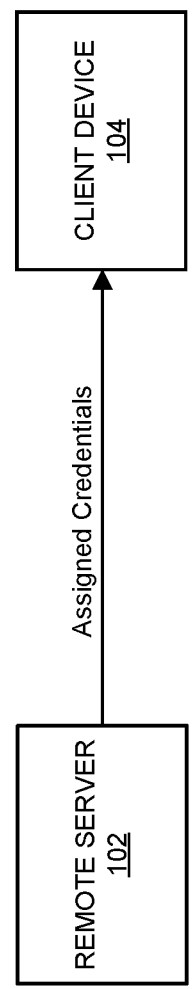
FIG. 27B

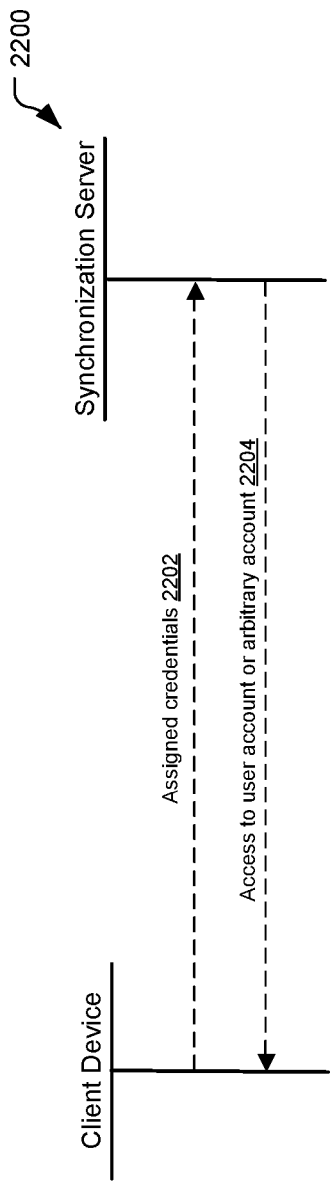
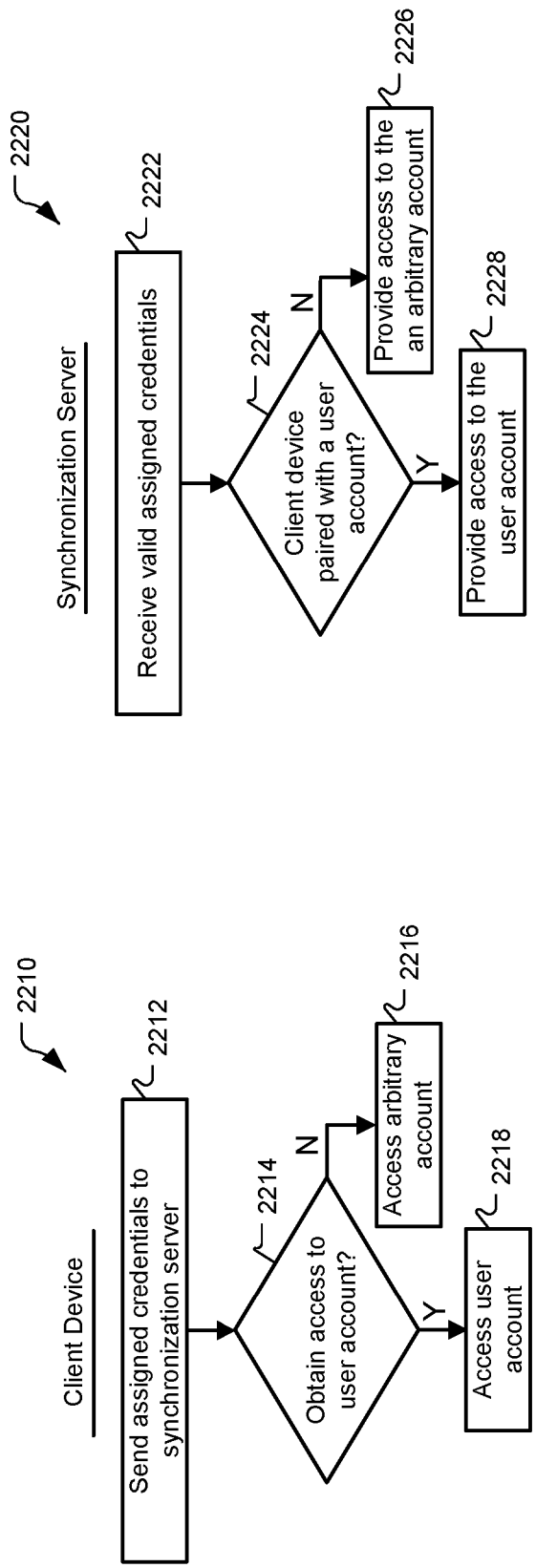
FIG. 32A
FIG. 32B
FIG. 32C

US 11,102,334 B2

SUBSCRIPTION-NOTIFICATION MECHANISMS FOR SYNCHRONIZATION OF DISTRIBUTED STATES

CROSS-REFERENCES TO RELATED APPLICATIONS

This application is a continuation of U.S. patent application Ser. No. 14/150,675, filed on Jan. 8, 2014. U.S. patent application Ser. No. 14/150,675 is a divisional of U.S. patent application Ser. No. 13/624,892, filed on Sep. 22, 2012. Each of which are incorporated herein by reference for all purposes.

FIELD

This patent specification relates to apparatus, systems, methods, and related computer program products for synchronizing distributed states amongst a plurality of entities and for authenticating devices communicate with one another and/or cloud-based servers. More particularly, this patent specification relates to synchronizing buckets of information and changes thereto amongst one or more client devices via a remote server such that the contents of the buckets of information shared across all devices and the remote server is identical, and to multi-tiered authentication methods that facilitate communications amongst smart home devices and cloud-based servers.

BACKGROUND

With the increasing use of mobile devices and cloud-based computing, and the increasing desire to provide remote access and control capabilities in such environments, techniques for synchronizing data across multiple devices are becoming increasingly important. Various techniques for synchronizing data are known. For example, in two-way file synchronization, updated files are copied between a pair of locations, such as a mobile phone and a home personal computer, with the intent of keeping select files at both locations identical to across the locations. Such synchronization techniques may use various tools for dealing with modifications to the files, including version control, mirroring, and the like.

Numerous products that perform data synchronization are currently available. For example, iCloud™ by Apple, Inc. of Cupertino, Calif. allows data such as pictures and videos to be shared between devices such as mobile phones, tablet computers, etc. SugarSync, Inc. of San Mateo, Calif. provides software applications which can be installed on mobile devices, personal computers, and the like, that allow files and folders to be synchronized across multiple computers and devices.

While modern techniques for synchronizing data have facilitated significant advances in file sharing across multiple devices, in many cases these techniques are structurally designed for implementation on devices with permanent (AC-power) or relatively long-term (mobile device battery) power availability, and/or where the synchronization is only required at particular predetermined instances in time (e.g., when a user takes a photograph to be shared across multiple devices). Such scenarios can be contrasted with substantially more challenging scenarios in which data synchronization across multiple devices is desired for facilitating real-time device-to-device control or monitoring, but in which powering limitations bring about the need to keep one or more of the devices in an off state or very-low-power state for extended periods of time.

With the increasing use of cloud-based computing where elements of the computing system are remotely dispersed from one another, authenticating the identity of those elements is also becoming increasingly important to ensure a secure operating environment. Many device authentication techniques, such as the use of pre-shared symmetric/asymmetric keys and/or the use of digital signatures, work well in client-server models where the client device is effectively a stand-alone device that needs to authenticate its identity (and/or that of its user) to the server. Such scenarios, however, can be contrasted with substantially more challenging scenarios in which client devices and their relationship to the server is dynamic, such as in situations where client devices may be paired with user accounts so as to gain access to secured resources that should otherwise be inaccessible.

BRIEF SUMMARY

Various techniques for synchronizing data are disclosed herein. While such techniques may be implemented in various electronic devices across a variety of suitable networks, some techniques may be particularly well-suited for environments where one or more of the electronic devices have relatively low power capacity. Analogously, such techniques may be similarly well-suited for environments where it is desired to minimize the power consumption required to perform data synchronization.

The disclosed techniques includes various methods of synchronizing data between a client device and a remote server. Some methods are directed to client devices. For example, a client device may store a plurality of buckets of information each including a plurality of field-value pairs, and the remote server may store a plurality of buckets of information each including a plurality of field-value pairs. A method may then include a variety of operations. For example, the method may include transmitting, at the client device, a subscription request to the remote server. The subscription request subscribes the client device to a subset of the plurality of buckets at the remote server that correspond respectively to a subset of the plurality of buckets at the client device and for which synchronization is to be established and/or maintained. Upon a generation by the client device of an update to at least one field-value pair of one of the buckets at the client device that corresponds to one of the subscribed buckets at the remote server, the method includes additional steps including communicating the update to the remote server, receiving a response from the remote server, and reconciling, based on the received response, the updated bucket of information at the client device with the corresponding subscribed bucket at the remote server. Reconciling may include a variety of operations, such as overwriting, if the response from the remote server includes a new timestamp and/or version identifier, an existing timestamp and/or version identifier of the updated bucket with the new timestamp and/or version identifier. Reconciling may also include overwriting, if the response from the remote server includes at least one replacement field-value pair, the contents of the updated at least one field-value pair with the at least one replacement field-value pair. Further, upon a receipt by the client device of a notification communication from the remote server that notifies the client device regarding an update by the remote server to one of the subscribed buckets at the remote server and provides associated updated bucket information therewith, the method includes at least partially overwriting the contents of the corresponding bucket at the client device with the received associated updated bucket information.

Some methods are directed to remote servers. For example, a client device may store a plurality of buckets of information each including a plurality of field-value pairs, and a remote server may store a plurality of buckets of information each including a plurality of field-value pairs. A method may then include a variety of operations. For example, the method may include receiving, at the remote server from the client device, a subscription request identifying a bucket of information stored on the remote server. The identified bucket of information corresponds to one of the plurality of buckets of information stored at the client device. The method may also include determining, by the remote server, whether there is a difference in state between the identified bucket of information stored at the remote server and the corresponding bucket of information stored at the client device. The method may further include notifying, if it is determined that there is a difference in state between the identified bucket of information stored at the remote server and the corresponding bucket of information stored at the client device, the client device with information representative of at least one difference between the identified bucket of information stored at the remote server and the corresponding bucket of information stored at the client device.

In addition to disclosing various methods and processes, the disclosed techniques include various apparatus and systems for synchronizing data. In one embodiment, a client device is disclosed. The client device includes a storage element for storing a plurality of buckets of information each including a plurality of field-value pairs. The client device also includes a reconciliation module coupled to the storage element. The reconciliation module may be operable to perform a variety of functions. For example, the reconciliation may generate a desired update to one of the buckets of information at the client device, communicate the desired update to a remote server storing a bucket plurality of buckets of information each including a plurality of field-value pairs, receive a response from the remote server, and reconcile the bucket of information at the client device for which an update was communicated to the remote server with a corresponding one of the plurality of buckets of information at the remote server based on the received response.

In another embodiment, a computer system is disclosed. The computer system includes a storage element for storing a plurality of buckets of information each including a plurality of field-value pairs. The computer system also includes a synchronization server coupled to the storage element. The synchronization server may be operable to perform a variety of functions. For example, the synchronization server may receive, from a client device storing a plurality of buckets of information each including a plurality of field-value pairs, a subscription request identifying a bucket of information stored on the storage element, the identified bucket of information corresponding to one of the plurality of buckets of information stored at the client device. The synchronization server may also determine whether there is a difference in state between the identified bucket of information stored at the storage element and the corresponding bucket of information stored at the client device. The synchronization server may also notify, if it is determined that there is a difference in state between the identified bucket of information stored at the storage element and the corresponding bucket of information stored at the client device, the client device with information representative of at least one difference between the identified bucket of information stored at the storage element and the corresponding bucket of information stored at the client device.

Various techniques for performing multi-tier device authentication are also disclosed. While such techniques may be implemented in various electronic devices across a variety of suitable networks, some techniques may be particularly well-suited for environments where one or more of the electronic devices have relatively low power capacity. Analogously, such techniques may be similarly well-suited for environments where it is desired to minimize the power consumption required to perform data synchronization.

The disclosed techniques includes various methods for authenticating a client device to communicate with a remote server. Some methods are directed to client devices. For example, a method may include establishing, by a client device, a connection with a first remote server using first device credentials, the first device credentials being unique to and stored at the client device and authenticating the client device to communicate with the first remote server. The method may also include acquiring, at the client device, second device credentials from the first remote server, the second device credentials authenticating the client device to communicate with a second remote server. The method may further include establishing, by the client device, a connection with the second remote server using the second device credentials.

Some methods are directed to remote servers. For example, a method may include receiving, at a remote server, first device credentials from the client device, the first device credentials including a secret generated by a third party that is unique to the client device. The method may also include determining whether the first device credentials are valid. When it is determined that the first device credentials are valid, second device credentials may be generated at the remote server, the second device credentials operable to authenticate the client device to communicate with one or more components of the remote server. Further when it is determined that the first device credentials are valid, the remote server may communicate the second device credentials to the client device.

In addition to disclosing various methods and processes, the disclosed techniques include various apparatus and systems for synchronizing data. In one embodiment, a client device is disclosed. The client device includes a storage element for storing first device credentials unique to the client device and operable to authenticate the client device to communicate with a first remote server. The client device also includes an authentication module coupled to the storage element. The authentication module may be operable to perform a variety of functions. For example, the authentication module may establish a connection with the first remote server using the first device credentials, acquire second device credentials from the first remote server, the second device credentials authenticating the client device to communicate with a second remote server, and establish a connection with the second remote server using the second device credentials.

In another embodiment, a computer system is disclosed. The computer system includes a storage element for storing device credentials for client devices. The computer system also includes a registration server coupled to the storage element. The registration server may be operable to perform a variety of functions. For example, the registration server may receive first device credentials from the client device, the first device credentials including a secret generated by a third party that is unique to the client device. The registration server may also determine whether the first device credentials are valid. When it is determined that the first device credentials are valid, the registration server may generate second device credentials, the second device credentials operable to authenticate the client device to communicate with one or more components of the remote server, and communicate the second device credentials to the client device.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

BRIEF DESCRIPTION OF THE DRAWINGS

FIG. 15A illustrates a communication sequence of a process for performing tier redirection according to an embodiment.

FIG. 15B is a flowchart of a process for a client device to perform tier redirection according to an embodiment.

FIG. 15C is a flowchart of a process for a registration server to perform tier redirection according to an embodiment.

FIG. 16A illustrates a communication sequence of a process for performing software updates according to an embodiment.

FIG. 16B is a flowchart of a process for a client device to perform software updating according to an embodiment.

FIG. 16C is a flowchart of a process for a registration server to perform software updating according to an embodiment.

FIG. 17A illustrates a communication sequence of a process for identifying an allocated synchronization server according to an embodiment.

FIG. 17B is a flowchart of a process for a registration server to identify an allocated synchronization server according to an embodiment.

FIG. 17C is a flowchart of a process for a synchronization server to identify an allocated synchronization server according to an embodiment.

FIG. 19A illustrates a communication sequence of a process for requesting relevant buckets according to an embodiment.

FIG. 19B is a flowchart of a process for a client device to request buckets that are relevant to it according to an embodiment.

FIG. 19C is a flowchart of a process for a synchronization server to respond to a request for buckets that are relevant to a client device according to an embodiment.

FIG. 20A illustrates a communication sequence of a process for sending bucket content according to an embodiment.

FIG. 20B is a flowchart of a process for a monitoring device to the send the content of relevant buckets to a synchronization server during an initial connect according to an embodiment.

FIG. 20C is a flowchart of a process for a synchronization server to send a response to monitoring device in response to receiving bucket contents during an initial connect according to an embodiment.

FIG. 20D is a flowchart of a process for a monitoring device to send the content of relevant buckets to a synchronization server during a subsequent connect according to an embodiment.

FIG. 20E is a flowchart of a process for a synchronization server to send a response to monitoring device in response to receiving bucket contents during a subsequent connect according to an embodiment.

FIG. 21A illustrates a communication sequence of a process for subscribing to relevant buckets according to an embodiment.

FIG. 21B is a flowchart of a process or a client device to subscribe to relevant buckets according to an embodiment.

FIG. 21C is a flowchart of a process for a synchronization server to receive a subscription request according to a first embodiment.

FIG. 24A and FIG. 24B illustrate an example of synchronizing the state of corresponding buckets at a client device and a remote server where the client device has a bucket that is older than a bucket at the remote server, the client device attempts to change its bucket, but that change is rejected by the remote server since the client device is unaware of the newer bucket at the remote server.

FIG. 25A through FIG. 25D illustrate an example of synchronizing the state of corresponding buckets at a client device and a remote server where the client device sends a bucket that is newer than that stored at the remote server, and the bucket stored at the remote server may be as expected or different than that expected by the client device.

FIG. 27A is a block diagram illustrating the communication of default credentials to a client device.

FIG. 27B is a black diagram illustrating the communication of assigned credentials to a client device.

FIG. 32A illustrates a communication sequence of a process for a client device to access different types of information according to an embodiment.

FIG. 32B is a flowchart of a process for a client device to access different types of information according to an embodiment.

FIG. 32C is a flowchart of a process for a synchronization server to provide a client device with access to different types of information according to an embodiment.

DETAILED DESCRIPTION

Figure 1:
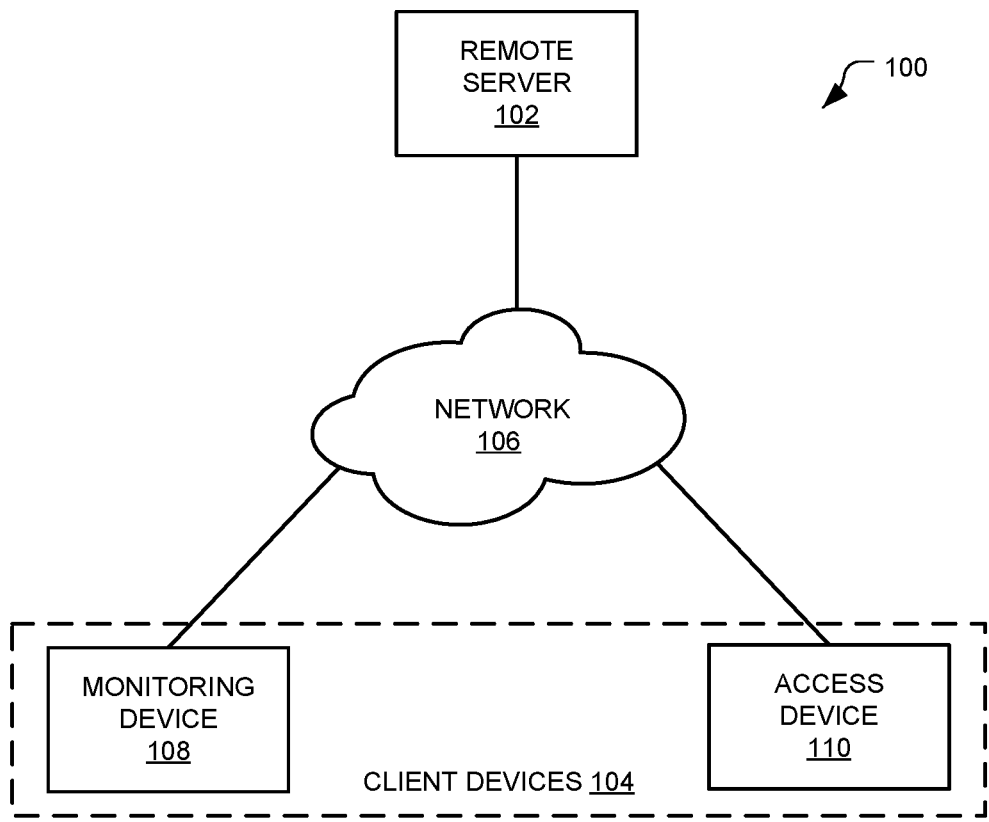
FIG. 1 depicts a system that implements subscription-notification mechanisms for synchronizing states of devices distributed across the system according to an embodiment.

Embodiments of the present invention generally relate to synchronizing distributed states amongst a plurality of entities in a system. The entities in the system typically include at least one monitoring device in communication with a remote server, where the monitoring devices in exemplary embodiments are intelligent, multi-sensing, network-connected devices such as thermostats, hazard detection units, environmental sensors, environmental controllers, security-related sensors, security-related controllers, lighting sensors/controllers, smart appliances, appliance sensors/controllers, entertainment-related devices, communications-related devices, pest detectors, intrusion detectors, door and window breach sensors, etc. within a smart home environment. It is to be appreciated that while, for purposes of brevity and clarity of description the term "monitoring device" may be used in one or more examples herein as the device in communication with a remote server, such term is to be understood to include any of a variety of control devices capable of carrying out any of a variety of smart-homerelated control functions, including those identified in the instant specification, since the function of "controlling" will necessarily include at least one "monitoring" aspect for virtually all smart-home devices. Thus, the term "monitoring device" as used herein should be understood to encompass thermostats, for example, the thermostats having a control functionality (controlling the operation of an HVAC system) for which the monitoring functionality will be a necessary component (sensing the ambient temperature, humidity, and/or other environmental condition to be controlled). The remote server is remote from the monitoring device and maintains informational states identical to that of the monitoring device(s). In many embodiments, the system also includes at least one access device in communication with the remote server, where the access device may be a laptop computer, mobile phone, tablet computer, smartphone, or the like which is used to view, control, and/or otherwise influence an operational status of the monitoring device.

To facilitate the synchronization of states across the entities of the system, subscription-based notification mechanisms may be used. In the subscription-based notification mechanisms described herein, instances of common information (herein referred to as "buckets" of information) that is synchronized across the entities is stored at each of the entities. The remote server maintains buckets for all devices connected for all users of the system, where the devices only maintain buckets that are relevant to them and/or other devices within a common structure (e.g., the devices within a single smart home environment) or otherwise subject to a common control scheme (e.g., devices associated with the same consumer or consumer account). To maintain synchronization with the state of the buckets at the remote server, the monitoring device and/or access device (often referred to more generally as client devices) submit a subscription request to the remote server, where the subscription request is a request for the remote server to notify the client device of changes that are made to the bucket at the remote server. For a structure including a monitoring device and having an associated access device, the changes may be initiated, e.g., by the access device, whereby the remote server notifies the monitoring device of the change by way of its pending subscription request. The changes may alternatively be initiated, e.g., by the monitoring device, whereby the remote server notifies the access device of the change by way of its pending subscription.

Embodiments of the present invention also generally relate to multi-tiered authentication techniques for facilitating communications amongst devices and remote servers. The entities typically include a client device (e.g., a monitoring device, an access device, etc.) in communication with a remote server, where the client devices in exemplary embodiments are intelligent, multi-sensing, network-connected devices such as thermostats, hazard detection units, environmental sensors, environmental controllers, security-related sensors, security-related controllers, lighting sensors/controllers, smart appliances, appliance sensors/controllers, entertainment-related devices, communications-related devices, pest detectors, intrusion detectors, door and window breach sensors, etc. within a smart home environment. The remote server is remote from the client device and stores information (e.g., secured resources) and/or provides services that the client device may desire to acquire or interact with. The remote server may provide or refuse access to the client device based on a level of authentication of the client device.

When referring to levels of authentication, the client device may authenticate its identity using different device credentials or other characteristics/relationships. Based on the device credentials presented and/or other characteristics/relationships, the remote server may provide increasing or decreasing levels of access to the client device. Some device credentials (e.g., "default credentials"), may allow the client device to access a limited set of data and/or functionality from the remote server. Other device credentials (e.g., "assigned credentials"), may allow the client device to access a greater set of data and/or functionality from the remote server. In addition, if some relationship is satisfied (e.g., the client device has been paired to a particular user account), then presentation of the assigned credentials may allow the client device to yet an even greater set of data and/or functionality from the remote server, that being information unique to the user account (e.g., sensitive user information).

The subject matter of this patent specification relates to the subject matter of the following commonly assigned applications, each of which is incorporated by reference herein: U.S. Ser. No. 13/275,307 filed Oct. 17, 2011; U.S. Ser. No. 13/275,311 filed Oct. 17, 2011; International Application Ser. No. PCT/US12/30084 filed Mar. 22, 2012; and U.S. Ser. No. 13/466,815 filed May 8, 2012. The above-referenced patent applications are collectively referenced herein as 'the commonly assigned incorporated applications.'

System for Implementing Communication Protocol

Various aspects and implementations of subscription-based synchronization according to one or more embodiments are disclosed herein. Turning to the figures, FIG. 1 depicts a system 100 that implements subscription-notification mechanisms for synchronizing states of devices distributed across the system according to an embodiment. System 100 includes a remote server 102 that is remote from and communicatively coupled to one or more client devices 104 via a network 106. Client devices 104 may include a variety of electronic devices. In one embodiment, client devices 104 may include one or more monitoring devices 108, whereas in other embodiments client devices 108 may also include one or more access devices 110.

Monitoring device 108 is an electronic device operable to generate base data to be shared across system 100. In one embodiment, monitoring device 108 may generate such base data by monitoring one or more aspects of its environment and using the monitored data as base data. For example, where monitoring device 108 is an intelligent thermostat, monitoring device may include sensors that sense environmental characteristics such as temperature, humidity, occupancy, etc. Such data may thus be generated by monitoring device 108 and communicated to remote server 102. When changes are made at the monitoring device 108, for example, when environmental changes are sensed, those changes may similarly be communicated to remote server 102.

In addition to generating data by monitoring aspects of its environments, data may also be generated by user interaction with monitoring device 108. For example, where monitoring device 108 is an intelligent thermostat, a user may define a desired temperature (i.e., a "setpoint temperature" or more simply "setpoint") via the monitoring device 108, where the monitoring device 108 may subsequently control an electrically coupled HVAC system to achieve and/or maintain the desired temperature. Or, via algorithms programmed therein, monitoring device 108 itself may generate a setpoint. The setpoint, regardless of how it is generated or altered, and changes thereto, may similarly be communicated to the remote server 102.

Conversely, the remote server 102 may change one or more fields of data associated with the monitoring device 108. For example, the remote server 102 may wish to alter the setpoint stored at the monitoring device 108. In such case, the remote server 102 may alter its own version of the setpoint of the monitoring device 108 and communicate that change to the monitoring device 108. Thus, in addition to changes to data made at the monitoring device 108 being reflected at the remote server 102, changes to data made at the remote server 102 are reflected at the monitoring device 108.

In some embodiments, an access device 110 may also be provided, where the access device 110 can operate to access data from and change data at the monitoring device 108. To access data from the monitoring device 108, the access device 110 may acquire copies of such data from the remote server 102. Since the state of information at the monitoring device 108 and the state of information at the remote server 102 are generally identical, by acquiring the data from the remote server 102 the state of information at the access device 110 is generally identical to that at the monitoring device 108. Further, to change data of the monitoring device 108 (e.g., the setpoint), a user may cause the change at the access device 110, where the change is propagated to the monitoring device 108 via the remote server 102.

As should be recognized, the remote server 102 operates to maintain a state of information identical to that provided at the monitoring device 108 and, in some cases, may alter its state of information regarding monitoring device 108 and cause such changes to be disseminated to the monitoring device 108 such that the state of the remote server 102 and that of the monitoring device 108 are synchronized. In embodiments where an access device 110 is provided, the remote server 102 similarly operates to maintain identical states of information across both the monitoring device 108 and the access device 110 such that the states of the monitoring device 108 and access device 110 are synchronized.

In at least one embodiment, multiple monitoring devices 108 may be provided. In such cases, while each monitoring device 108 may generate its own unique base information, which is synchronized with the remote server 102 and one or more access devices 110, each monitoring device 108 may also share a subset of its information with select other monitoring devices 108. For example, where the monitoring devices 108 are intelligent thermostats, they may share occupancy data with one another, but not temperature data. Accordingly, the states of subsets of information at multiple monitoring devices 108 may be synchronized with one another.

Network 106 is any suitable network for enabling communications between various entities, such as between client devices 104 and remote server 102. Such a network may include, for example, a local area network, a wide-area network, a virtual private network, the Internet, an intranet, an extranet, a public switched telephone network, an infrared network, a wireless network, a wireless data network, a cellular network, or any other such network or combination thereof. The network may, furthermore, incorporate any suitable network topology. Network 106 may utilize any suitable protocol, and communication over the network 106 may be enabled by wired or wireless connections, and combinations thereof.

It should be recognized that in the particular example described with reference to FIG. 1, the monitoring device 108 and the access device 110 may be associated with a common user (e.g., they may each be "paired" to a particular user account, as further described herein). As a result of the pairing (and the subsequently described subscription processes), the states of the monitoring device 108 and access device 110 may be synchronized. That is, the monitoring device 108 and the access device 110 that are paired to a particular user account may subscribe to one or more buckets of information such that changes made to those buckets of information by either device are propagated to the other device. It should be recognized, however, that the paired devices (e.g., the monitoring device 108 and the access device 110) are only a subset of all client devices that may be included in the system 100. That is, the system 100 may include a number of monitoring devices 108 that are paired to different accounts, and a number of access devices 110 that are paired to the same or different accounts. Synchronization is thus typically performed between client devices that are associated with one another (e.g., are "paired" to a common user account), but is not performed between client devices that are not associated with one another.

System 100 in certain embodiments is a distributed computing environment utilizing several computer systems and components that are interconnected via communication links, using one or more computer networks or direct connections. However, it will be appreciated by those skilled in the art that such a system could operate equally well in a system having fewer or a greater number of components than are illustrated in FIG. 1. Thus, the depiction of system 100 in FIG. 1 should be taken as being illustrative in nature, and not as limiting the scope of the present teachings.

Figure 2:
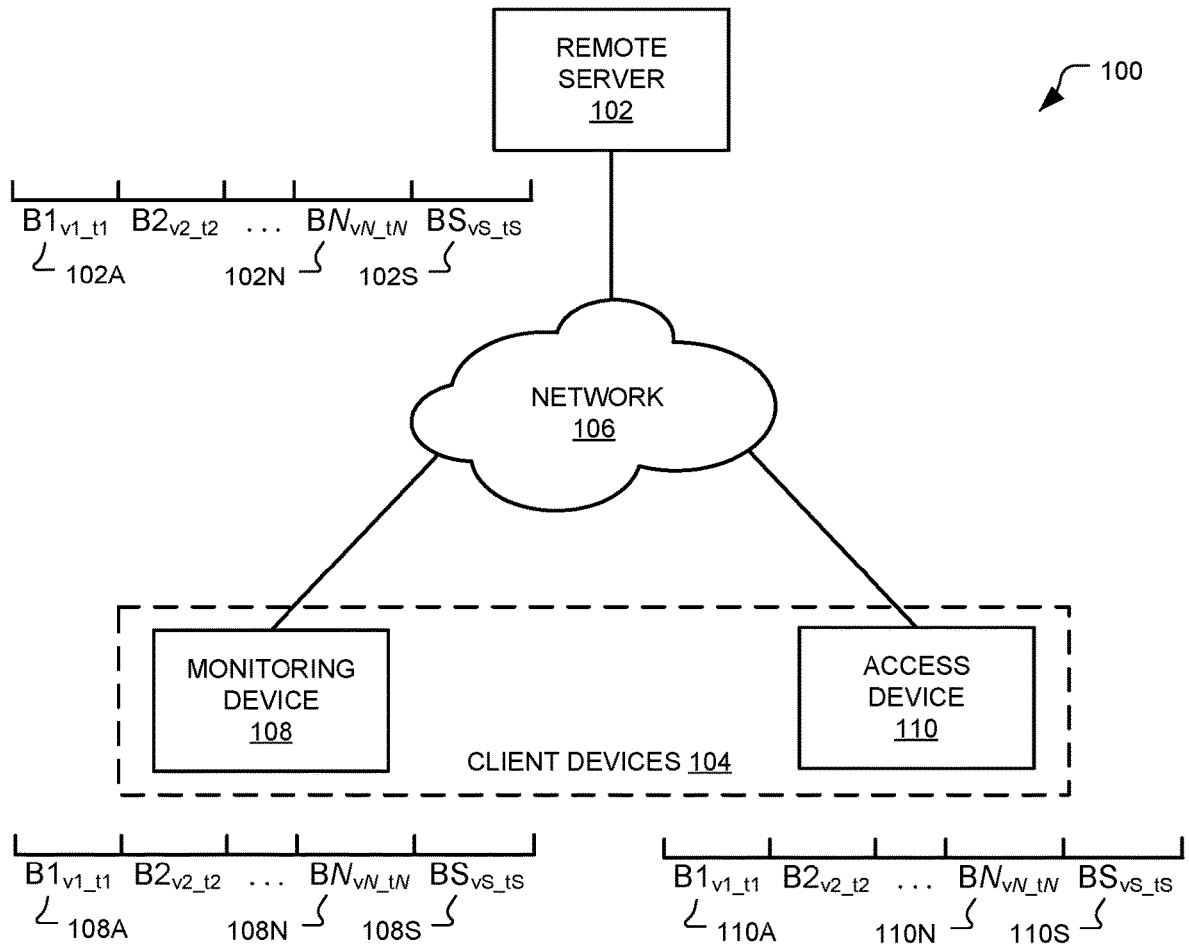
FIG. 2 illustrates the system of FIG. 1 together with buckets of information provided at each of the entities of that system according to an embodiment.

FIG. 2 illustrates the system of FIG. 1 together with buckets of information provided at each of the entities of that system according to an embodiment. The entities of system 100 store data in the form of "buckets", where each bucket includes a plurality of field-value pairs. Fields may be defined for various properties of the monitoring device 108 and/or its environment. A value is associated with each field. For intelligent thermostats, an exemplary field-value pair may be:

"hvac_heater_state":0

The string "hvac heater state" is the field, referring to the state of an HVAC heater, and number "0" is the value, referring to the state of the HVAC heater (e.g., off). An exemplary bucket is:

```
Bucket Name: structure.<id>
{
    "devices": [device.<id>, device.<id>]
    "name": "My Living Room Thermostat",
    "away": false,
    "display_location": "Palo Alto,CA\n"
}
```

The bucket in this example is called "structure" and includes field-value pairs associated with a structure (e.g., house) in which the monitoring device 108 is located. With reference to FIG. 2, the "structure" bucket may be bucket "B1" 108A that includes values initially defined at the monitoring device 108. Each bucket may be provided with a version identifier and/or a timestamp. The version identifier uniquely identifies a version of the bucket, whereas the timestamp identifies a time which a bucket (or value therein) was received or generated by server 102. Thus, with reference once again to FIG. 2, the bucket "B1" may be associated with a unique version "v1" and timestamp "t1" that are received from server 102.

The monitoring device 108 may have a plurality of buckets, "B1" 108A through "BN" 108N, where each bucket includes its own set of field-value pairs. The remote server will also have a plurality of buckets, "B1" 102A through "BN" 102N, that respectively correspond to the buckets of the monitoring device 108. When in steady state, the contents of the buckets at the remote server 102 and the corresponding buckets at the monitoring device 108 will be identical. In embodiments where version identifiers and/or timestamps are used, the version identifiers and/or timestamps of the buckets at the remote server 102 and the corresponding buckets at the monitoring device 108 will similarly be identical.

As described, in some embodiments system 100 includes one or more access devices 110. The access device 110 similarly includes buckets "B1" 110A through "BN" 110N that respectively correspond to the buckets of the monitoring device 108. When in steady state, the contents of the buckets at the access device 110 and the corresponding buckets at each of the remote server 102 and the monitoring device 108 will be identical. In embodiments where version identifiers and/or timestamps are used, the version identifiers and/or timestamps of the buckets at the access device 110 will similarly be identical to those at the remote server 102 and the monitoring device 108.

In at least one embodiment, a plurality of monitoring devices 108 all associated with a same structure or user account may be provided. Each monitoring device 108 includes its unique set of buckets B1 through BN (where N may be the same or different for across the devices 108) that are synchronized with the remote server 102 and, in some cases with the access device 110. Further, some or all of the monitoring devices 108 may include a shared bucket "BS" 108S. The shared bucket BS is like other buckets, but also may be shared or otherwise synchronized among multiple monitoring devices 108 associated with the same structure or user account. To facilitate such sharing, the remote server 102 may also include the shared bucket "BS" 102S for each monitoring device 108. When one monitoring device 108 makes changes to its shared bucket "BS", the remote server 102 may propagate those changes to the other monitoring devices 108. In this fashion, monitoring devices 108 may effectively communicate with one another.

An access device 110 may also include a shared bucket "BS" 110S. In at least one embodiment, the access device 110 includes the shared bucket "BS" of all monitoring devices 108. In this fashion, the access device 110 may be operable to access the buckets of information that are shared across multiple monitoring devices 108. Further details and examples of shared buckets are described in U.S. Prov. Ser. No. 61/627,996 filed Oct. 21, 2011. One such example includes so-called away-state flags, each corresponding to a distinct occupancy-sensing device in a home, each being set to an "away ready" state by the corresponding device if it has not detected occupancy for a predetermined time interval, wherein no one device will enter into an actual away state (a low energy-usage state) until all of the flags are set to "away-ready". For the exemplary case of occupancy-sensing thermostats this will ensure that none of the thermostats will enter into a less comfortable low energy-usage state until all of the devices have "seen" the requisite non-occupancy condition, thereby establishing a high probability that the home is truly unoccupied.

Figure 3:
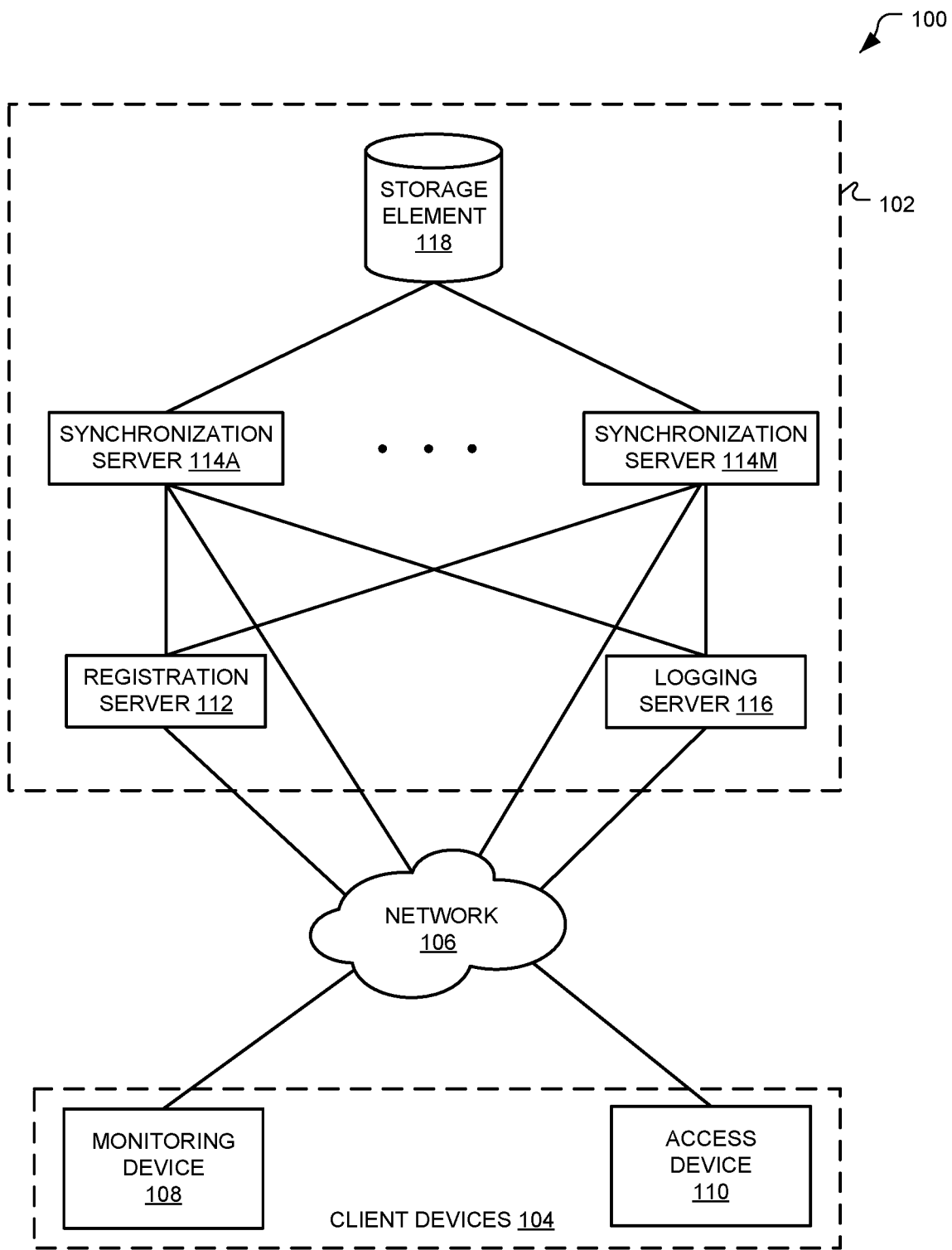
FIG. 3 illustrates the system of FIG. 1 including some simplified components of the remote server according to an embodiment.

FIG. 3 illustrates the system of FIG. 1 including some simplified components of the remote server 102 according to an embodiment. Like numbered entities are identical to those previous described, and thus further description is omitted. Remote server 102 includes a registration server 112, a plurality of synchronization servers 114A through 114M, a logging server 116, and a storage element 118. The registration server 112, synchronization servers 114A through 114M, and logging server 116 are communicatively coupled to the client devices 104 via network 106. The synchronization servers 114A through 114M are also communicatively coupled to the registration server 112 and the storage element 118.

As further described in more detail herein, the storage element 118 may store a variety of information such as buckets 102A through 102N and 102S for all users of the system 100. For example, with reference to FIG. 2, for each user of the system 100 the storage element 118 may store all of the buckets 102A through 102N and any shared buckets 102S. The registration server 112 and synchronization servers 114A through 114M may then operate to ensure that the state of the buckets in the storage element 118 is identical to the state of the buckets in the associated client devices 104. The storage element 118 may also or alternatively store authentication-related information. For example, the storage element 118 may store assigned credentials, default credentials, etc.

In some embodiments and as further described herein, the registration server 112 acts as a first point of contact for the client devices 104. For example, a monitoring device 108 may have a location identifier (e.g., a URL) of the registration server 112 hardcoded therein so that on initialization or reconnect the monitoring device 108 may always contact registration server 112. Among other things, the registration server 112 may identify one of the synchronization servers 114A through 114M which is responsible for synchronizing the buckets at the client devices 104 with the buckets at the storage element 118, and provide the identity of the selected synchronization server to the client devices 104. The client devices may then subsequently connect to the selected synchronization server which will subsequently synchronize the states of the client devices 104 with each other (when, e.g., the client devices 104 are associated with one another such as being paired to the same user account) and with the storage element 118.

System 100 in certain embodiments is a distributed computing environment with a remote server 102 including various components. However, it will be appreciated by those skilled in the art that such a remote server could operate equally well with fewer or a greater number of components than are illustrated in FIG. 3. Thus, the depiction of system 100 in FIG. 3 should be taken as being illustrative in nature, and not as limiting the scope of the present teachings.

Figure 4:
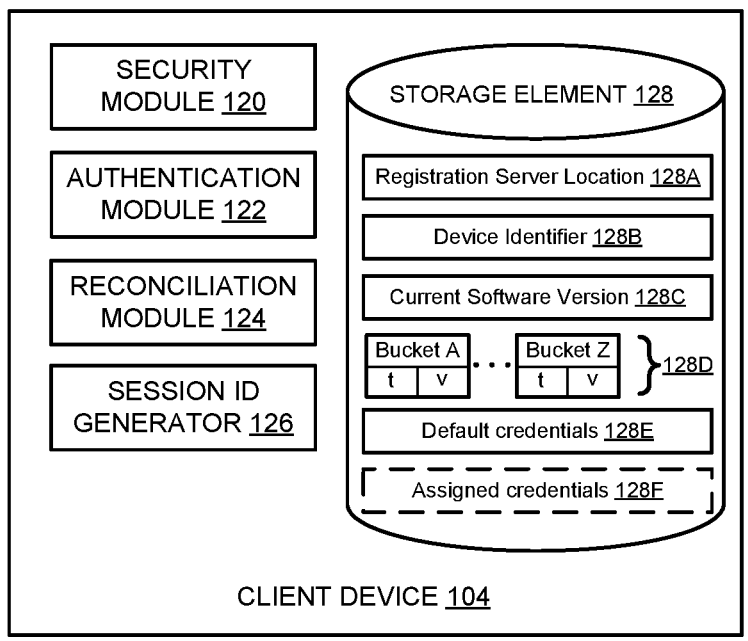
FIG. 4 is a simplified block diagram illustrating components of a client device according to an embodiment.

FIG. 4 is a simplified block diagram illustrating components of a client device 104 according to an embodiment. The client device 104 includes a number of different functional modules, including a security module 120, an authentication module 122, a reconciliation module 124, a session identification generator 126, and a storage element 128. The storage element 128 may include a variety of information, such as a registration server location 128A, a device identifier 128B, a current software version 128C, one or more buckets of information 128D, default credentials 128E, and at certain times, assigned credentials 128F.

The security module 120 is operable to provide secure (e.g., cryptographically encrypted) communications between the client device and other elements of the system 100, such as the registration server 112 and/or synchronization server 114. To facilitate such secure communications, the security module 120 may include code or hardware functionality for performing one or more security-related functions, such as symmetric encryption, asymmetric encryption, key agreement and/or establishment, hashing, signing, and the like. Accordingly, security module 120 may be operable to implement one or more of a variety of cryptographic communication protocols, such as transport layer security (TSL), secure sockets layer (SSL), and the like. As a result of establishing a secure connection with the remote server 102, the identity of the remote server 102 (e.g., the identity of the registration server 112 and/or synchronization server 114) may be authenticated to the client device 104.

In contrast to the function of security module 120 in providing a secure communication channel and authenticating the identity of the remote server 102 to the client device 104, the authentication module 122 is operable to authenticate the identity of the client device 104 to the remote server 102. Like the security module 120, the authentication module 122 may include code or hardware functionality for performing one or more security-related functions, such as symmetric encryption, asymmetric encryption, key agreement and/or establishment, hashing, signing, and the like. In this case, however, the authentication module 120 may be operable to implement one or more of a variety of authentication protocols, such as an extensible authentication protocol (EAP), a challenge-handshake authentication protocol (CHAP), a challenge-response authentication mechanism (CRAM), and the like. Various examples of authentication protocols that may be used are subsequently described herein.

The reconciliation module 124 is operable to reconcile the state of the buckets 128D of the client device 104 with corresponding buckets provided in the synchronization server 114. By reconciling the state of the buckets 128D with those in the synchronization server 114, the buckets 128D at the client device 104 and the corresponding buckets at the synchronization server 114 are ensured to, at least eventually, have identical content. Further, when system 100 includes multiple client devices 104 that are associated with one another, such as a monitoring device 108 and an access device 110 that are paired to the same user account, then by reconciling the state of the buckets 128D of each client device 104 with corresponding buckets provided in the synchronization server 114, the buckets 128D at all client devices 104 are similarly ensured to, at least eventually, have identical content. Various reconciliation techniques are further described herein.

The session ID generator module 126 is operable to generate a session identifier that identifies a unique communication session established between the client device 104 and the remote server 102. The session identifier may be generated at any of a variety of times and may last for any of a variety of durations. For example, a unique session identifier may be generated when the client device 104 is powered on and last until the client device 104 is powered off. For another example, the session identifier may be generated each time the client device 104 reconnects to the registration server 112 to acquire new assigned credentials and last until the client device 104 again needs to reconnect to the registration server 112. For yet another example, the session identifier may be generated periodically. The session identifier generated for each session is an identifier that uniquely identifies the communication session. For example, the session identifier may be a randomly generated string, a time-ordered numerical value, or other sequence of information. The use of session identifiers is further described herein.

As mentioned, the storage element 128 includes a variety of information, such as a registration server location 128A, a device identifier 128B, a current software version 128C, one or more buckets of information 128D, default credentials 128E, and at certain times, assigned credentials 128F. The registration server location 128A indicates a target location of the registration server 112 so as to facilitate communication between the client device 104 and the registration server 112. For example, the registration server location 128A may be a uniform resource identifier (URI), uniform resource locator (URL), or the like identifying the name of the registration server 112 so as to enable the client device 104 to connect to the registration over 112 over a network 106 such as the Internet. In some embodiments, the registration server location 128A may be hardcoded into or otherwise stored in non-volatile memory of the client device 104.

The device identifier 128B is a data string or other sequence of information that uniquely identifies the client device 104. The device identifier 128B may be static or dynamic. For example, a static device identifier 128B may be hardcoded into or otherwise stored in non-volatile memory of the client device 104 and may be, e.g., a serial number, a media access control (MAC) address, or other unique identifier. A dynamic device identifier 128B may be a dynamically generated identifier that also uniquely identifies the client device 104. The dynamic device identifier 128B may be generated by the client device 104 or, in some embodiments, by other entities of system such as the registration server 112. In one particular embodiment, the client device 104 may include multiple device identifiers 128B, such as a static identifier and a dynamic identifier, where the static identifier is hardcoded into the client device 104 and the dynamic identifier is generated by and provided to the client device 104 by the registration server 112. In one particular embodiment, the device identifier 128B may be provided in one or more of the default credentials 128E and assigned credentials 128F as further described herein.

The current software version 128C is a data string or other sequence of information that identifies the version of software being executed on the client device 104. For example, in some embodiments, one or more of the modules of the client device 104 and, in many cases, additional operational functionality of the client device, is implemented in software code that is stored on the client device 104. The current software version 128C indicates a version of that software code, as the software code may be updated or otherwise replaced with different versions over time.

Buckets 128D are buckets of information as previously described with reference to FIG. 2. Accordingly, each bucket 128D includes a plurality of field-value pairs for defining properties of the client device 104 and/or its environment when the client device 104 is a monitoring device 108. The field-value pairs are often referred to herein as "content" of the bucket, although the content of the bucket may include various information (e.g., headers, formatting characters, etc.) other than field-value pairs. Each bucket 128D has associated therewith a bucket identifier or name (e.g., "Bucket A") that uniquely identifies the bucket, and may also have assigned thereto and associated therewith a timestamp ("t") and version ("v") also as previously described.

Default credentials 128E are credentials such as a secret password, known to the client device 104 and the remote server 102, that are given to the device at the time of manufacturing and remain with the device throughout its life. Accordingly, the default credentials may indicate that the client device was manufactured by a particular entity.

The default credentials may include one or more of a variety of information, such as a scheme that identifies the type of credentials (i.e., default credentials), an identifier (e.g., a serial number, a MAC address, etc.) that uniquely identifies the device, and a secret (e.g., a hashed version of the identifier) that is known to the client device 104 and the remote server 102.

Assigned credentials 128F are credentials such as a secret password, known to the client device 104 and the remote server 102, that are assigned to the client device 104 by the remote server 102 during the course of interaction and, in some embodiments, may periodically expire. The assigned credentials may operate to provide the client device with increased access to secured resources as compared to the default credentials and, when the device is paired with a user account, authenticates that the client device is associated with the account. The assigned credentials may include one or more of a variety of information, such as a scheme that identifies the type of credentials (i.e., assigned credentials), an identifier (e.g., a serial number, a MAC address, etc.) that uniquely identifies the device, and a secret (e.g., a random number) that is known to the client device 104 and the remote server 102.

While described as independent modules, it should be recognized that the various modules and elements described with reference to the client device 104 may be combined into one or more modules or further separated into one or more modules. The various modules may be implemented in software or hardware, and the storage element 128 may be implemented in any suitable fashion such as one or more databases on one or more disk drives, optical storage devices, solid-state storage devices such as random access memory ("RAM") and/or a read-only memory ("ROM"), and the like.

Various other characteristics, operations, and uses of the elements of the client device 104 are further described herein. Further, it should be recognized that the client device 104, while depicted as including a variety of modules and components, may include other elements for facilitating the operation of an electronic device as described herein. It will also be appreciated by those skilled in the art that the client device could operate equally well with fewer or a greater number of components than are illustrated in FIG. 4. Thus, the depiction of the client device 104 in FIG. 4 should be taken as being illustrative in nature, and not as limiting to the scope of the present teachings.

Figure 5:
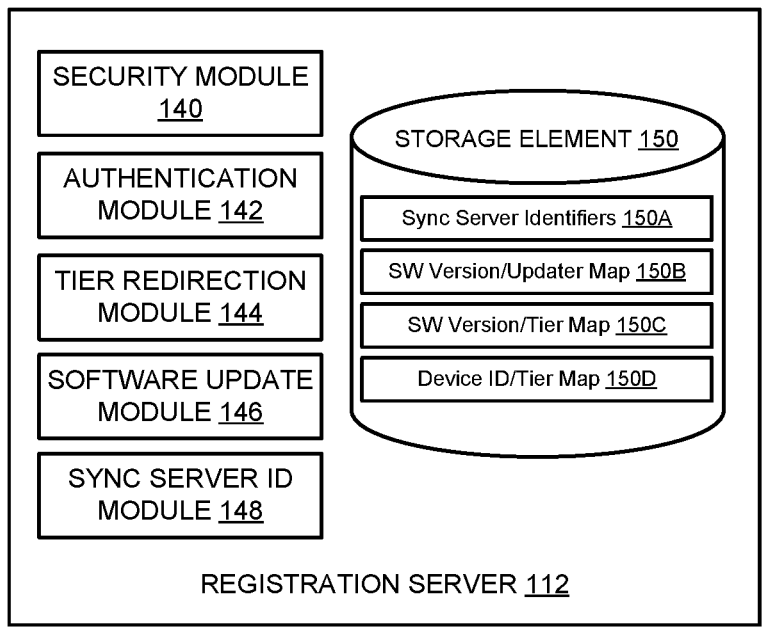
FIG. 5 is a simplified block diagram illustrating components of a registration server according to an embodiment.

FIG. 5 is a simplified block diagram illustrating components of a registration server 112 according to an embodiment. The registration server 112 includes a number of different functional modules, including a security module 140, an authentication module 142, a tier redirection module 144, a software update module 146, a synchronization server identification module 148, and a storage element 150. The storage element 150 may include a variety of information, such as synchronization server identifiers 150A, a software version/updater map 150B, a software version/tier map 150C, and a device identifier/tier map 150D.

The security module 140, like the security module 120 described with reference to the client device 104, is operable to provide secure communications between the registration server 112 and other elements of the system 100, such as client devices 104. Accordingly, the security module 140 may include code or hardware functionality similar to that of the security module 120 so as to establish a secure connection with the client device 104 and authenticate its identity to the client device 104 via communication with the security module 120 of the client device 104.

The authentication module 142 is also similar to the authentication module 122 described with reference to the client device 104, and is thus operable to communicate with the authentication module 122 of the client device 104 so as to authenticate the identity of the client device 104. Accordingly, the authentication module 122 may include code or hardware functionality similar to that of the client device 104 so as to authenticate the identity of the client device 104 via communication with the authentication module 122 of the client device 104.

The tier redirection module 144 is operable to redirect client devices 104 to different instances of the remote server 102 based on a particular tier of which the client devices 104 may be a part of. That is, a number of different instances (i.e., working copies) of the remote server 102, including the registration server 112 and synchronization servers 114A through 114M, may exist. The different instances may provide identical functionality as the base instance which the client device 104 initially connects, or may provide additional or alternative functionality. For example, different instances of the remote server 102 may be generated for different purposes, such as for production purposes, quality assurance purposes, staging purposes, etc. The production instance may be the base instance which client devices 104 initially connect to by way of the registration server location 128A, and may include stable versions of operability intended for consumer use. In contrast, the quality assurance instance may be a testing instance which client devices 104 operated by testers of the system 100 are redirected to by way of the redirection module 144, where the testing instance may be used for purposes of testing new or different operability of various entities of the system 100 such as the client device 104, the registration server 112, etc.

The software update module 146 is operable to identify and provide software version information to the client device 104. The software version information may indicate a most recent or desired software version that the client device 104 should be executing, and/or may indicate a software update destination (e.g., a target URI) which the client device 104 may visit to obtain software updates. The software update module 146 is particularly well-suited for implementations in which the client device 104 includes computer software for performing some or all of its functionality as described herein.

The synchronization server identification module 148 is operable to identify one of the plurality of synchronization servers 114A through 114M which is allocated to the client device 104 for performing synchronization operations on behalf of the client device 104 and other related client devices 104 (e.g., when multiple client devices 104 are associated with the same structure or user account). As previously described, in some embodiments the remote server 102 includes a plurality of synchronization servers 114A through 114M. Each synchronization server may be assigned to perform synchronization operations on behalf of a subset of all possible client devices 104 (i.e., a subset of all client devices 104 that are registered with the registration server 112). As each synchronization server is assigned to only a subset of all possible client devices 104, the synchronization workload of the entire system 100 is distributed across the synchronization servers 114A through 114M. Various techniques for assigning synchronization servers 114A through 114M to client devices 104 are further described herein, although it should be recognized that, while not depicted in FIG. 3, in some embodiments, system 100 may comprise only a single synchronization server rather than a plurality of synchronization servers. In such a case, the single synchronization server performs synchronization operations on behalf of all client devices 104. As should be recognized, the synchronization server identification module 148 is particularly well suited for implementations which include a plurality of synchronization servers.

As mentioned, the storage element 150 includes a variety of information, such as synchronization server identifiers 150A, a software version/updater map 150B, a software version/tier map 150C, and a device identifier/tier map 150D. The synchronization server identifiers 150A each uniquely identify one of the plurality of synchronization servers 114A through 114M. For example, the synchronization server identifiers 150A may include URI's, URL's, or the like to each synchronization server. Thus, the registration server 112 has knowledge of the different synchronization servers and can communicate the target location of a selected synchronization server to the client device 104.

The software version/updater map 150B is a map correlating or otherwise mapping client devices (e.g., device identifiers) to particular software versions and, in some embodiments, software update destinations. In at least one embodiment, different client devices 104 may be controlled to locally execute different versions of computer software. For example, client devices 104 distributed to consumers may be controlled to execute a consumer-suitable version of software, whereas client devices 104 distributed to testers of the system 100 may be controlled to execute a tester-suitable version of software. Accordingly, the software version/updater map 150B includes a mapping between client devices 104 and software versions which those devices should be executing. Since the device identifiers 128B uniquely identify each client device 104, the software version/updater map 150B may include a mapping between device identifiers and software versions to enable the registration server 112 to determine the appropriate software version that the client device 104 should be executing based on its device identifier 128B. Further, in some embodiments, different software updating entities or target locations may be used, and thus different software updater locations may be associated with different software versions. In some embodiments, the same software updater location may be used for all software updates, and in yet other embodiments, the same software version may be used by all client devices 104.

Software version/tier map 150C is a map correlating current software versions that a client device 104 is executing with a tier that the client device 104 is part of. By identifying the tier that a client device 104 is part of, the registration server 112 can keep the client device 104 on the instance of the remote server 102 or forward the client device 104 onto a different instance of the remote server 102 via the tier redirection module 144. The software version/tier map 150C, by identifying the tier of a client device, may correspondingly identify a target location of a different instance of the registration server 112, so that, e.g., in the event the client device 104 is currently executing an unauthorized version of software, the registration server 112 can redirect the client device 104 to a different instance of the registration server 112 (e.g., an testing instance) and thus a different instance of the remote server 102.

Device identifier/tier map 150D is a map like software version/tier map 150C, but instead of correlating current software versions that a client device 104 is executing with a tier, the map 150C correlates the device identifier of the client device 104 with a tier. In this fashion, the registration server can redirect client devices 104 to different instances of the remote server 102 regardless of which software version the client device 104 is executing.

While described as independent modules, it should be recognized that the various modules and elements described with reference to the registration server 112 may be combined into one or more modules or further separated into one or more modules. The various modules may be implemented in software or hardware, and the storage element 150 may be implemented in any suitable fashion such as one or more databases on one or more disk drives, optical storage devices, solid-state storage devices such as random access memory ("RAM") and/or a read-only memory ("ROM"), and the like.

Various other characteristics, operations, and uses of the elements of the registration server 112 are further described herein. Further, it should be recognized that the registration server 112, while depicted as including a variety of modules and components, may include other elements for facilitating the operation of an electronic device as described herein. It will also be appreciated by those skilled in the art that the registration server 112 could operate equally well with fewer or a greater number of components than are illustrated in FIG. 5. Thus, the depiction of the registration server 112 in FIG. 5 should be taken as being illustrative in nature, and not limiting to the scope of the present teachings.

Figure 6:
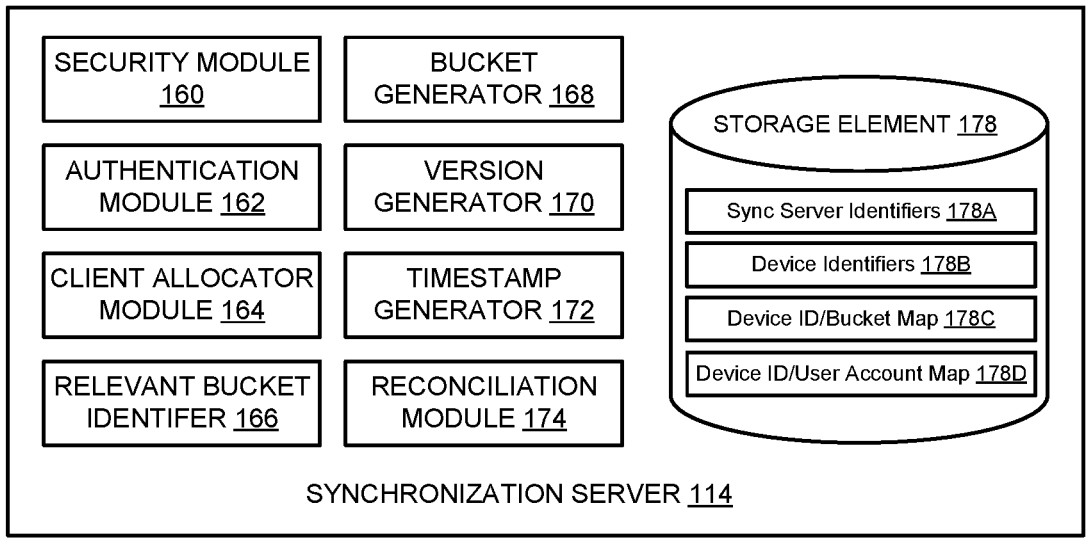
FIG. 6 is a simplified block diagram illustrating components of a synchronization server according to an embodiment.

FIG. 6 is a simplified block diagram illustrating components of a synchronization server 114 according to an embodiment. The synchronization server 114 includes a number of different functional modules, including a security module 160, an authentication module 162, a client allocator module 164, a relevant bucket identifier 166, a bucket generator 168, a version generator 170, a timestamp generator 172, a reconciliation module 174, and a storage element 178. The storage element 178 may include a variety of information, such as synchronization server identifiers 178A, device identifiers 178B, a device identifier/bucket map 178C, and a device identifier/user account map 178D.

The security module 160, like the security module 120 described with reference to the client device 104, is operable to provide secure communications between the synchronization server 114 and other elements of the system 100, such as client devices 104. Accordingly, the security module 160 may include code or hardware functionality similar to that of the security module 120 so as to establish a secure connection with the client device 104 and authenticate its identity to the client device 104 via communication with the security module 120 of the client device 104.

The authentication module 162 is also similar to the authentication module 122 described with reference to the client device 104, and is thus operable to communicate with the authentication module 122 of the client device 104 so as to authenticate the identity of the client device 104. Accordingly, the authentication module 162 may include code or hardware functionality similar to that of the client device 104 so as to authenticate the identity of the client device 104 via communication with the authentication module 122 of the client device 104.

The client allocator module 164 is operable to allocate a synchronization server from the plurality of synchronization servers 114A through 114M to a particular client device 104. As previously described, a single synchronization server 114 may perform synchronization operations on behalf of a subset of client devices. Accordingly, client allocator module 164 may include one or more algorithms for identifying a particular synchronization server to allocate to a particular client device 104. In one particular embodiment, the client allocator module 164 may implement a consistent hashing algorithm to make such an allocation. However, embodiments are not limited to the use of a consistent hashing algorithm, but rather other types of hashing algorithms may be used, such as trivial hash functions, perfect hash functions, minimal perfect hash functions, special-purpose hash functions, rolling hash functions, universal hash functions, etc. To facilitate identifying a particular synchronization server, each synchronization server may know of all synchronization servers within the system 100, as well as the device identifier for the client device 104 desiring to be allocated a synchronization server. The identity of all synchronization servers within the system 100 may be stored in, e.g., synchronization server identifiers 178A, while received device identifiers may be stored as device identifiers 178B. By virtue of this scheme, when the time comes for the registration server 112 to direct a particular client device 104 to a designated one of the synchronization servers 114, the registration server 112 can first make an inquiry to any of the synchronization servers 114 about which one of them should be the designated synchronization server for the particular client device 104 in question. Among other advantages, balancing of the loads among the multiple synchronization servers 114 can be achieved by virtue of their own self-governing assignment algorithms without requiring the registration server 112, or any other external load balancing system, to govern that load balancing process.

Figure 8:
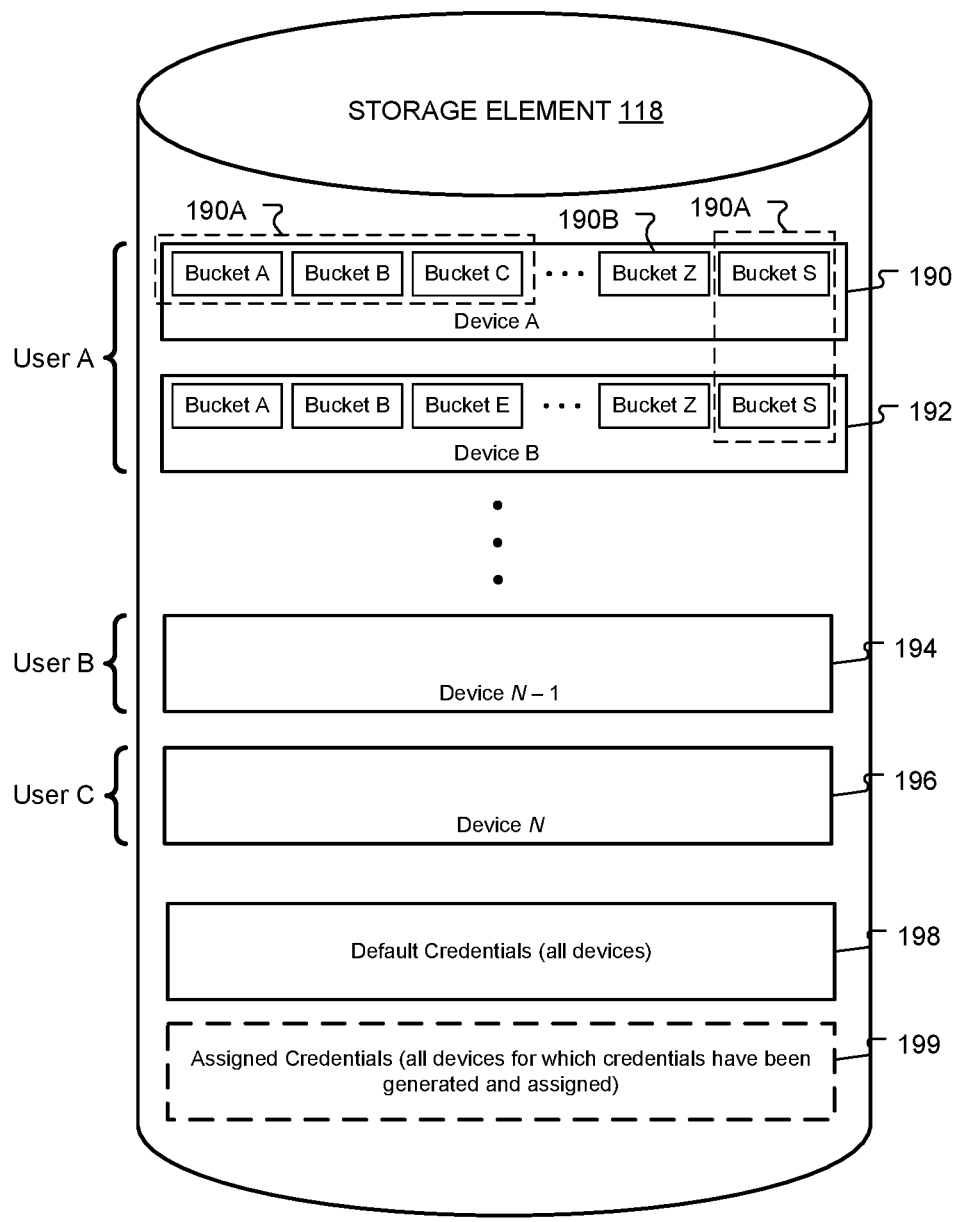
FIG. 8 depicts the contents of a storage element associated with the remote server according to an embodiment.

Relevant bucket identifier 166 is operable to identify buckets that are relevant to a particular client device 104. By being relevant, it is those buckets that will be synchronized between the client device and the synchronization server. For example, turning briefly to FIG. 8, FIG. 8 depicts some contents of the storage element 118 according to an embodiment. The storage element 118 includes, for each device, a plurality of buckets. For example, for a client device 104 "Device A", the storage element 116 includes buckets 190, which include "Bucket A", "Bucket B", "Bucket C", "Bucket Z", and "Bucket S". Device A is paired to, or otherwise associated with, a user account for "User A". Although the storage element 118 includes at least five buckets for Device A, only a subset 190A of these buckets, including Buckets A, B, C, and S, are synchronized with corresponding buckets at the synchronization server 114. At least one bucket 190B, Bucket Z, is not synchronized with a corresponding bucket at the synchronization server 114. Accordingly, for a given client device 104, the relevant bucket identifier 166 is operable to identify Buckets A, B, C, and S as it is those buckets (in this example) that are to be synchronized between the client device 104 and the remote server 102.

The bucket generator 168 is operable to generate instances of buckets at the remote server 102. In some embodiments, the buckets of information (e.g., buckets 190) do not pre-exist in the storage element 118 (i.e., at remote server 102). Rather, the buckets may be created upon an initial connection to or initialization of a client device. For example, on initially connecting a monitoring device 108 to the registration server 112, the registration server 112 may cause buckets associated with the client device 104 to be created at the storage element 118.

The version generator 170 is operable to generate a version identifier for each bucket. The version identifier may be a string or other sequence of data that operates to uniquely identify a version of a particular bucket for a particular client at some specific time. For example, with reference to FIG. 8, at a given instance in time, Bucket A of buckets 190 may have a version associated therewith that is unique to Bucket A over the duration of time that Bucket A is in use.

In some embodiments, the version of a particular bucket is also unique with respect to other buckets associated with the same or different users, while in other embodiments the version of the particular bucket may not be unique with respect to other buckets associated with the same or different users. The version generator 170 may generate version identifiers randomly, sequentially, or in another suitable fashion for generating unique identifiers.

The timestamp generator 172 is operable to generate a timestamp for each bucket. The timestamp may be a string or other sequence of data that operates to provide an indication of time. For example, the timestamp generator 172 may generate a timestamp indicating a time at which a bucket is generated. Subsequently, at a time when the bucket is changed, the timestamp generator 172 may generate a new timestamp indicating the time at which the bucket was changed. In some embodiments, timestamps may be generated sequentially in time such that even though the timestamp does not indicate an absolute time, the sequence of timestamps indicate whether one timestamp was generated prior to or after another timestamp.

The reconciliation module 174 is similar to the reconciliation module 124 of the client device 104, but in this case is operable to reconcile the state of the buckets at the storage element 118 with the state of the buckets 128D at the client device 104. In embodiments where the system 100 includes a number of different client devices 104 associated with a given user, the reconciliation module 174 is operable to reconcile the state of the buckets at the storage element 118 with the state of the buckets at all of the client devices.

As mentioned, the storage element 178 may include a variety of information, such as synchronization server identifiers 178A, device identifiers 178B, a device identifier/bucket map 178C, and a device identifier/user account map 178D. The synchronization server identifiers 178A are similar to synchronization server identifiers 150A, and the device identifiers 178B are similar to device identifiers 128B, thus further description is omitted. The device identifier/bucket map 178C is a mapping or correlation between device identifiers and buckets.

That is, the device identifier/bucket map 178C maps client devices 104 with buckets stored at the storage element 118 that are associated with those client devices 104. For example, with reference to FIG. 8, a device identifier/bucket map 178C may map a device identifier for Device A with Buckets A, B, C, Z, and S, in the buckets 190. The device identifier/user account map 178 is a mapping or correlation between device identifiers and user accounts established with the remote server 102 by users of client devices 104.

One or more of the described embodiments may enjoy one or more advantages made further apparent in view of the nature of the virtual computing machines and data storage elements that are more commonly available to a business enterprise that may be desirous of implementing all or part of remote server 102 in a reliable, economical, and scalable manner to service a large number of client devices 104 (ranging, for example, from hundreds of such client devices in some scenarios, to hundreds of thousands of such client devices in other scenarios, and into the millions or more of such client devices in still other scenarios) without requiring the expenses or delays associated with building a custom dedicated hardware implementation. In one exemplary scenario, the remote server 102 may be implemented by purchasing computing and data storage capacity from a cloud services provider such as Amazon, Inc. of Seattle, Wash., in which: each registration server 112 may be an EC2 (Elastic Computing Cloud) instance having one or more of a local instance-store volume, a mounted EBS (Elastic Block Storage) volume, and access to a unique Amazon RDS (relational database service) instance serving as at least a portion of the data storage element 150; each synchronization server 114 may be an EC2 instance having one or more of a local instance-store volume, a mounted EBS (Elastic Block Storage) volume, and access to a unique Amazon RDS (relational database service) instance serving as at least a portion of the data storage element 178; each logging server 116 may be an EC2 instance having access to an Amazon S3 (Simple Storage Service) instance serving as at least a portion of the data storage element 186; and storage element 118 may be an Amazon RDS (Relational Database Service) instance. Generally speaking, for such implementations, the data storage element 150 for each registration server 112 is dedicated to and readily accessed only by that particular registration server 112, and the data storage element 178 for each synchronization server 114 is dedicated to and readily accessed only by that particular synchronization server 114. The data storage element 186 may be primarily accessed by the logging server 116, but may also allow access to other elements of system 100 that provide correct authentication credentials. In contrast to the storage elements for the registration server 112 and synchronization servers 114, the storage element 118 is accessible to all of the synchronization servers 114 (as well as the registration server 112 and logging server 116 if desired) although, as known in the art, the speed of data writing and retrieval will generally not be as fast as when each synchronization server 114 is writing to and reading from its own local data storage element 178.

While described as independent modules, it should be recognized that the various modules and elements described with reference to the synchronization server 114 may be combined into one or more modules or further separated into one or more modules. The various modules may be implemented in software or hardware, and the storage element 178 may be implemented in any suitable fashion such as one or more databases on one or more disk drives, optical storage devices, solid-state storage devices such as random access memory ("RAM") and/or a read-only memory ("ROM"), and the like.

Various other characteristics, operations, and uses of the elements of the synchronization server 114 are further described herein. Further, it should be recognized that the synchronization server 114, while depicted as including a variety of modules and components, may include other elements for facilitating the operation of an electronic device as described herein. It will also be appreciated by those skilled in the art that the synchronization server 114 could operate equally well with fewer or a greater number of components than are illustrated in FIG. 6. Thus, the depiction of the synchronization server 114 in FIG. 6 should be taken as being illustrative in nature, and not limiting to the scope of the present teachings.

Figure 7:
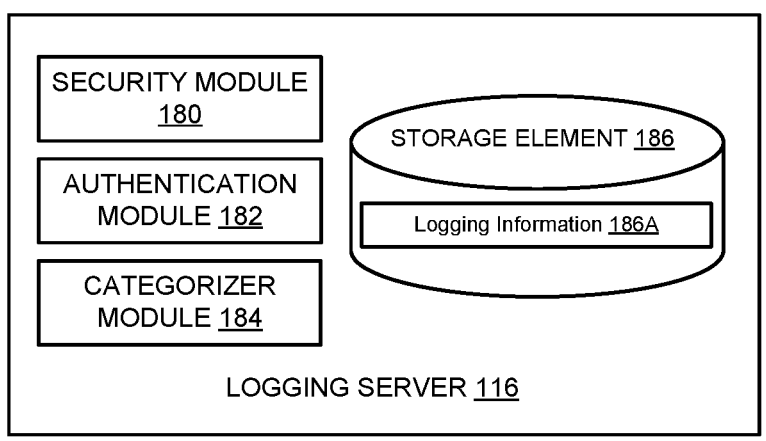
FIG. 7 is a simplified block diagram illustrating components of a logging server according to an embodiment.

FIG. 7 is a simplified block diagram illustrating components of a logging server 116 according to an embodiment. The logging server 116 includes a number of different functional modules, including a security module 180, an authentication module 182, a categorizer module 184, and a storage element 186. The storage element 186 may include a variety of information, such as logging information 186A.

The security module 180, like the security module 120 described with reference to the client device 104, is operable to provide secure communications between the logging server 116 and other elements of the system 100, such as client devices 104. Accordingly, the security module 180 may include code or hardware functionality similar to that of the security module 120 so as to establish a secure connection with the client device 104 and authenticate its identity to the client device 104 via communication with the security module 120 of the client device 104.

The authentication module 182 is also similar to the authentication module 122 described with reference to the client device 104, and is thus operable to communicate with the authentication module 122 of the client device 104 so as to authenticate the identity of the client device 104. Accordingly, the authentication module 182 may include code or hardware functionality similar to that of the client device 104 so as to authenticate the identity of the client device 104 via communication with the authentication module 122 of the client device 104.

The categorizer module 186 is operable to categorize information (e.g., logging information) provided to the logging server 116 from client devices. In categorizing the information, the categorizer module 186 categorizes the information based on a level of authentication of the client device 104. This may take into consideration any one or more of a variety of factors, such as whether the client device 104 established a secure or insecure connection with the logging server 116, whether the client device 104 submitted assigned or default credentials, and whether the submitted credentials were valid or invalid.

As mentioned, the storage element 186 may include a variety of information, such as logging information 186A. Logging information 186A may include a variety of information that the client device 104 wishes to send to the logging server 116. This may include, e.g., information regarding the status of the device, the recent operation of the device, environmental conditions of the device, etc. In one particular embodiment, this may include client event logs (information about what the client device sensed), client debut logs (information about the systematic aspects of the device, such as when the device last rebooted, when the device last established a wireless connection, etc.), and system logs (e.g., standard Linux logs). In some embodiments, the logging information 186A may be stored based on the level of authenticity of the client device. That is, some information may be stored only if the client device has achieved at least a particular level of authenticity.

While described as independent modules, it should be recognized that the various modules and elements described with reference to the logging server 116 may be combined into one or more modules or further separated into one or more modules. The various modules may be implemented in software or hardware, and the storage element 186 may be implemented in any suitable fashion such as one or more databases on one or more disk drives, optical storage devices, solid-state storage devices such as random access memory ("RAM") and/or a read-only memory ("ROM"), and the like.

Various other characteristics, operations, and uses of the elements of the logging server 116 are further described herein. Further, it should be recognized that the logging server 116, while depicted as including a variety of modules and components, may include other elements for facilitating the operation of an electronic device as described herein. It will also be appreciated by those skilled in the art that the logging server 116 could operate equally well with fewer or a greater number of components than are illustrated in FIG. 7. Thus, the depiction of the logging server 116 in FIG. 7 should be taken as being illustrative in nature, and not limiting to the scope of the present teachings.

As mentioned, FIG. 8 depicts the contents of the storage element 118 according to an embodiment. The storage element 118 may be implemented in any suitable fashion such as one or more databases on one or more disk drives, optical storage devices, solid-state storage devices such as random access memory ("RAM") and/or a read-only memory ("ROM"), and the like. In this particular example, User A is associated with two devices, Device A and Device B. Storage element 118 includes buckets 190 associated with Device A, and includes buckets 192 associated with Device B. Other users, such as User B and User C, are associated with other buckets 194 and 196. As previously described, buckets 190A are relevant to Device A, while bucket 190B is not relevant to Device A. Further, Bucket S in this example is a bucket that is shared between Device A and Device B. The storage element 118 may include default credentials 198 of all devices known to the remote server 102. The storage element 118 may also include assigned credentials 199 for devices that assigned credentials have been generated for by the remote server 102.

While described including various buckets for various devices and users, it should be recognized that the depiction of storage element 118 in FIG. 8 is merely exemplary and used for the purposes of explanation. Embodiments are not to be limited to the contents or arrangement of buckets illustrated in and described with reference to FIG. 8. Rather, one of ordinary skill in the art would recognize the myriad of variations that could be used in a variety of implementations.

Figure 9:
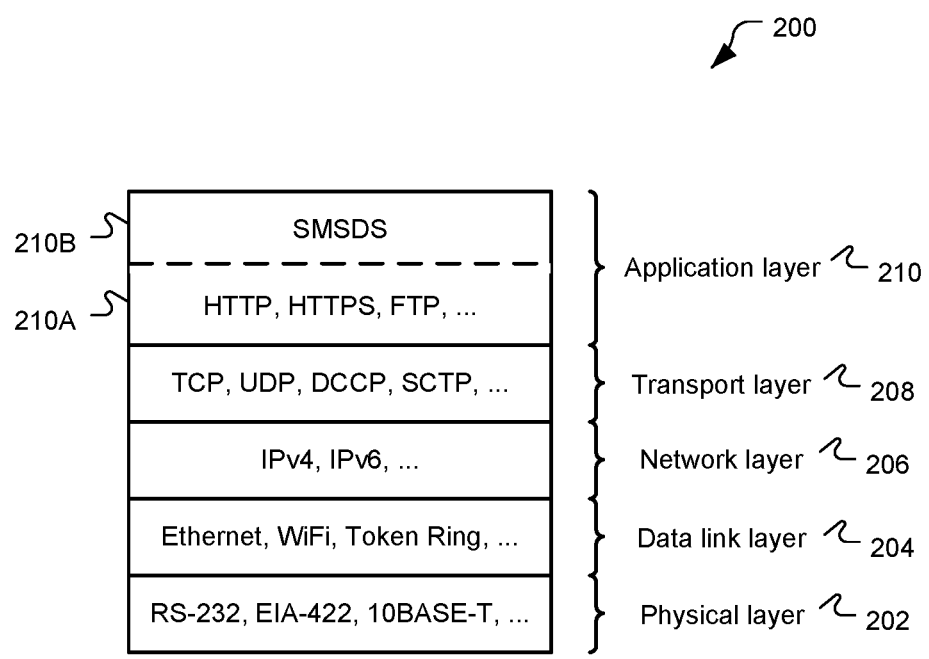
FIG. 9 shows a protocol stack incorporating the synchronization mechanisms described herein according to an embodiment.

FIG. 9 shows a protocol stack 200 incorporating the synchronization mechanisms described herein according to an embodiment. Generally, in some embodiments, the subscription-notification mechanisms for the distribution of distributed states (SMSDS) described herein is laid over top of the hypertext transfer protocol secure (HTTPS) stack in the transmission control protocol/internet protocol (TCP/IP) model.

Specifically, the protocol stack 200 includes a physical layer 202, a data link layer 204, a network layer 206, a transport layer 208, and an application layer 210. The physical layer 202 consists of basic networking hardware transmission technologies, such as RS-232, EIA-422, 10BASE-T, etc. The data link layer 204 transfers data between adjacent network nodes in a wide area network (WAN) or between nodes on the same local area network (LAN) segment, and uses technologies such as Ethernet, Wi-Fi, Token Ring, etc. The network layer 206 is responsible for packet forwarding and uses technologies such as the Internet Protocol (IPv4/IPv6/etc.). The transport layer 208 provides end-to-end communication services for applications and uses technologies such as TCP, user datagram protocol (UDP), datagram congestion control protocol (DCCP), stream control transmission protocol (SCTP), etc. The application layer 210 establishes process-to-process communications and includes a first layer 210A that uses technologies such as HTTP, HTTPS, file transfer protocol (FTP), etc., and a second layer 210B that implements SMSDS.

In one particular embodiment, SMSDS may use HTTP commands, such as GET, PUT, POST, and the like, where HTTP is commonly implemented over TCP. Various examples are disclosed herein using such commands. However, the scope of the disclose is not so limited, since in other embodiments SMSDS may be implemented over protocols other than TCP, such as UDP, DCCP, etc. Thus, the depiction of the protocol stack 200 in FIG. 9 should be taken as being illustrative in nature, and not limiting to the scope of the present teachings.

Figure 10:
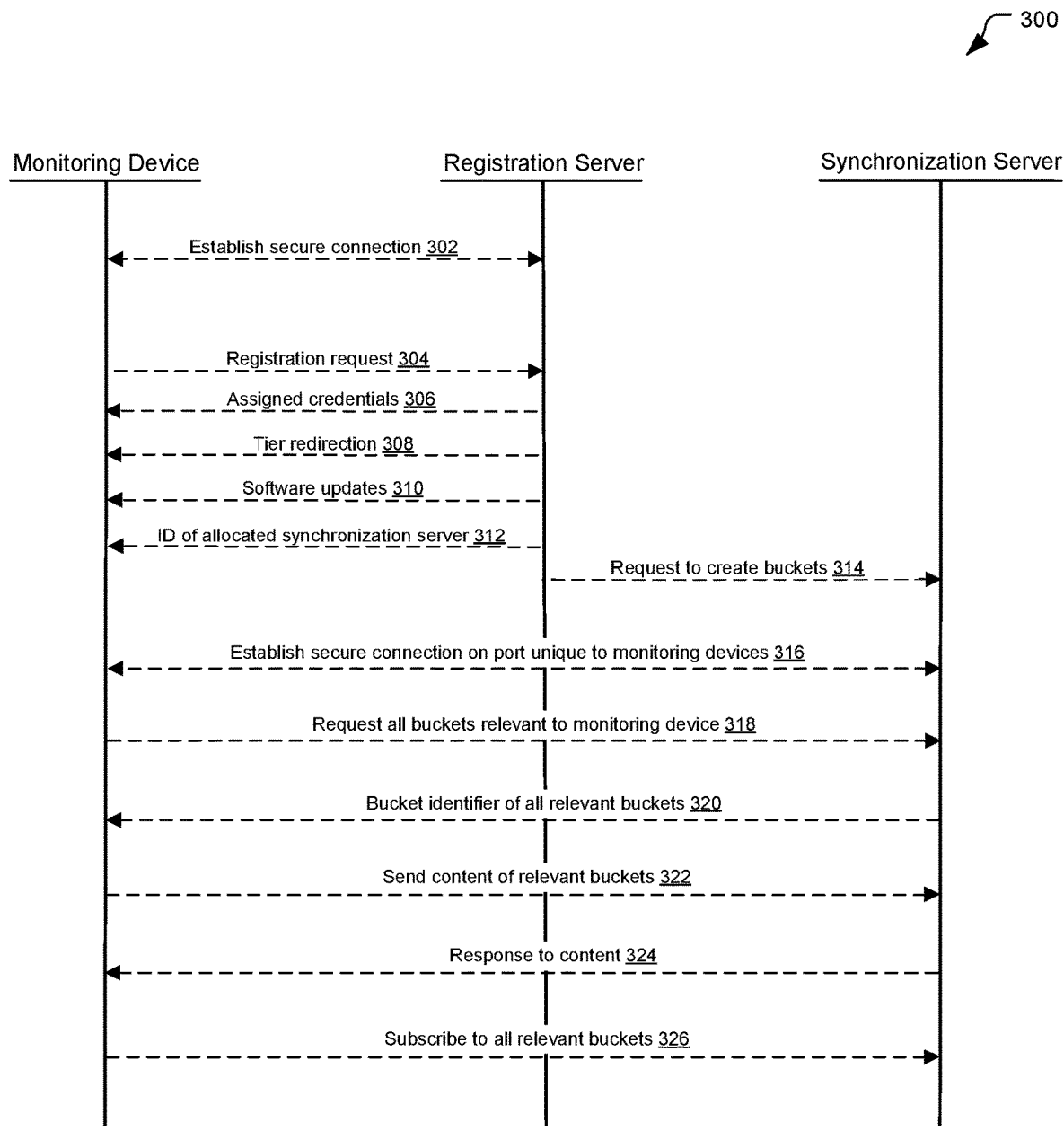
FIG. 10 illustrates a communication sequence of a process for connecting a monitoring device to a remote server according to an embodiment.

Processes for using Subscription-Based Notification to Facilitate the Synchronization of Distributed States FIG. 10 illustrates a communication sequence 300 of a process for connecting a monitoring device to a remote server according to an embodiment. To facilitate understanding, the process 300 is described with reference to FIG. 1 to FIG. 8, although it should be understood that embodiments of the process 300 are not limited to the exemplary systems and apparatus described with reference to FIG. 1 through FIG. 8.

Generally, a monitoring device 108 will perform a connection process in which it prepares for synchronization, and then synchronization processes in which it maintains steady-state with other entities of the system 100. There are two situations in which the monitoring device 108 performs a connecting process: (1) initial connection (e.g., when the monitoring device is first connected to the system 100 after installation, when the monitoring device is first connected to the system 100 after a reset, etc.); and (2) subsequent connection (e.g., when the monitoring device reconnects to the system 100 after a power outage, a communication problem, etc.). Nuances that may be implemented in various embodiments for the two situations are described with reference to FIG. 10

In operation 302, the monitoring device 108 establishes a secure connection with the registration server 112. The monitoring device 108 may initially identify the location (e.g., the URI) of the registration server 112 using, e.g., the registration server location 128A hardcoded in the monitoring device 108. Upon identifying the location of the registration server 112, a security module 120 of the monitoring device 108 may establish a secure connection with the registration server 112 via a security module 140 of the registration server 112. The security modules may perform handshaking, authentication (of the registration server 112), and encryption of subsequent communications, using one or more of a variety of security communication protocols such as TSL, SSL, and the like.

Once a secure connection has been established between the monitoring device 108 and the registration server 112, processing may continue to operation 304 where the monitoring device 104 communicates a registration request to the registration server 112. The registration request is a request to, among other things, be assigned to one of the synchronization servers 114A through 114M. The registration request may include one or more of a variety of information, such as the device identifier 128B, current software version 128C, etc. In one particular embodiment and as further described herein, the registration request may include default credentials for assisting in authenticating the monitoring device 108 to the registration server 112. For example, an authentication module 122 may identify default credentials 128E stored in the storage element 128 on the monitoring device 108 and communicate those credentials to the registration server 112.

In response to receiving the registration request, the registration server 112 performs a variety of operations, some of which are depicted and described with reference to operations 306 through 314. In one embodiment, and as also further described herein, the registration server 112 generates assigned credentials (i.e., credentials that are uniquely assigned to the monitoring device 108) based on the received default credentials and, in operation 306, communicates the assigned credentials back to the monitoring device 108. For example, the registration server 112 may use an authentication module 142 to verify the validity of the received default credentials, generate assigned credentials therefrom, and communicate the assigned credentials to the authentication module 122 of the monitoring device 108, which may then store the assigned credentials in the storage element 128 as assigned credentials 128F.

In another embodiment, the registration server performs tier redirection, in which the registration server 112 redirects the monitoring device 108 to another instance of the remote server 102 (by, e.g., redirecting the monitoring device 108 to another instance of the registration server 112). For example, the registration server 112 may use a tier redirection module 144 to determine whether the monitoring device 108 needs to be redirected and, if so, communicate the redirect target location (e.g., a URI) to the monitoring device 108. The monitoring device 108 may be redirected to another instance of the remote server 102 if the monitoring device 108 is executing unauthorized software, and/or the monitoring device 108 may be redirected to another instance of the system 100 if the monitoring device 108 is mapped to another instance of the system 100. To facilitate such redirection, the registration may use, e.g., the software version/tier map 150C in conjunction with the received current software version 128C, and/or the device ID/tier map 150D in conjunction with the received device identifier 128B.

In the event the monitoring device 108 is to be redirected to another instance of the system 100, in operation 308 the registration server 112 will communicate the redirect target location to the monitoring device 108. At that point, the monitoring device 108 will once again perform the connection process 300, but at the redirected target location. Otherwise, the connection process 300 may continue.

The registration server 112, in some embodiments, may initiate a software updating process to ensure that the monitoring device 108 is executing a desired version of software. While a number of different software updating processes may be implemented, in one particular embodiment the registration server 112 identifies the desired software version of the monitoring device 108 and a target location (e.g., a URI) where the monitoring device 108 may acquire the updated software, and communicates that information to the monitoring device 108. For example, the registration server 112 may use the software version/updater map 150B to identify this information and may subsequently communicate this information to the monitoring device 108 in operation 310.

In most embodiments, the registration server 112 identifies one of the plurality of synchronization servers 114A through 114M which is allocated to the monitoring device 108 and thus which performs synchronization on behalf of the monitoring device 108. Accordingly, in operation 312, the registration server 112 communicates the location identifier (e.g., a URI) of a specific one (i.e., an allocated one) of the synchronization servers 114A through 114M. In other embodiments, however, there may be only one synchronization server. In which case the registration server 112 may communicate the location of that one synchronization server to the monitoring device 108 in operation 312 or, in other embodiments, the location of that synchronization server may be pre-stored on the monitoring device 108.

Once the registration server 112 has communicated the identity of an allocated synchronization server to the monitoring device 108, processing may continue to operation 314 where the registration server 112 requests the allocated synchronization server 114 to create buckets for the monitoring device 108. The request may include various information for instructing the synchronization server 114 to create the appropriate buckets. For example, the request may include the device identifier 128B of the monitoring device 108 which a bucket generator 168 in the synchronization server 114 may then use to create suitable buckets in the storage element 118. It should be recognized that operation 314 need not follow operation 312, but rather could be performed at any other suitable time after receiving or generating information for instructing the synchronization server 114 to create the appropriate buckets, for example anytime after receiving the device identifier 128B.

Once the monitoring device 108 acquires the location of the allocated synchronization server, the monitoring device 108 may then establish communications with the allocated synchronization server. In one embodiment, the monitoring device 108 establishes a secure connection with the synchronization server as illustrated in operation 316 using, e.g., a security module 120. The allocated synchronization server 114 may similarly use a security module 160 to establish the secure connection where the secure connection may be similar to that described with reference to operation 302, except in this case the secure connection may operate to authenticate the identity of the synchronization server 114, rather than the registration server 112, to the monitoring device 108. In at least one embodiment, the secure connection may be established using a port of the synchronization server 114 that is unique to monitoring devices. In such a case, the synchronization server 114 may identify the class of device connecting thereto via the connection port which the device connected to. In some embodiments, the port may be unique to a particular type of monitoring device, or to a particular version of software executing on a monitoring device. In such cases, the synchronization server 114 may identify not only whether the device connected thereto is a monitoring device, but also the type of monitoring device, the version of software (e.g., operating system) running on the monitoring device, etc.

Once a secure connection has been established between the monitoring device 108 and the allocated synchronization server 114, processing may continue to operation 318 where the monitoring device 108 requests all buckets that are relevant to it. Relevant buckets in this context are those that are to be synchronized between the monitoring device 108 and other elements of the system 100, such as the synchronization server 114.

Once the synchronization server 114 identifies the buckets that are relevant to the monitoring device 108 using, e.g., a relevant bucket identifier 166 and a device identifier/bucket map 178C, the synchronization server 114 may communicate the bucket identifier for each of the relevant buckets to the monitoring device 108 as depicted in operation 320. In some embodiments, different information may be communicated to the monitoring device 108 based on whether it is an initial connection or subsequent connection. If it is an initial connection between the monitoring device 108 and the synchronization server 114 (a determination that the synchronization server 114 may perform), then the buckets for the monitoring device 108 that are located at the storage element 118 will not be populated. That is, they will be newly created buckets, and thus their contents will effectively be empty or otherwise void, and in embodiments where timestamps and/or version identifiers are implemented, the timestamps and/or version identifiers of the buckets at the storage element 118 may similarly be null or void. Accordingly, with respect to the relevant buckets at the storage element 118, the synchronization server 114 may communicate only the device identifiers for the relevant buckets to the monitoring device 108 as already mentioned. However, if it is a subsequent connection, then the buckets at storage element 118 may be populated with content and, in some embodiments, timestamps and/or version identifiers. Accordingly, for subsequent connections the synchronization server 114 may, in operation 320, respond with not only bucket identifiers for the relevant buckets but also bucket content, timestamps, and/or version identifiers.

Operation 322 may also be implemented differently depending on whether the connection between the monitoring device 108 and the synchronization server 114 is an initial connection or a subsequent connection. If it is an initial connection, then the buckets at the synchronization server 114 will effectively be empty, whereas the buckets at the monitoring device 108 may be populated. The buckets at the monitoring device 108 may be populated from sensors, user input, default values, or in other fashions. In such a case, to place the synchronization server 114 at the same initial state as the monitoring device 108, the monitoring device 108 communicates the content of the relevant buckets (i.e., those identified in operation 320) to the synchronization server 114. In embodiments where timestamps and/or version identifiers are used, at this initial state the buckets at the monitoring device 108 will not yet be associated with timestamps and/or version identifiers as timestamps and/or version identifiers, in many embodiments, are assigned by the synchronization server upon receiving bucket content. Accordingly, during the initial connection, in operation 322, with respect to the buckets at the monitoring device 108, the monitoring device 108 may communicate only the bucket contents (and, e.g., the bucket identifiers so as to facilitate bucket identification at the synchronization server 114) to the synchronization server.

On the other hand, if it is a subsequent communication, the buckets at both of the monitoring device 108 and the synchronization server 114 should have contents and, in some embodiments, should also have timestamps and/or version identifiers (although they may not be identical in the case, e.g., the synchronization server was updated while the monitoring device was offline, or the monitoring device was updated prior to reconnecting to the synchronization server). Accordingly, the monitoring device 108 need not communicate all of its bucket contents to the synchronization server 114 (although in some embodiments it may do so). Rather, the monitoring device 108 may determine whether it has newer buckets than those at the synchronization server 114 and, if so, may communicate only the contents of the newer buckets. In some cases, even if the monitoring device 108 has newer buckets, it may not communicate any content to the synchronization server 114.

In response to receiving either all content or only newer content, the synchronization server 114 may generate and communicate a response as depicted in operation 324. In response to receiving bucket content the synchronization server 114, in some embodiments, generates a timestamp for the buckets (using, e.g., a timestamp generator 172), and/or generates a version identifier for the buckets (using, e.g., a version generator 170). The synchronization server 114 may then assign the generated timestamp and/or version identifier to the buckets and communicate each assigned timestamp and/or version identifier (in addition to bucket identifiers that are associated with the timestamp and/or version identifiers) back to the monitoring device 108. The monitoring device 108 may then assign the received timestamp and/or version identifiers to its own buckets so that a state of the buckets at the monitoring device 108 (e.g., the content, timestamp, and version identifier of the relevant buckets at the monitoring device 108) is identical to the state of the buckets at the synchronization server 114 (e.g., the content, timestamp, and version identifier of the relevant buckets at the storage element 118).

Once this initial state synchronization is completed, the monitoring device 108 then subscribes to all relevant buckets with the synchronization server 114. That is, the monitoring device 108 may communicate, to the synchronization server 114, a request to subscribe to all relevant buckets as depicted in operation 326. The monitoring device 108 may identify the relevant buckets to subscribe to based on the identification of relevant buckets provided thereto in operation 320. By subscribing to the relevant buckets, the monitoring device 108 requests to be notified, by the synchronization server 114, of any changes to the relevant buckets at the synchronization server 114.

In one particular embodiment, the subscription request may be implemented using long polling. That is, the synchronization server 114 may hold onto the subscription request (i.e., not respond to the request) until a change to one of the relevant buckets is made at or communicated to the synchronization server 114 or, in some embodiments, until a timeout period is reached. In this fashion, the monitoring device 108 may be well-suited to significantly reduce its operational power, as it may need to perform communications (e.g., power-consuming wireless communications) with the synchronization server 114 periodically (i.e., it may need to only communicate subscription requests periodically). The timeout period (and thus the period during which the monitoring device 108 needs to communicate new subscription requests to avoid a reconnection process through the registration server 112) may be set to balance between power efficiency and estimations of communication reliability. For example, the timeout period may be 15 minutes, 30 minutes, 60 minutes, 75 minutes, 90 minutes, in a range from 15 to 90 minutes, less than 15 minutes or greater than 90 minutes. Once the timeout period expires, in many embodiments the synchronization server 114 will communicate information indicating the end of the timeout period to the client device 104. For example, the synchronization server 114 may send an HTTP 200 status code to the client device 104. It should be recognized that while in some embodiments if the timeout period expires the client device 104 may subsequently begin a re-initialization process (e.g., as described with reference to FIG. 10), in other embodiments the client device 104 may first attempt to re-subscribe to its relevant buckets (e.g., as described in operation 326) to maintain the long polling.

In some embodiments, the monitoring device 108 may wish to unsubscribe from receiving notifications of changes to its relevant buckets. To do so, the monitoring device 108 needs only to close its connection to the synchronization server 114. For example, in embodiments where the techniques described herein are implemented in HTTP/TCP, the monitoring device 108 needs only to close the HTTP/TCP connection to the synchronization server 114. Further, in embodiments where HTTP/TCP protocols are implemented, suitable HTTP commands may be used to facilitate the subscription request. For example, the subscription request may be implemented using an HTTP POST command such as "POST/subscribe". Further yet, in some embodiments, session identifiers may be implemented, where a session identifier identifies a unique communication session between a monitoring device 108 and the synchronization server 114. In such embodiments, the monitoring device 108 may generate a session identifier (using, e.g., a session ID generator module 126) and communicate the session identifier to the synchronization server 114 together with the subscription request.

It should be appreciated that the specific operations illustrated in FIG. 10 provide a particular process for connecting a monitoring device to a remote server according to an embodiment. Other sequences of operations may also be performed according to alternative embodiments. For example, alternative embodiments of the present invention may perform the operations outlined above in a different order. Moreover, the individual operations illustrated in FIG. 10 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 11:
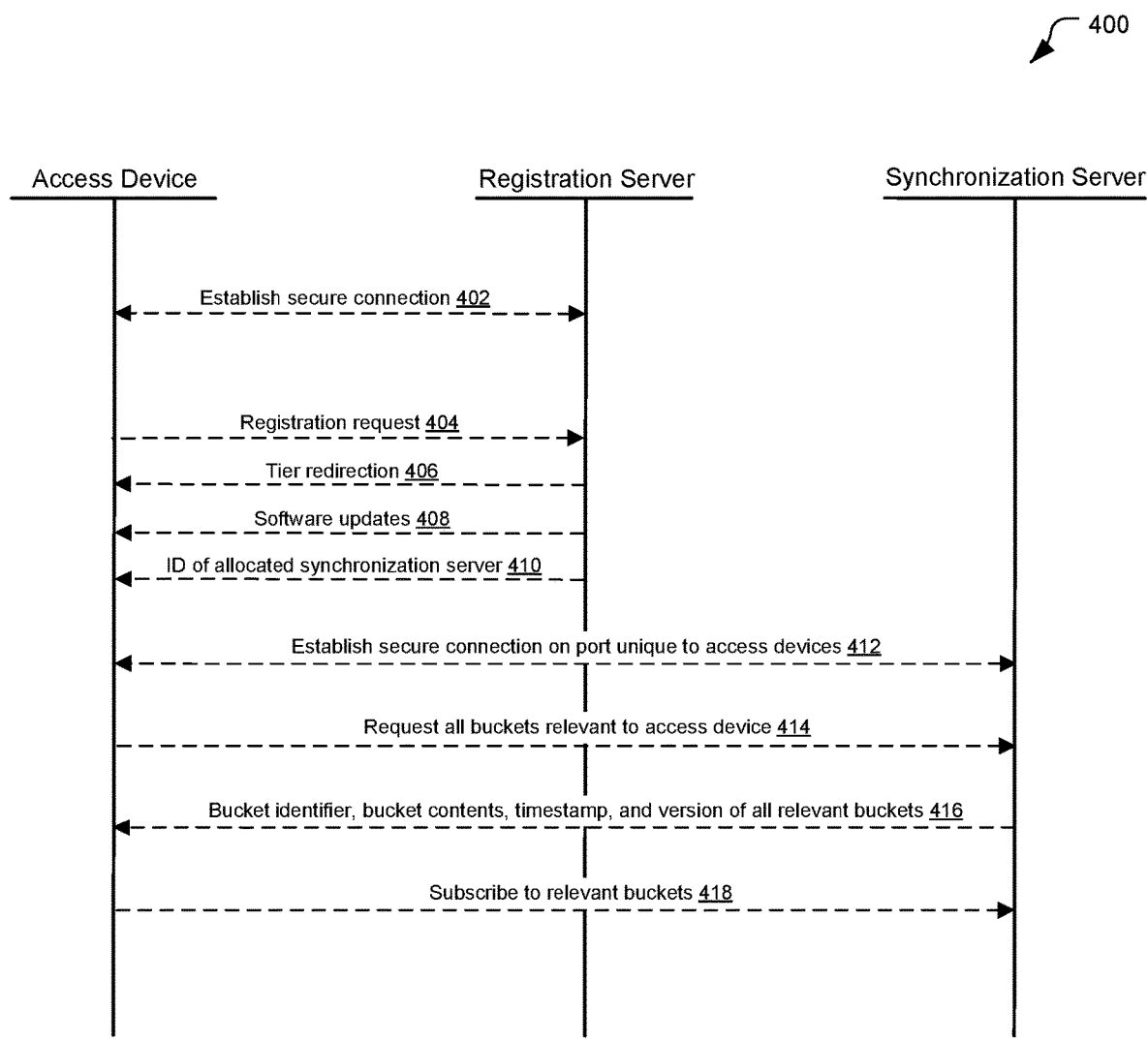
FIG. 11 illustrates a communication sequence of a process for connecting an access device to a remote server according to an embodiment.

FIG. 11 illustrates a communication sequence 400 of a process for connecting an access device to a remote server according to an embodiment. To facilitate understanding, the process 400 is described with reference to FIG. 1 to FIG. 8, although it should be understood that embodiments of the process 400 are not limited to the exemplary systems and apparatus described with reference to FIG. 1 through FIG. 8.

In contrast to the monitoring device 108, which is the 'owner' of bucket content (i.e., it generates bucket content by default), the access device 110 generally accesses and, in some embodiments, alters the contents of the buckets of the monitoring device 108. Nevertheless, like the monitoring device 108, the access device 110 will also perform a connection process in which it prepares for synchronization, and then synchronization processes in which it maintains steady-state with other entities of the system 100.

On startup (e.g., on powering of the access device, opening a web browser, executing a software application, etc.), the access device 110 establishes a secure connection with the registration server 112 as depicted in operation 402. Operation 402 is similar to operation 302, except in this case the registration server location 128A may not necessarily be hard coded into the access device 110, but rather could be part of a software application installed thereon. As a result of establishing the secure connection, subsequent communications may be encrypted and the identity of the registration server 112 may be authenticated to the access device 110. It should be recognized that although in this embodiment the access device 110 establishes a secure connection with the same registration server 112 as the monitoring device 108 as described with reference to FIG. 9, in other embodiments there may be multiple registration servers with similar functionality, where access devices use one registration server and monitoring devices use a different registration server.

The access device 110 may then communicate a registration request to the registration server 112 as depicted in operation 404, which is similar to operation 304. However, in this case, the access device 110 may not have a device identifier hard coded therein. Rather, in some embodiments, a user may enter a user identifier (e.g., a login name) as the device identifier which is subsequently communicated as part of the registration request. The registration server 112 may then perform a variety of operations such as tier redirection (operation 406, which is similar to operation 308), software updating (operation 408, which is similar to operation 310), and identification of an allocated synchronization server (operation 410, which is similar to operation 312). In many embodiments, the access device 110 may be associated with one or more monitoring devices 108. For example, both the access device 110 and one or more monitoring devices 108 may be paired with the same user account. Various techniques for performing pairing operations are described in U.S. Ser. No. 13/275,311, supra. In such cases, the synchronization server allocated to the access device(s) 110 may be the same as the synchronization server allocated to the associated monitoring device(s).

Once the access device 110 acquires the target location of the allocated synchronization server, the access device 110 may then establish communications with the allocated synchronization server. In one embodiment, the access device 110 establishes a secure connection with the synchronization server as illustrated in operation 412, which is similar to operation 316. In this case, however, the secure connection may be established using a port of the synchronization server 114 that is unique to access devices. In such a case, the synchronization server 114 may be operable to identify the class of access device connecting thereto via the connection port. In some embodiments, the port may be unique to a particular type of access device, or to a particular version of software executing on a access device. In such cases, the synchronization server 114 may identify not only whether the device connected thereto is an access device (in contrast to a monitoring device or other type of client device), but also the type of access device, the version of software (e.g., operating system) running on the access device, etc.

Once a secure connection has been established, processing may continue to operation 414 where the access device 110 requests all buckets that are relevant to it. Relevant buckets in this context are those that are to be synchronized between the access device 110 and other elements of the system 100, such as one or more monitoring devices 108. In some embodiments, the relevant buckets here may be the same as those that are relevant to the paired monitoring device(s). However, in other embodiments, the relevant buckets here may be a subset of those that are relevant to the paired monitoring device(s). For example, on initialization, the access device 110 may not request all relevant buckets due to, e.g., bandwidth constraints. Thus, the access device 110 may not request buckets that have a relatively large number of field-value pairs. In some cases, the buckets that are not requested on initialization may subsequently be requested. For example, where the access device implements a tabbed graphical user interface (GUI), the initial tab displayed to the user may reflect data for buckets that are requested on initialization. When the user switches to a different tab, the access device may then submit a request for buckets needed to reflect data requested as part of the different tab.

Once the synchronization server 114 identifies the buckets that are relevant to the access device 110 using, e.g., a relevant bucket identifier 166 and a device identifier/bucket map 178C, the synchronization server 114 may communicate the bucket contents (and bucket identifier for identifying the buckets associated with the those contents) for each of the relevant buckets to the access device 110 as depicted in operation 416. In embodiments where timestamps and/or version identifiers are used, those may also be communicated to the access device 110. In many embodiments, the bucket contents are communicated during each initialization as depicted in FIG. 11 since those contents may be erased or otherwise made void in the event the access device 110 closes its connection with the synchronization server 114 (e.g., if the access device 110 is powered off, a web browser window closed, application software processes ended, etc.)

However, in other embodiments, indications of the current state of the buckets (e.g., bucket versions) could be communicated instead of the bucket contents, and the access device 110 could determine whether the buckets stored at the synchronization server 114 are newer than those stored at the access device 110. The access device 110 may subsequently request and receive bucket contents only if the contents of the buckets are newer at the synchronization server 114 than at the access device 110.

Once this initial state synchronization is completed, the access device 110 then subscribes to all relevant buckets with the synchronization server 114 as depicted in operation 418. This is similar to operation 326, but in this case the access device 110 may subscribe to all relevant buckets or, as described above, a subset of the relevant buckets.

It should be appreciated that the specific operations illustrated in FIG. 11 provide a particular process for connecting an access device to a remote server according to an embodiment. Other sequences of operations may also be performed according to alternative embodiments. For example, alternative embodiments of the present invention may perform the operations outlined above in a different order. Moreover, the individual operations illustrated in FIG. 11 may include multiple sub-operations that may be performed in various sequences as appropriate to the individual operations. Furthermore, additional operations may be added or existing operations removed depending on the particular applications. For example, access devices may not receive software updates from the registration server as described with reference to operation 408, but rather may receive software updates in other fashions such as by user-instigated or operating system-instigated downloads from a software repository. For another example, access devices may not engage in tier redirection (i.e., operation 406). One of ordinary skill in the art would recognize and appreciate many variations, modifications, and alternatives.

Figure 12:
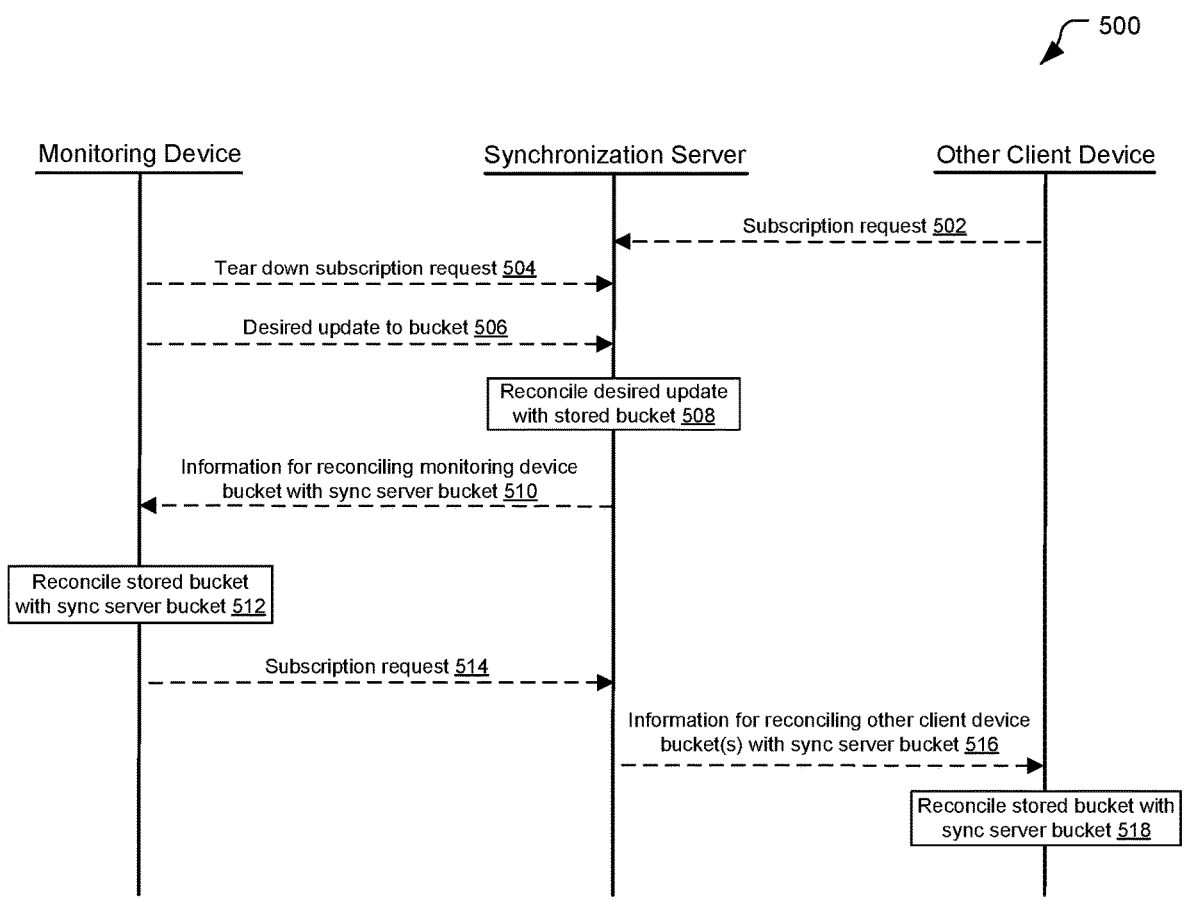
FIG. 12 illustrates a communication sequence of a process for synchronizing states across entities of a system when a change in state is instigated at a monitoring device of the system according to an embodiment.

FIG. 12 illustrates a communication sequence 500 of a process for synchronizing states across entities of a system when a change in state is instigated at a monitoring device of the system according to an embodiment. In this particular example, a state of a bucket is modified at a monitoring device 108, synchronized with a state of a corresponding bucket in the storage element 118, and synchronized with corresponding buckets at other client devices such as other monitoring devices and/or one or more access devices. To facilitate understanding, the process 500 is described with reference to FIG. 1 to FIG. 8, although it should be understood that embodiments of the process 500 are not limited to the exemplary systems and apparatus described with reference to FIG. 1 through FIG. 8.

In operation 502, another client device (e.g., an access device 110) that is associated with the monitoring device 108 communicates a subscription request to the synchronization server 114, where the request is to subscribe to a bucket which is provided at the monitoring device 108.

In operation 504, the monitoring device 108, having received (by a user, by an algorithm provided in the monitoring device 108, etc.) a desired update to a bucket that it previously subscribed to, tears down its subscription request that includes the bucket for which it desires to update. The monitoring device 108 may tear down its subscription request in one or more of a variety of fashions. For example, in operation 326, when the monitoring device 108 subscribes to buckets that are relevant to it, the subscription request may be communicated on a particular socket via a long polling process. The monitoring device 108 may then close that particular socket and perform further communications with the synchronization server 114 on another socket. For another example, the monitoring device 108 may communicate a subscription cancellation request to the synchronization server 114 that requests the synchronization server 114 to stop notifying the monitoring device 108 of changes to the bucket(s) identified in the request (e.g., relevant buckets).

Once the subscription request is torn down, the monitoring device 108 communicates its desired bucket update to the synchronization server in operation 506. The desired update may include new bucket contents and a bucket identifier that identifies the bucket associated with the new contents. In some cases, the monitoring device 108 may include other information, such as a timestamp and/or version identifier, together with the desired update.

Upon receiving the desired bucket update, the synchronization server 114 reconciles the desired bucket update with the corresponding bucket stored at the storage element 118 in operation 508. By reconciling the desired update with the corresponding bucket at the storage element 118, the synchronization server 114 may accept the desired update or reject the desired update. In accepting the desired update the synchronization server may merge the update into the corresponding bucket at the storage element 118 or, in some cases, may entirely overwrite the contents of the corresponding bucket at the storage element 118 with the desired update. Since the synchronization server 114 may accept or reject the desired update, the resulting contents of the bucket at the synchronization server 114 may be as expected by the monitoring device 108 (if the desired update was accepted) or may be different than that expected by the monitoring device 108 (if the desired update was rejected). Such reconciliation may be performed, e.g., via the reconciliation module 174.

Once the desired update is reconciled with the corresponding bucket stored at the storage element 118, in operation 510 the synchronization server communicates, to the monitoring device 108, information for reconciling the monitoring device bucket with the corresponding bucket at the storage element 118. This may include information acknowledging acceptance or indicating rejection of the desired update. This may also or alternatively include information such as a new timestamp, a new version identifier, and in some cases, new content for the bucket at the monitoring device.

In response to receiving such information, in operation 512 the monitoring device 108 reconciles its stored bucket with the corresponding bucket at the storage element 118. For example, if the desired update was accepted, the monitoring device may receive and apply a new timestamp and/or version identifier to its existing bucket. If the desired update was rejected, however, and new bucket contents were sent from the synchronization server 114, the monitoring device 108 may overwrite (or merge into) its existing bucket contents with those received from the synchronization server 114, and apply a new timestamp and/or version identifier as received from the synchronization server 114. Such reconciliation may be performed, e.g., via the reconciliation module 124. As a result of this reconciliation, the state of the buckets at the monitoring device 108 should be identical to the state of the buckets at the synchronization server 114 (i.e., the corresponding buckets in the storage element 118).

In operation 514, the monitoring device 108 may once again communicate a subscription request to the synchronization server, similar to operation 326. It should be recognized, however, that the tearing down and re-communication of a subscription request is purely optional, as in some embodiments such operations may be omitted in part or in whole.

Once the synchronization server 114 has reconciled the desired update with its own corresponding bucket, the synchronization server 114 may then communicate reconciliation information not only to the monitoring device but also to other devices that are subscribed to that bucket at the storage element 118. For example, since in this case another client device has a pending subscription request for the bucket (as a result of operation 502), the synchronization server may, in operation 516, communicate information to the other client device for reconciling the other client device bucket with the corresponding bucket at the synchronization server 114. Such a communication is particularly well-suited for situations where the desired update was accepted, but may be omitted where the state of the bucket at the synchronization server remains unchanged despite receiving a desired update from the monitoring device 108.

In the event that reconciliation information is communicated to the other client device, then in operation 518 the other client device may use that information to reconcile its own stored bucket with the corresponding bucket at the synchronization server 114. As a result, a state of the bucket at the other client device should be identical not only to a state of the bucket at the synchronization server 114 but also a state of the corresponding bucket at the monitoring device 108.

It should be appreciated that the specific operations illustrated in FIG. 12 provide a particular process for synchronizing states across entities of a system when a change in state is instigated at a monitoring device of the system according to an embodiment. Other sequences of operations may also be performed according to alternative embodiments. For example, alternative embodiments of the present invention may perform the operations outlined above in a different order. In one particular embodiment, operation 516 may be performed immediately after operation 508 and/or simultaneously with operation 510. Moreover, the individual operations illustrated in FIG. 12 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 13:
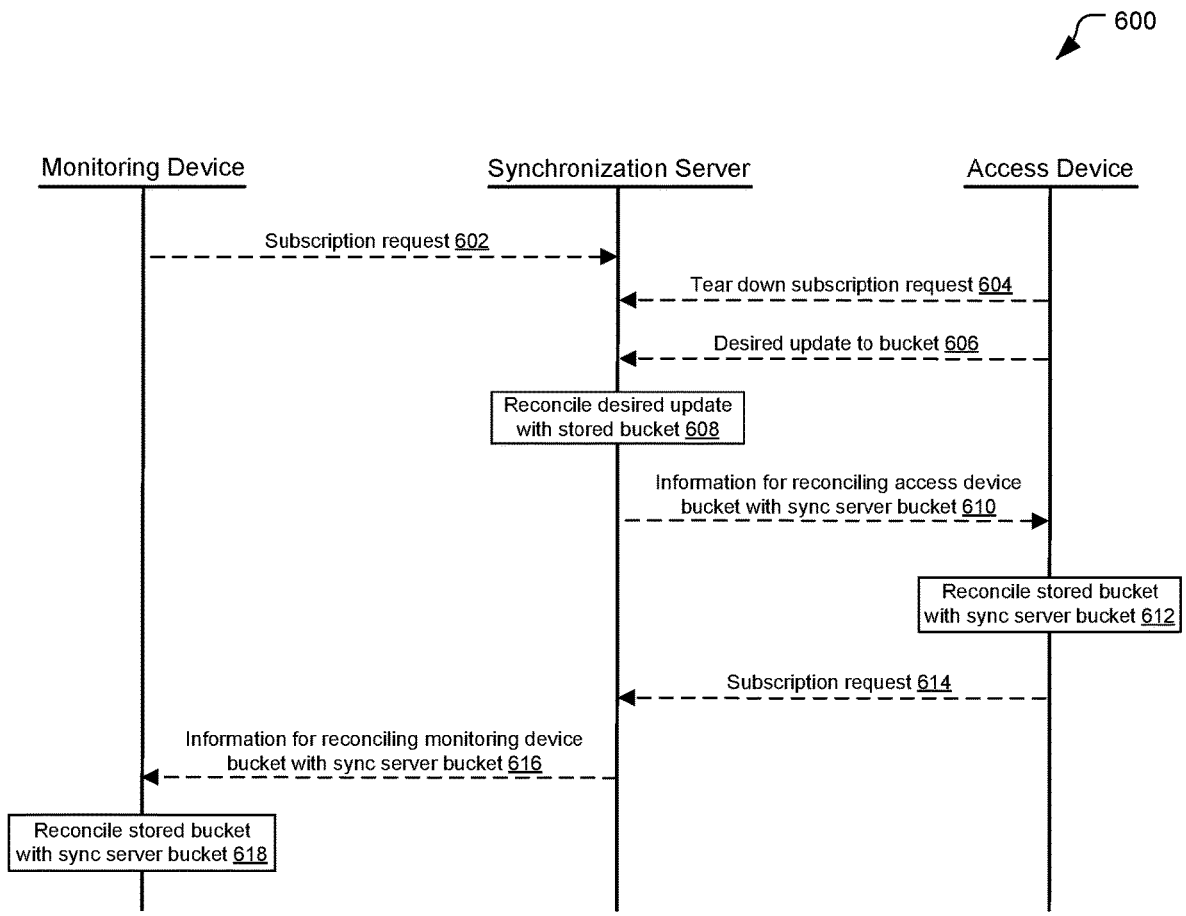
FIG. 13 illustrates a communication sequence of a process for synchronizing states across entities of a system when a change in state is instigated at an access device of the system according to an embodiment.

FIG. 13 illustrates a communication sequence 600 of a process for synchronizing states across entities of a system when a change in state is instigated at an access device of the system according to an embodiment. In this particular example, a state of a bucket is modified at an access device 110, synchronized with a state of a corresponding bucket in the storage element 118, and synchronized with corresponding buckets at an associated monitoring device 108. To facilitate understanding, the process 600 is described with reference to FIG. 1 to FIG. 8, although it should be understood that embodiments of the process 600 are not limited to the exemplary systems and apparatus described with reference to FIG. 1 through FIG. 8.

In operation 602, a monitoring device 108 communicates a subscription request to the synchronization server 114, where the request is to subscribe to a bucket which the associated access device 110 desires to change.

In operation 604, the access device 110, having received (e.g., by a user of the access device) a desired update to a bucket provided at the monitoring device 108 and that it previously subscribed to, tears down its subscription request that includes the bucket for which it desires to update. The access device 110 may tear down its subscription request in one or more of a variety of fashions, similar to those described with reference to FIG. 12.

Once the subscription request is torn down, the access device 110 communicates its desired bucket update to the synchronization server in operation 606. The desired update may include new bucket contents and a bucket identifier that identifies the bucket associated with the new contents. In some cases, the access device 110 may include other information, such as a timestamp and/or version identifier, together with the desired update.

Upon receiving the desired bucket update, the synchronization server reconciles the desired bucket update with the corresponding bucket stored at the storage element 118 in operation 608. By reconciling the desired update with the corresponding bucket at the storage element 118, the synchronization server 114 may accept the desired update or reject the desired update, and may merge or replace the contents of the bucket at storage element 118, similar to that described with reference to operation 508. Such reconciliation may be performed, e.g., via the reconciliation module 174.

Once the desired update is reconciled with the corresponding bucket stored at the storage element 118, the synchronization server communicates, to the access device 110, information for reconciling the access device bucket with the corresponding bucket at the storage element 118. This may include information acknowledging acceptance or indicating rejection of the desired update. This may also or alternatively include information such as a new timestamp, a new version identifier, and in some cases, new content for the bucket.

In response to receiving such information, in operation 612 the access device 110 reconciles its stored bucket with the corresponding bucket at the storage element 118. For example, if the desired update was accepted, the access device may receive and apply a new timestamp and/or version identifier to its existing bucket. If the desired update was rejected, however, and new bucket contents were sent from the synchronization server 114, the access device 110 may overwrite (or merge into) its existing bucket contents with those received from the synchronization server 114, and apply a new timestamp and/or version identifier as received from the synchronization server 114. Such reconciliation may be performed, e.g., via the reconciliation module 124. As a result of this reconciliation, the state of the buckets at the access device 110 should be identical to the state of the buckets at the synchronization server 114 (i.e., the corresponding buckets in the storage element 118).

In operation 614, the access device 110 may once again communicate a subscription request to the synchronization server, similar to operation 418. It should be recognized, however, that the tearing down and re-communication of a subscription request is purely optional, as in some embodiments such operations may be omitted in part or in whole.

Once the synchronization server 114 has reconciled the desired update with its own corresponding bucket, the synchronization server 114 may then communicate reconciliation information not only to the access device but also to other devices that are subscribed to that bucket, including one or more monitoring devices. For example, since in this case the monitoring device 108 has a pending subscription request for the bucket (as a result of operation 602), the synchronization server may, in operation 616, communicate information to the monitoring device 108 for reconciling the monitoring device 108 bucket with the corresponding bucket at the synchronization server 114. Such a communication is particularly well-suited for situations where the desired update was accepted, but may be omitted where the state of the bucket at the synchronization server remains unchanged despite receiving a desired update from the access device 110.

In the event that reconciliation information is communicated to the monitoring device 108, then in operation 618 the monitoring device 108 may use that information to reconcile its own stored bucket with the corresponding bucket at the synchronization server 114. As a result, a state of the bucket at the monitoring device 108 should be identical not only to a state of the bucket at the synchronization server 114 but also a state of the corresponding bucket at the access device 110.

It should be appreciated that the specific operations illustrated in FIG. 13 provide a particular process for synchronizing states across entities of a system when a change in state is instigated at an access device of the system according to an embodiment. Other sequences of operations may also be performed according to alternative embodiments. For example, alternative embodiments of the present invention may perform the operations outlined above in a different order. Moreover, the individual operations illustrated in FIG. 13 may include multiple sub-operations that may be performed in various sequences as appropriate to the individual operations. In one particular embodiment, operation 616 may be performed immediately after operation 608 and/or simultaneously with operation 610. Furthermore, additional operations may be added or existing operations removed depending on the particular applications. One of ordinary skill in the art would recognize and appreciate many variations, modifications, and alternatives.

Figure 14:
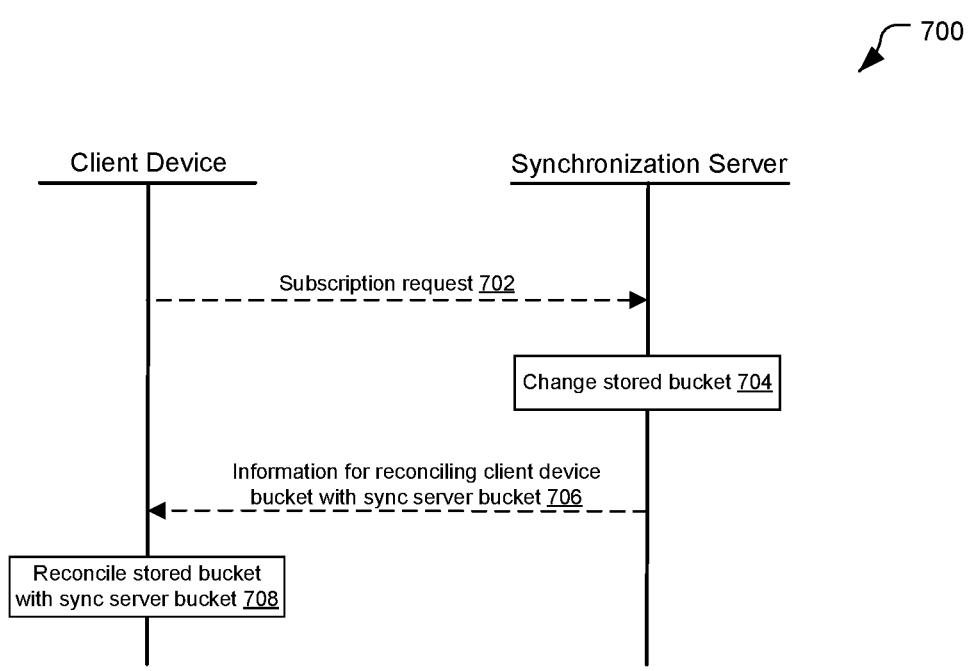
FIG. 14 illustrates a communication sequence of a process for synchronizing states across entities of a system when a change in state is instigated at a synchronization server of the system according to an embodiment.

FIG. 14 illustrates a communication sequence 700 of a process for synchronizing states across entities of a system when a change in state is instigated at a synchronization server of the system according to an embodiment. In this particular example, a state of a bucket is modified at a synchronization server 102 and synchronized with a state of a corresponding bucket at one or more client devices 104. To facilitate understanding, the process 700 is described with reference to FIG. 1 to FIG. 8, although it should be understood that embodiments of the process 700 are not limited to the exemplary systems and apparatus described with reference to FIG. 1 through FIG. 8.

In operation 702, a client device (e.g., one or more monitoring devices 108 and/or one or more access devices 110) communicates a subscription request to the synchronization server 114, where the request is to subscribe to a bucket which is provided at the synchronization server 102 (e.g., in the storage element 118).

In operation 704, the synchronization server 102 changes a state of the subscribed bucket. For example, the synchronization server 102 may alter the contents of the bucket at remote server 102 in response to one or more algorithms executing at the synchronization server 102.

Once the state of a bucket is changed at the synchronization server 102, the synchronization server may identify the client device(s) that are subscribed to the bucket. This may be done, e.g., via reconciliation module 174. In operation 706, the synchronization server 706 then communicates, to the identified client device(s), information for reconciling the client device bucket with the corresponding bucket at the storage element 118. This may include information such as a new timestamp, a new version identifier, and in many cases, new content for the bucket.

In response to receiving such information, in operation 708 the client device 104 reconciles its stored bucket with the corresponding bucket at the storage element 118. For example, the client device 104 may overwrite (or merge into) its existing bucket contents with those received from the synchronization server 114, and apply a new timestamp and/or version identifier as received from the synchronization server 114. Such reconciliation may be performed, e.g., via the reconciliation module 124. As a result of this reconciliation, the state of the buckets at the client device 104 should be identical to the state of the buckets at the synchronization server 114 (i.e., the corresponding buckets in the storage element 118).

It should be appreciated that the specific operations illustrated in FIG. 14 provide a particular process for synchronizing states across entities of a system when a change in state is instigated at a synchronization server of the system according to an embodiment. Other sequences of operations may also be performed according to alternative embodiments. For example, alternative embodiments of the present invention may perform the operations outlined above in a different order. Moreover, the individual operations illustrated in FIG. 14 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

FIG. 15A illustrates a communication sequence 800 of a process for performing tier redirection such as that described in operation 308 and/or 406 according to an embodiment. To facilitate understanding, the process 800 is described with reference to FIG. 1 to FIG. 8, although it should be understood that embodiments of the process 800 are not limited to the exemplary systems and apparatus described with reference to FIG. 1 through FIG. 8.

As described, tier redirection may be performed based on one or more of a device identifier and a software version. Accordingly, in operation 802, a client device 104 may provide a device identifier (e.g., device identifier 128B) and/or a current software version (e.g., current software version 128C) to the registration server. In response to determining that the client device 104 needs to be redirected to another instance of the system 100, in operation 804 the registration server 112 redirects the client device 104 to a secondary registration server (i.e., another instance of the registration server 112). For example, the registration server 112 may communicate a target location (e.g., a URI) of the secondary registration server to the client device 104. The client device 104 may then perform an initialization process (e.g., such as that described with reference to FIG. 10 or FIG. 11) with the secondary registration server.

FIG. 15B is a flowchart of a process 810 for a client device to perform tier redirection according to an embodiment. In operation 812, the client device 104 sends a device identifier and/or a software version to the registration server. In operation 814, the client device 104 determines whether it receives a redirect. If not, processing continues to operation 816, where the client device 104 continues its initialization process. If so, processing continues to operation 818, where the client device 104 begins a new initialization process with the secondary registration server.

FIG. 15C is a flowchart of a process 820 for a registration server to perform tier redirection according to an embodiment. In operation 822, the registration server 112 receives a device identifier and/or a software version identifier from the client device 104. In operation 824, the registration server determines a tier of the client device 104. For example, the received device identifier may be compared to the device identifier/tier map 150D and/or the software version identifier with the software version/tier map 150C. The tier maps may indicate a tier that the client device belongs to based on the software version and/or device identifier, and thus may indicate whether the client device should be redirected to another instance of the system 100. If it is determined that a redirect is not required, then processing continues to operation 828, where the registration server 820 continues the initialization process with the client device 104. Otherwise, processing continues to operation 830, where the registration server 830 redirects the client to the secondary registration server 830. In some embodiments, one or more of the operations described with reference to the registration server 112 may be performed by a suitable software or hardware module in the registration server 112, such as the tier redirection module 144.

It should be appreciated that the specific operations illustrated in FIG. 15A to FIG. 15C provide particular processes for performing tier redirection according to various embodiments. Other sequences of operations may also be performed according to alternative embodiments. For example, alternative embodiments of the present invention may perform the operations outlined above in a different order. Moreover, the individual operations illustrated in FIG. 15A to FIG. 15C may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

FIG. 16A illustrates a communication sequence 900 of a process for performing software updates such as that described in operation 310 and/or 408 according to an embodiment. To facilitate understanding, the process 900 is described with reference to FIG. 1 to FIG. 8, although it should be understood that embodiments of the process 900 are not limited to the exemplary systems and apparatus described with reference to FIG. 1 through FIG. 8.

In operation 902, the registration server 112 may provide information indicating an appropriate software version to the client device 104. Information indicating the appropriate software version may indicate a version of software that the registration server desires the client device to execute. The registration server 112 may also provide, in operation 904, a target location (e.g., a URI) of the software update server or system where the client device 104 may acquire the software. Subsequently, if the client device 104 determines that it requires a software update, then in operation 906 it communicates a request for the software update from the software update server identified by the registration server. The software update server may then respond in operation 908 by providing the updated software to the client device 104.

FIG. 16B is a flowchart of a process 910 for a client device to perform software updating according to an embodiment. In operation 912, the client device 104 receives information indicating an appropriate software version 902 and target location of a software update server 904 from the registration server 112. The client device 104 then, in operation 914, determines whether it requires a software update. For example, the client device may compare its current software version 128C with the received information indicating the appropriate software version. If they are the same, then the client device may determine that it does not need a software update and processing may continue to operation 916 where the initialization process is continued. Otherwise, processing may continue to operation 918 where the client device requests the software update from software update server. In operation 920, the client device receives an updated version of the software and, in operation 922, updates its current software based on the updated version.

FIG. 16C is a flowchart of a process 930 for a registration server to perform software updating according to an embodiment. In operation 932, the registration server 112 receives a device identifier for the client device 104. Processing continues to operation 934 where the appropriate software version of the client device 104 is determined. For example, the registration server 112 may compare the received device identifier to the device software version/updater map 150B to identify the appropriate software version for the client device 104. In operation 936, the registration server 112 determines a target location of the software update server, which may be stored at the registration server 112, included in the software version/updater map 150B, or otherwise accessed by the registration server 112. The registration server 112 may then, in operation 938, communicate the information indicating the appropriate software version and the target location of the software update server to the client device 104. In some embodiments, one or more of the operations described with reference to the registration server 112 may be performed by a suitable software or hardware module in the registration server 112, such as the software update module 146.

It should be appreciated that the specific operations illustrated in FIG. 16A to FIG. 16C provide particular processes for performing software updates according to various embodiments. Other sequences of operations may also be performed according to alternative embodiments. For example, alternative embodiments of the present invention may perform the operations outlined above in a different order. Moreover, the individual operations illustrated in FIG. 16A to FIG. 16C may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

FIG. 17A illustrates a communication sequence 1000 of a process for identifying an allocated synchronization server such as that described in operation 312 and/or 410 according to an embodiment. To facilitate understanding, the process 1000 is described with reference to FIG. 1 to FIG. 8, although it should be understood that embodiments of the process 1000 are not limited to the exemplary systems and apparatus described with reference to FIG. 1 through FIG. 8.

As previously described with reference to FIG. 10 and FIG. 11, a registration server 112 may determine and communicate the identity (e.g., a target location) of an allocated synchronization server. In doing so, the registration server 112 may, in operation 1002, communicate a request for the identity of an allocated synchronization server to one of the plurality of synchronization servers 114A through 114M. In this particular example, the request is communicated to the synchronization server 114B, which may be randomly chosen or chosen using other techniques. The request includes the device identifier. The synchronization server 114B may then determine which of the synchronization servers 114A through 114M should be allocated to the client device. In operation 1004, the synchronization server 114B may then communicate the identity (e.g., a URI) of the allocated synchronization server (which may any one of synchronization servers 114A through 114M) to the registration server 112. The registration server 112 may then forward the identity of the allocated synchronization server to the client device.

FIG. 17B is a flowchart of a process 1010 for a registration server to identify an allocated synchronization server according to an embodiment. In operation 1012, the registration server identifies one of the synchronization servers 114A through 114M to submit a request (the request for identification of an allocated synchronization server) to. For example, the registration server 112 may identify the synchronization server randomly, sequentially, via a load balancer (e.g., communicating the request to a synchronization server having the lowest load), or in some other suitable fashion. In this particular example, the registration server identified synchronization server 114B. In operation 1014, the registration server sends, to the identified synchronization server (server 114B in this example), the request for identification of a synchronization server allocated to the client device. In operation 1016, the registration server 112 (e.g., the synchronization server identification module 148) determines whether an identifier of a synchronization server has been received. If not, processing may return to operation 1014 where the request is re-sent. Otherwise, processing may continue to operation 1018 where the received identifier is communicated to the client device. In some embodiments, one or more of the operations described with reference to the registration server 112 may be performed by a suitable software or hardware module in the registration server 112, such as the synchronization server identification module 148.

FIG. 17C is a flowchart of a process 1020 for a synchronization server to identify an allocated synchronization server according to an embodiment. In operation 1022, the synchronization server (in this particular example, synchronization server 114B) receives a request to identify a synchronization server allocated to a client device identified by a received device identifier. In operation 1024, the synchronization server 114B determines the identity of the allocated synchronization server. For example, the synchronization server 114B may implement a consistent hashing algorithm to make such a determination. To facilitate identifying a particular synchronization server, each synchronization server 114A through 114M may know of all synchronization servers within the system 100. This may be provided, e.g., by the use of synchronization server identifiers 178A. The synchronization server (e.g., synchronization server 114B) may then hash the received device identifier using the consistent hashing algorithm and the synchronization server identifiers. Once the identity of an allocated synchronization server is determined, the synchronization server 114B may communicate that identity to the registration server 112 in operation 1026. In some embodiments, one or more of the operations described with reference to the synchronization server 114B may be performed by a suitable software or hardware module in the synchronization server, such as the client allocator module 164.

It should be appreciated that the specific operations illustrated in FIG. 17A to FIG. 17C provide particular processes for identifying an allocated synchronization server according to various embodiments. Other sequences of operations may also be performed according to alternative embodiments. For example, alternative embodiments of the present invention may perform the operations outlined above in a different order. Moreover, the individual operations illustrated in FIG. 17A to FIG. 17C may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 18A:
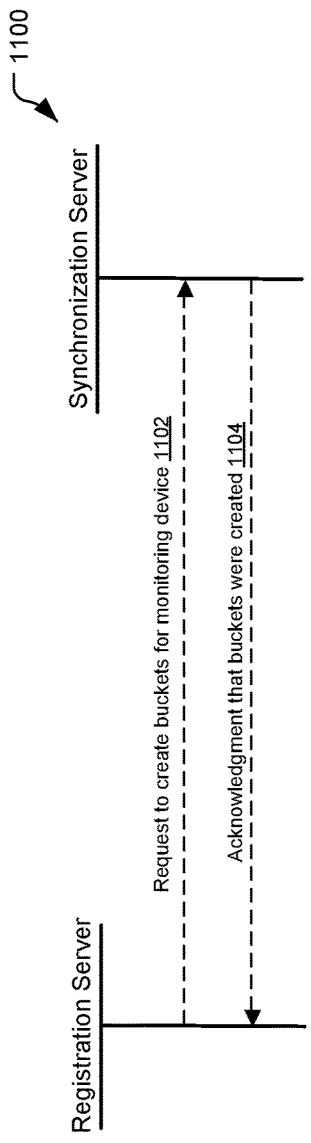
FIG. 18A illustrates a communication sequence of a process for creating buckets according to an embodiment.

FIG. 18A illustrates a communication sequence 1100 of a process for creating buckets such as that described in operation 314 according to an embodiment. To facilitate understanding, the process 1100 is described with reference to FIG. 1 to FIG. 8, although it should be understood that embodiments of the process 1100 are not limited to the exemplary systems and apparatus described with reference to FIG. 1 through FIG. 8.

As previously described with reference to FIG. 10, a synchronization server may create buckets of information for a monitoring device 108 on initial connection of that monitoring device 108 to the registration server 112. To facilitate the process, in operation 1102 the registration server 112 may communicate a request to the synchronization server 114 requesting the synchronization server 114 to create buckets for a client device. The request may be sent to the allocated synchronization server and may include the device identifier. In response, the synchronization server 114 may generate the buckets and, in operation 1104, communicate an acknowledgement to the registration server 112 that the buckets were created.

Figure 18C:
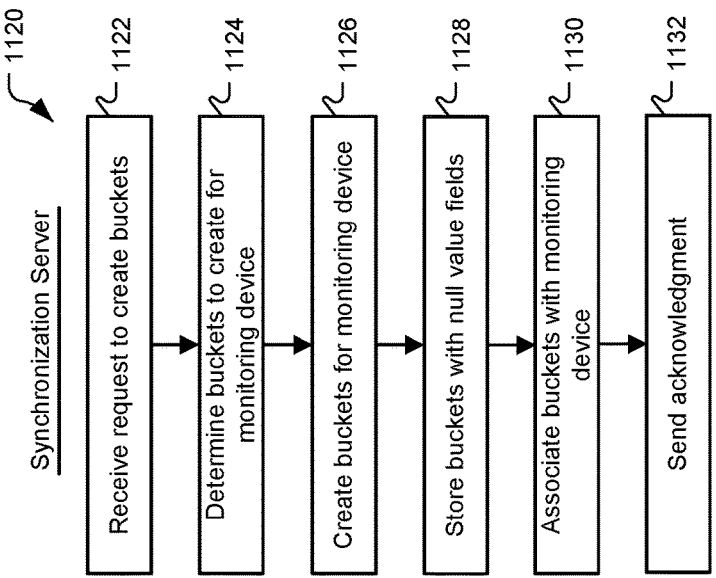
FIG. 18C is a flowchart of a process for a synchronization server to create buckets of information according to an embodiment.
Figure 18B:
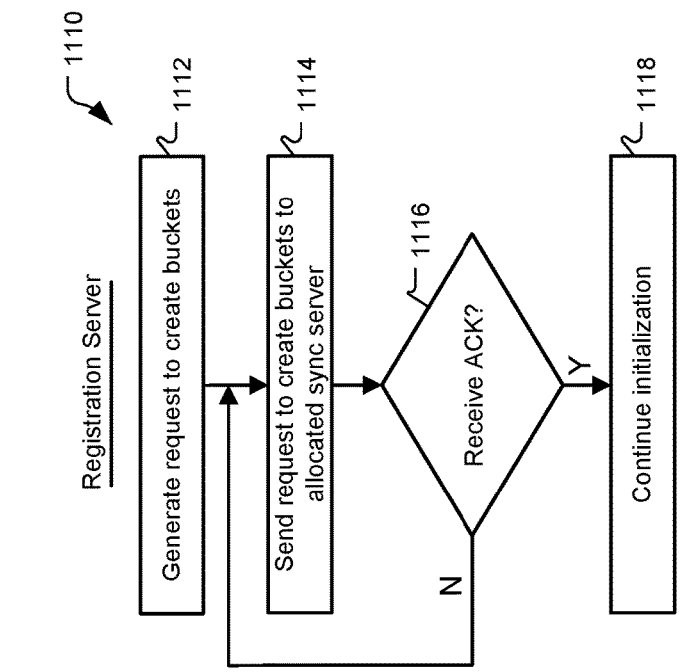
FIG. 18B is a flowchart of a process for a registration server to create buckets of information according to an embodiment.

FIG. 18B is a flowchart of a process 1110 for a registration server to create buckets of information according to an embodiment. In operation 1112, the registration server 112 generates a request to create buckets for a client device. The request may include the device identifier received from the client device. In operation 1114, the registration server 112 communicates the request to the allocated synchronization server. In operation 1116, the registration server 112 determines whether an acknowledgment that the buckets were created is received. If not, processing may return to operation 1114 where the request is re-sent. If so, processing may continue to operation 1118 where the initialization process is continued.

FIG. 18C is a flowchart of a process 1120 for a synchronization server to create buckets of information according to an embodiment. In operation 1122, the synchronization server 114 receives a request to create buckets for a client device such as a monitoring device 108. In operation 1124, the synchronization server determines which buckets to create for the monitoring device. For example, the synchronization server 114 may compare a received device identifier with the device identifier/bucket map 178C to determine the appropriate buckets to create for that device identifier. Different types of client devices may have different sets of buckets created for their use. For example, thermostats may have temperature-related buckets created, whereas hazard detection units (e.g., smoke detects) may have smoke-related buckets created. In operation 1126, the synchronization server 114 creates the buckets for the monitoring device. In operation 1128, the synchronization server 114 stores those buckets with null value fields in the storage element 118. In operation 1130, the synchronization server 114 associates the created buckets with the device, and in operation 1132 sends an acknowledgment to the registration server 112 that the buckets were successfully created. In some embodiments, one or more of the operations described with reference to the synchronization server 114 may be performed by a suitable software or hardware module in the synchronization server 114, such as the bucket generator module 168.

It should be appreciated that the specific operations illustrated in FIG. 18A to FIG. 18C provide particular processes for creating buckets according to various embodiments. Other sequences of operations may also be performed according to alternative embodiments. For example, alternative embodiments of the present invention may perform the operations outlined above in a different order. Moreover, the individual operations illustrated in FIG. 18A to FIG. 18C may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

FIG. 19A illustrates a communication sequence 1200 of a process for requesting relevant buckets such as that described in operations 318 and 414 according to an embodiment. To facilitate understanding, the process 1200 is described with reference to FIG. 1 to FIG. 8, although it should be understood that embodiments of the process 1200 are not limited to the exemplary systems and apparatus described with reference to FIG. 1 through FIG. 8.

As previously described with reference to FIG. 10 and FIG. 11, a client device may request and acquire information from the synchronization server regarding buckets that are relevant to that device. To facilitate the process, in operation 1202 the client device 104 may communicate a request to the synchronization server 114 requesting information regarding all buckets that are relevant to the client device 104. The request may include a device identifier of the client device 104. In response, in operation 1204 the synchronization server 114 may provide information regarding buckets that are relevant to the client device. As already described, the response may include some or all of bucket identifiers, bucket content, timestamps, and version identifiers for the relevant buckets.

FIG. 19B is a flowchart of a process 1210 for a client device to request buckets that are relevant to it according to an embodiment. In operation 1212 the client device 104 generates the request for relevant buckets. For example, in implementations that use HTTP communications, the request may be in the form of an "HTTP GET" command. In operation 1214 the client device 104 communicates the request to the allocated synchronization server 114. In operation 1216, the client device 104 determines whether a response to the request is received. If not, then processing may return to operation 1214, and the client device 104 may re-send the request. Otherwise, processing may continue to operation 1218 where the client device 104 incorporates the response into its own bucket structure.

Techniques for incorporating the response may depend on the type of device (e.g., a monitoring device, an access device, etc.) and the operational history of the device (e.g., initial connection, subsequent connection, etc.). For monitoring devices performing an initial connection, the response may include only bucket identifiers, in which case the monitoring device 108 may not perform any bucket modification but rather may use the received bucket identifiers for determining which bucket content to subsequently communicate to the synchronization server. For monitoring devices performing a subsequent connection, the response may include bucket identifiers together with timestamps and/or version identifiers. In such a case, the bucket identifiers may be used as in the previous case, and the received timestamps and/or version identifiers may be associated with the relevant buckets at the monitoring device 108. For access devices, the response may include bucket identifiers, bucket content, timestamps and/or version identifiers. In this case, the access device 110 may store the bucket contents of the identified relevant buckets at the access device and assign thereto the timestamps and/or version identifiers.

Once a response is received from the synchronization server 114 and incorporated into the bucket structure of the client device 104, processing may continue to operation 1220 in which the client device 104 continues its initialization process.

FIG. 19C is a flowchart of a process 1230 for a synchronization server to respond to a request for buckets that are relevant to a client device according to an embodiment. In operation 1232 the synchronization server 114 receives a request for relevant buckets from the client device 104. In operation 1234 the synchronization server 114 determines the type of device (e.g., a monitoring device 108, an access device 110, etc.) and the operational history of the device (e.g., initial connect, reconnect, etc.). To determine the type of device, the synchronization server 114 may refer to the connection port the client device 104 used to connect to the synchronization server 114, the device identifier, or other suitable information. To determine the operational history of the device, the synchronization server 114 may, e.g., maintain a record of connections with client devices. In operation 1236, the synchronization server determines the relevant bucket identifiers and associated information (e.g., bucket content, timestamps, version identifiers, etc.) for the client device 104 based on the type of device and/or operational history of the device. In one particular embodiment, the synchronization server 114 may compare the received device identifier to the device identifier/bucket map 178C to determine the relevant buckets for that client device. In operation 1238, the synchronization server 114 communicates the relevant bucket identifiers and, where appropriate, the associated information (e.g., bucket content, timestamps, version identifiers, etc.) to the client device 104. In some embodiments, one or more of the operations described with reference to the synchronization server 114 may be performed by a suitable software or hardware module in the synchronization server 114, such as the relevant bucket identifier module 166.

It should be appreciated that the specific operations illustrated in FIG. 19A to FIG. 19C provide particular processes for requesting buckets according to various embodiments. Other sequences of operations may also be performed according to alternative embodiments. For example, alternative embodiments of the present invention may perform the operations outlined above in a different order. Moreover, the individual operations illustrated in FIG. 19A to FIG. 19C may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

FIG. 20A illustrates a communication sequence 1300 of a process for sending bucket content such as that described in operation 322 according to an embodiment. To facilitate understanding, the process 1300 is described with reference to FIG. 1 to FIG. 8, although it should be understood that embodiments of the process 1300 are not limited to the exemplary systems and apparatus described with reference to FIG. 1 through FIG. 8.

As previously described with reference to FIG. 10, a monitoring device may communicate the content of relevant buckets to the synchronization server. To facilitate the process, in operation 1302 the monitoring device 108 may communicate the content of relevant buckets to the synchronization server and, in operation 1304, receive a response from the synchronization server 114. During an initial connect, the monitoring device 108 may communicate the content of all relevant buckets as described with reference to FIGS. 20B and 20C. During a subsequent connect, the monitoring device 108 may communicate the content of only relevant buckets that are newer than the corresponding buckets at the synchronization server, as described with reference to FIGS. 20D and 20E.

FIG. 20B is a flowchart of a process 1310 for a monitoring device to the send the content of relevant buckets to a synchronization server during an initial connect according to an embodiment. In operation 1312, the monitoring device 108 identifies the content of its relevant buckets based on relevant bucket identifiers previously received from the synchronization server. In operation 1314, the monitoring device 108 sends the contents of all relevant buckets (together with the bucket identifiers) to the synchronization server. In operation 1316, the monitoring device 108 determines whether a response is received from the synchronization server 114. If not, processing may return to operation 1314 where the monitoring device 108 re-sends the contents of the relevant buckets. Otherwise, processing may continue to operation 1318. Since in this case the response should include information such a timestamp, version identifier, and the like for all relevant buckets, in operation 1318 the monitoring device 108 associates the received information with each relevant bucket.

FIG. 20C is a flowchart of a process 1320 for a synchronization server to send a response to a monitoring device in response to receiving bucket contents during an initial connect according to an embodiment. In operation 1322, the synchronization server 114 receives the contents of all relevant buckets from the monitoring device 108. In operation 1324, the synchronization server 114 generates a timestamp (using, e.g., the timestamp generator 172) and/or version identifier (using, e.g., the version generator 170) for each relevant bucket. In operation 1326, the synchronization server 114 assigns the generated timestamp and/or version identifier to each relevant bucket. In operation 1328, the synchronization server 114 stores the bucket content, timestamp, and/or version identifier for each relevant bucket at the storage element 118. In operation 1330, the synchronization server 114 sends the timestamp and/or version identifier for each relevant bucket to the monitoring device 108.

FIG. 20D is a flowchart of a process 1340 for a monitoring device to send the content of relevant buckets to a synchronization server during a subsequent connect according to an embodiment. In operation 1342, the monitoring device 108 identifies the content of its relevant buckets based on relevant bucket identifiers previously received from the synchronization server 114. In operation 1344, the monitoring device 108 determines whether its buckets are newer than the corresponding buckets at the synchronization server 114 (i.e., at the storage element 118). In one particular embodiment, this may be done by the monitoring device tracking changes to its buckets when it is offline (i.e., not connected to the remote server 102). Once the monitoring device reconnects, it will consider any buckets that were changed while offline to be 'newer than' the corresponding buckets at the synchronization server. If it is determined that the buckets at the monitoring device 108 are not newer than those at the synchronization server 114, then processing may continue to operation 1346 where the monitoring device 108 continues its initialization process. Otherwise, processing may continue to operation 1348 where the monitoring device 108 sends the bucket content (and bucket identifiers) of newer buckets to the synchronization server. In operation 1350, the monitoring device 108 determines whether it receives a response from the synchronization server 114. If no response is received, then processing may return to operation 1348 where the monitoring device 108 re-sends the bucket contents. Otherwise, processing may continue to operation 1352. Since in this case the response should include information such as a timestamp, version identifier, and the like for only the relevant buckets that were newer at the monitoring device 108 than at the synchronization server 114, in operation 1352 the monitoring device 108 associates the received information with the relevant buckets that were newer at the monitoring device 108.

FIG. 20E is a flowchart of a process 1360 for a synchronization server to send a response to a monitoring device in response to receiving bucket contents during a subsequent connect according to an embodiment. In operation 1362, the synchronization server 114 receives the contents of relevant buckets that are newer at the monitoring device 108 than those at the synchronization server 114. In operation 1364, the synchronization server 114 generates a timestamp (using, e.g., the timestamp generator 172) and/or version identifier (using, e.g., the version generator 170) for each of those relevant buckets. In operation 1366, the synchronization server 114 assigns the generated timestamp and/or version identifier to each of those relevant buckets that were newer at the monitoring device 108. In operation 1368, the synchronization server 114 stores the bucket content, timestamp, and/or version identifier for each of those relevant buckets at the storage element 118. In operation 1370, the synchronization server 114 sends the timestamp and/or version identifier for each of those relevant buckets to the monitoring device 108.

It should be appreciated that the specific operations illustrated in FIG. 20A to FIG. 20E provide particular processes for communicating bucket content from the monitoring device to the synchronization server during connection processes according to various embodiments. Other sequences of operations may also be performed according to alternative embodiments. For example, alternative embodiments of the present invention may perform the operations outlined above in a different order. Moreover, the individual operations illustrated in FIG. 20A to FIG. 20E may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

FIG. 21A illustrates a communication sequence 1400 of a process for subscribing to relevant buckets such as that described in operations 326 and 418 according to an embodiment. To facilitate understanding, the process 1400 is described with reference to FIG. 1 to FIG. 8, although it should be understood that embodiments of the process 1400 are not limited to the exemplary systems and apparatus described with reference to FIG. 1 through FIG. 8. In operation 1402, the client device 104 communicates a request to subscribe to all relevant buckets. In operation 1404, the synchronization server 114 provides a response to the subscription request.

FIG. 21B is a flowchart of a process 1410 for a client device to subscribe to relevant buckets according to an embodiment. In operation 1412, the client device 104 identifies buckets that are relevant to it. In operation 1414 (which may be incorporated in implementations that use session identifiers), the client device 104 (using, e.g., session ID generator module 124) generates a session identifier. In operation 1416 (which may be incorporated in implementations that use, e.g., TCP-based communications) the client device 104 opens a new communication socket. In operation 1418, the client device 104 communicates the request to subscribe to relevant buckets to the synchronization server 114 via the new communication socket. The request may include a variety of bucket-related information, such as the bucket identifiers of the relevant buckets, and timestamp and/or version identifiers of the relevant buckets at the monitoring device 108.

FIG. 21C is a flowchart of a process 1420 for a synchronization server to receive a subscription request according to a first embodiment. In operation 1422, the synchronization server 114 receives a request to subscribe to relevant buckets from a client device 104. In operation 1424, the synchronization server 114 associates the relevant buckets (identified using, e.g., bucket identifiers included in the request) at the storage element 118 with the client device making the request (identified using, e.g., the device identifier). By making such an association, when changes are made to the relevant buckets at the storage element 118, those changes can be propagated to the appropriate client device.

In operation 1426 (which may be incorporated in implementations that use session identifiers), the synchronization server 114 associates the received session identifier with the relevant buckets. By making such an association, if subsequent changes to any of the relevant buckets are requested by a client device, and the session identifier associated with the relevant buckets is identical to the session identifier included in the change request, then the synchronization server may respond by suppressing some of the information it would have otherwise responded with (e.g., providing only a new timestamp and/or version of the buckets updated at the storage element 118, but not the entire bucket contents). The use of session identifiers may be particularly advantageous in embodiments where subscription requests are not torn down, as the use of session identifiers may suppress unnecessary responses from the synchronization server.

It should be recognized that in some embodiments a session identifier may be replaced with the device identifier. For example, in operation 1426, instead of associating the session identifier with the subscription request the synchronization server 114 may associate the received device identifier (received, e.g., in the assigned credentials) with the subscription request. Such a technique similarly allows the synchronization server 114 to subsequently suppress responses to change requests from the client device 104. While the use of device identifiers may be particularly advantageous in embodiments where the client device 104 has and sends its unique device identifier to the remote server 102 as a matter of course (e.g., monitoring devices 108 and assigned credentials), the use of session identifiers may be particularly advantageous in embodiments where the client device 104 may not send a unique device identifier to the remote server 102 as a matter of course (e.g., access devices 110).

In operation 1428 (in embodiments where acknowledgments are used), the synchronization server 114 communicates an acknowledgment to the client device 104 that the subscription request has been successfully received and processed. In operation 1430, the synchronization server 104 waits for changes to any of the subscribed buckets.

Figure 21D:
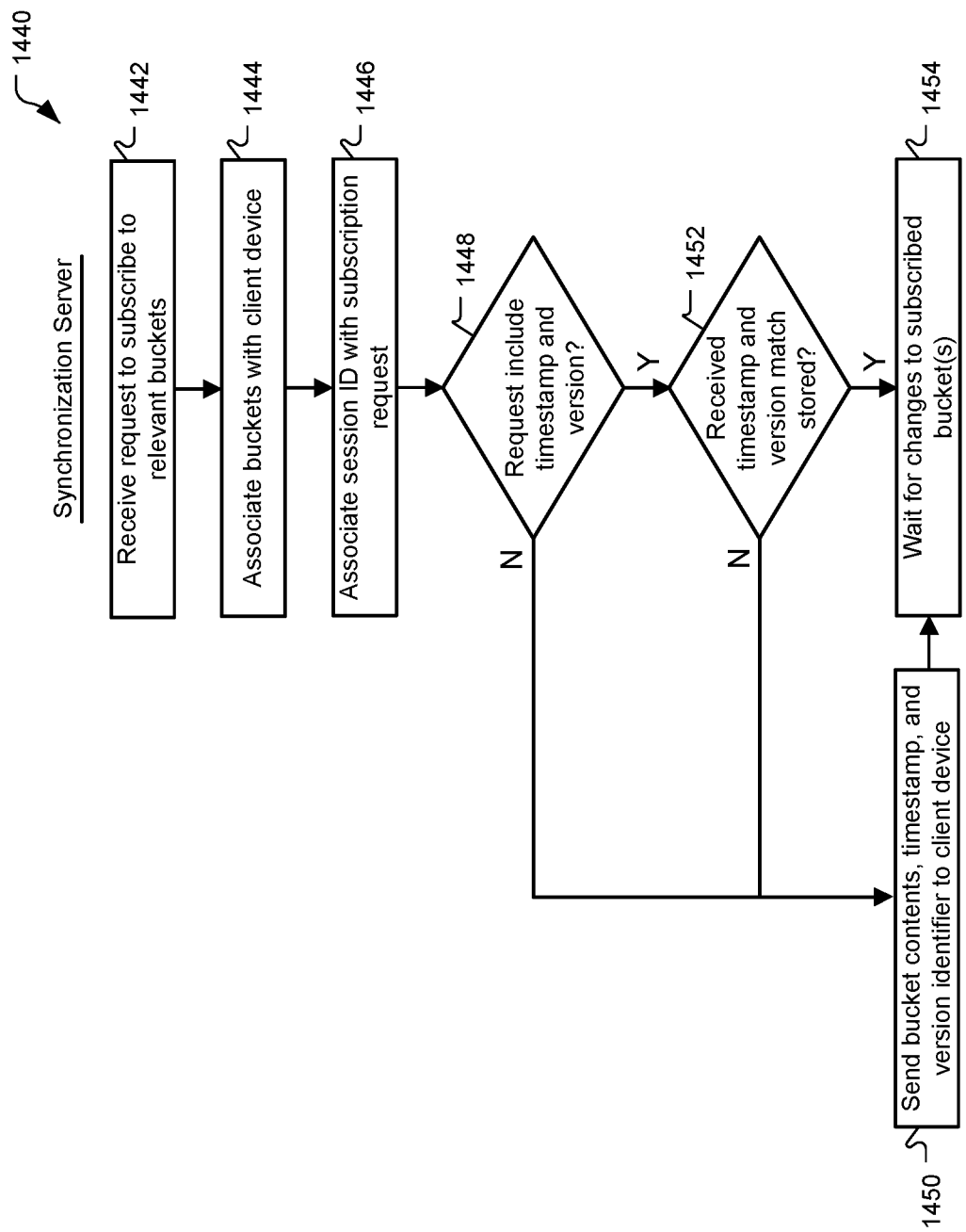
FIG. 21D is a flowchart of a process for a synchronization server to receive a subscription request according to a second embodiment.

FIG. 21D is a flowchart of a process 1440 for a synchronization to receive a subscription request according to a second embodiment. Operations 1442 through 1446 are similar to operations 1422 through 1426, thus further description is omitted. In operation 1448, however, the synchronization server 114 determines whether the request includes timestamp and/or version information. If not, then processing continues to operation 1450, where the synchronization server 114 communicates the bucket contents, timestamp, and/or version identifier to the client device 104. The timestamp and/or version identifier may have previously been generated as a result of, e.g., operation 1324 or, e.g., operation 1364. Processing may then continue to operation 1454, where the synchronization server waits for changes to any of the subscribed buckets. If, however, in operation 1448 it is determined that the request includes timestamp and/or version information, then processing continues to operation 1452 where the synchronization server 114 determines whether the received timestamp and/or version identifier match those stored at the synchronization server 114 for the relevant buckets. If not, then processing continues to operation 1450. Otherwise, processing continues to operation 1454. In this fashion, the synchronization server 114 may ensure that the states of the buckets at the client device 104 and those at the synchronization server 114 are identical in response to receiving a subscription request.

It should be appreciated that the specific operations illustrated in FIG. 21A to FIG. 21D provide particular processes for subscribing to buckets according to various embodiments. Other sequences of operations may also be performed according to alternative embodiments. For example, alternative embodiments of the present invention may perform the operations outlined above in a different order. Moreover, the individual operations illustrated in FIG. 21A to FIG. 21D may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figures 22A, 22B:
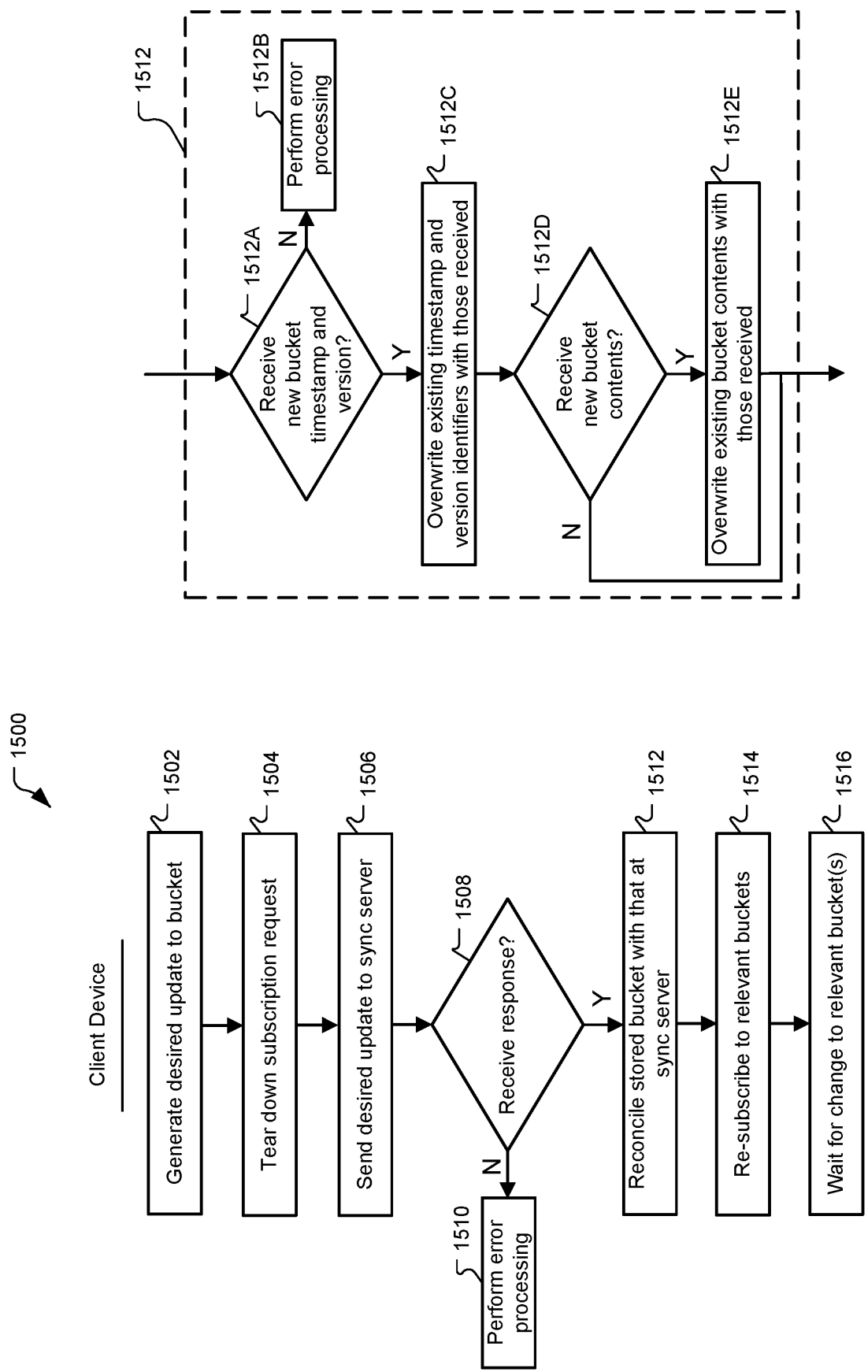
FIG. 22A is a flowchart of a process for operating a client device to synchronize changes to buckets at the client device with corresponding buckets at a synchronization server according to an embodiment.
FIG. 22B is a flowchart of a process for performing operation 1512 described with reference to FIG. 22A according to an embodiment.

FIG. 22A is a flowchart of a process 1500 for operating a client device to synchronize changes to buckets at the client device with corresponding buckets at a synchronization server according to an embodiment. In some embodiments, the client device 104 is a monitoring device 108 that communicates a desired bucket update as described with reference to FIG. 12. In other embodiments, the client device 104 is an access device that communicates a desired bucket update as described with reference to FIG. 13. To facilitate understanding, the process 1500 is described with reference to FIG. 1 to FIG. 8, although it should be understood that embodiments of the process 1500 are not limited to the exemplary systems and apparatus described with reference to FIG. 1 through FIG. 8.

In operation 1502, the client device generates a desired update to a bucket. For example, a user may input a desired change to a bucket (such as a desired change to a temperature setpoint). For another example, an algorithm executing at the client device may request a desired change to a bucket. The desired update is typically a desired change to the contents of a bucket at the client device, so that the contents of the bucket change from one state (e.g., one value in a field-value pair of the bucket) to another state (e.g., another, different value in the field-value pair).

In operation 1504, the client device tears down its pending subscription request. A subscription request for the buckets that are relevant to the client device will be pending as a result of the initialization process in which the client device subscribes to relevant buckets (e.g., operation 326). Accordingly, the client device may tear down that pending subscription request using techniques previously discussed. In other embodiments, the client device may leave the subscription request pending.

In operation 1506, the client device sends the desired update to the (allocated) synchronization server. The desired update may include new bucket contents and a bucket identifier that identifies the bucket associated with the new contents. In some cases, the client device may include other information, such as a timestamp and/or version identifier, together with the desired update. In HTTP implementations, the desired update may be in the form of an "HTTP PUT" command.

In operation 1508, the client device determines whether a response to the desired update is received. If no response is received, this may be indicative of a temporary failure in communications between the client device and the synchronization server, and thus processing may continue to operation 1510.

In operation 1510, the client device performs error processing. The error processing may include attempts to re-send the desired update a certain number of times. If a response is still not received, this may be indicative of a permanent failure in communications between the client device and the synchronization server, in which case the client device may attempt to reconnect with the registration server for re-initialization. If connection attempts with the registration server also fail, then the client device may begin increasing (linearly, exponentially, etc.) the time between reconnection attempts, perform reconnection attempts only when power is available, etc. In other embodiments, the client device may attempt to reconnect with the registration server without attempting to re-send the desired update.

On the other hand, if it is determined that a response is received from the synchronization server, processing continues to operation 1512. In operation 1512 the client device reconciles its stored bucket with that at the synchronization server. The client device may perform such reconciliation based on the response received from the synchronization server and, in some embodiments, may use reconciliation module 124 to perform such operations. As a result of such reconciliation operations, the state of the subscribed buckets at the client device should be identical to the state of the corresponding buckets at the synchronization server. One specific technique for reconciling buckets is described with reference to FIG. 22B.

In embodiments where the subscription request was torn down, processing may then continue to operation 1514 where the client device re-subscribes to the buckets that are relevant to it. This may be done, e.g., similar to operation 326. In embodiments where the subscription request was not torn down, the re-subscription operation may be avoided.

Processing then continues to operation 1516 where the client device waits for changes to the relevant (i.e., subscribed) buckets. Such changes may be instigated at the client device or at other entities of the system 100, such as the synchronization server, other client devices, etc.

FIG. 22B is a flowchart of a process for performing operation 1512 described with reference to FIG. 22A. That is, FIG. 22B depicts a particular embodiment for reconciling subscribed buckets stored at the client device with the corresponding buckets at the synchronization server.

In operation 1512A, the client device determines whether it receives a new bucket timestamp and/or version from the synchronization server. If not, then this may be indicative of a temporary failure in communications between the client device and the synchronization server, in which case processing may continue to operation 1512B where the client device performs error processing. Performing error processing in operation 1512B is similar to that described with reference to operation 1510.

On the other hand, if it is determined that the a new bucket timestamp and/or version identifier are received from the synchronization server, then processing may continue to operation 1512C where the client device overwrites its existing timestamp and/or version identifier with those received. For example, if the client device communicates a desired update to Bucket A, in response the client may receive a new timestamp and/or version identifier for Bucket A. The client device then replaces its existing timestamp and/or version identifier for Bucket A with those received.

Processing then continues to operation 1512D where the client device determines whether it receives new bucket contents from the synchronization server. If it does not, then this indicates that the desired update was accepted, in which case the client device may proceed to re-subscribe to the relevant buckets or wait for further changes to the relevant buckets (e.g., operation 1516).

If, however, the client device determines that it receives new bucket contents from the synchronization server, then this may indicate that the update was rejected, the update was accepted to a bucket at the synchronization server which included values unexpected by the client device, or that the update was accepted and the synchronization server is communicating the bucket contents to the client device even though they are as expected by the client device. In any case, processing continues to operation 1512E where the client device overwrites the existing contents of its bucket with those received from the synchronization server. In some embodiments, instead of overwriting the existing contents of its buckets, the client device may merge the contents received with those already stored in its bucket(s).

It should be appreciated that the specific operations illustrated in FIG. 22A and FIG. 22B provide particular processes for operating a client device to synchronize changes to buckets at the client device with corresponding buckets at a synchronization server according to an embodiment. Other sequences of operations may also be performed according to alternative embodiments. For example, alternative embodiments of the present invention may perform the operations outlined above in a different order. Moreover, the individual operations illustrated in FIG. 22A and FIG. 22B may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 23A:
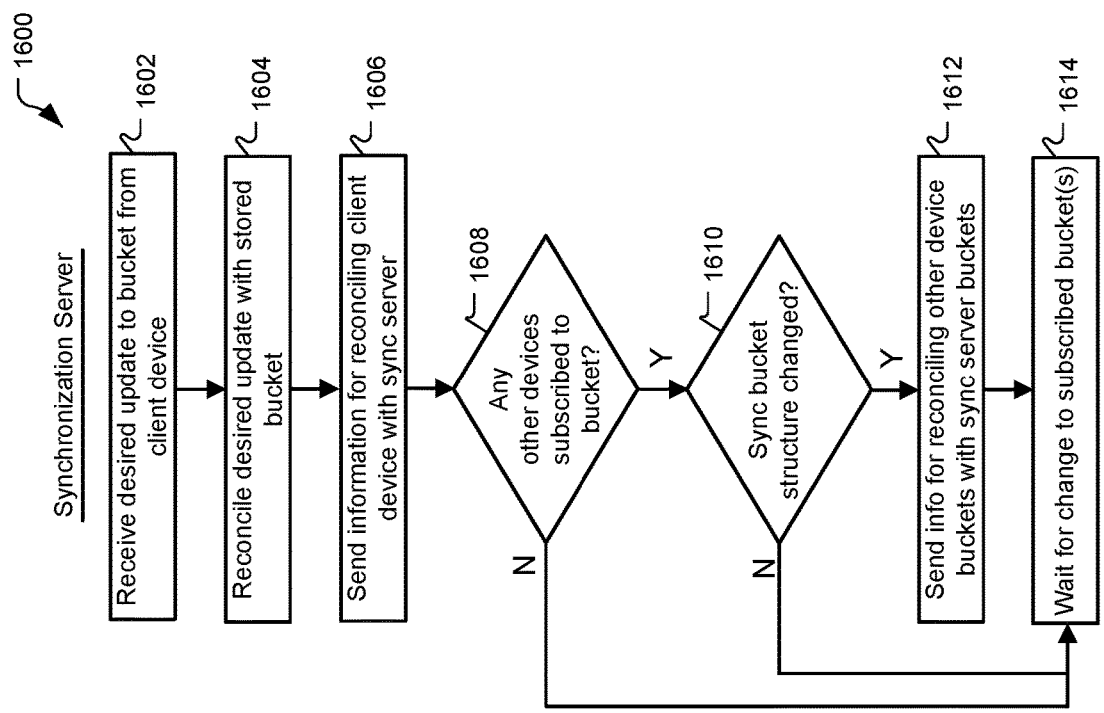
FIG. 23A is a flowchart of a process for operating a synchronization server to synchronize changes to buckets requested by a client device with corresponding buckets at the synchronization server and with corresponding buckets at other client devices according to an embodiment.

FIG. 23A is a flowchart of a process 1600 for operating a synchronization server to synchronize changes to buckets requested by a client device with corresponding buckets at the synchronization server and with corresponding buckets at other client devices according to an embodiment. To facilitate understanding, the process 1600 is described with reference to FIG. 1 to FIG. 8, although it should be understood that embodiments of the process 1600 are not limited to the exemplary systems and apparatus described with reference to FIG. 1 through FIG. 8.

In operation 1602, the synchronization server receives a desired update to a bucket from a client device. The desired bucket update may be received from a monitoring device 108 (as described with reference to FIG. 12), received from an access device 110 (as described with reference to FIG. 13), or generated by the synchronization server (as described with reference to FIG. 14).

After receiving the desired update, processing continues to operation 1604 where the synchronization server reconciles the desired bucket update with the corresponding bucket stored at the storage element 118. By reconciling the desired update with the corresponding bucket at the storage element 118, the synchronization server 114 may accept the desired update or reject the desired update. One specific technique for reconciling buckets is described with reference to FIG. 23B. Such processing may be performed, e.g., by reconciliation module 174.

Once the desired update is reconciled with the corresponding bucket at the synchronization server, processing continues to operation 1606 where the synchronization server sends information for reconciling the client device with the synchronization server. This may include information acknowledging acceptance or indicating rejection of the desired update. One specific technique for sending information to reconcile the client device with the synchronization server is described with reference to FIG. 23C. Such processing may be performed, e.g., by reconciliation module 174.

In operation 1608 the synchronization server determines whether any other client devices are subscribed to the bucket. In determining whether any other client devices are subscribed to the bucket, the synchronization server may determine whether there are any pending subscription requests for the bucket. If so, the synchronization server may identify the client device(s) that issued the pending subscription requests.

If it is determined that no other devices are subscribed to the bucket, then processing may continue to operation 1614, where the synchronization server waits for changes to any subscribed bucket(s). This may include changes made at the synchronization server, change request communicated from client devices, and the like.

On the other hand, if it is determined that at least one other client device is subscribed to the bucket, then processing continues to operation 1610. In operation 1610, the synchronization server determines whether the structure of the bucket at the synchronization server was changed as a result of the reconciliation operation 1604. By changing a structure of the bucket, one or more of the contents, timestamp, and/or version identifier may have been altered.

If it is determined that the structure of the bucket did not change, then this may indicate that the synchronization server rejected the desired update, and thus there is no need to communicate changes to other subscribed client devices. Thus, processing may continue to operation 1614. On the other hand, if it is determined that the bucket structure did change, then this may indicate that the synchronization server accepted, at least in part, the desired update. Accordingly, the new state of the bucket at the synchronization server should be communicated to other subscribed devices so that all subscribed devices have corresponding buckets at the same state. Thus, processing may continue to operation 1612, where the synchronization server sends information for reconciling other device buckets (i.e., corresponding buckets at subscribed client devices) with the updated synchronization server buckets. In one particular embodiment, operation 1612 may include various sub-operations similar to those illustrated in FIG. 23C and discussed with reference to operation 1606.

Figure 23B:
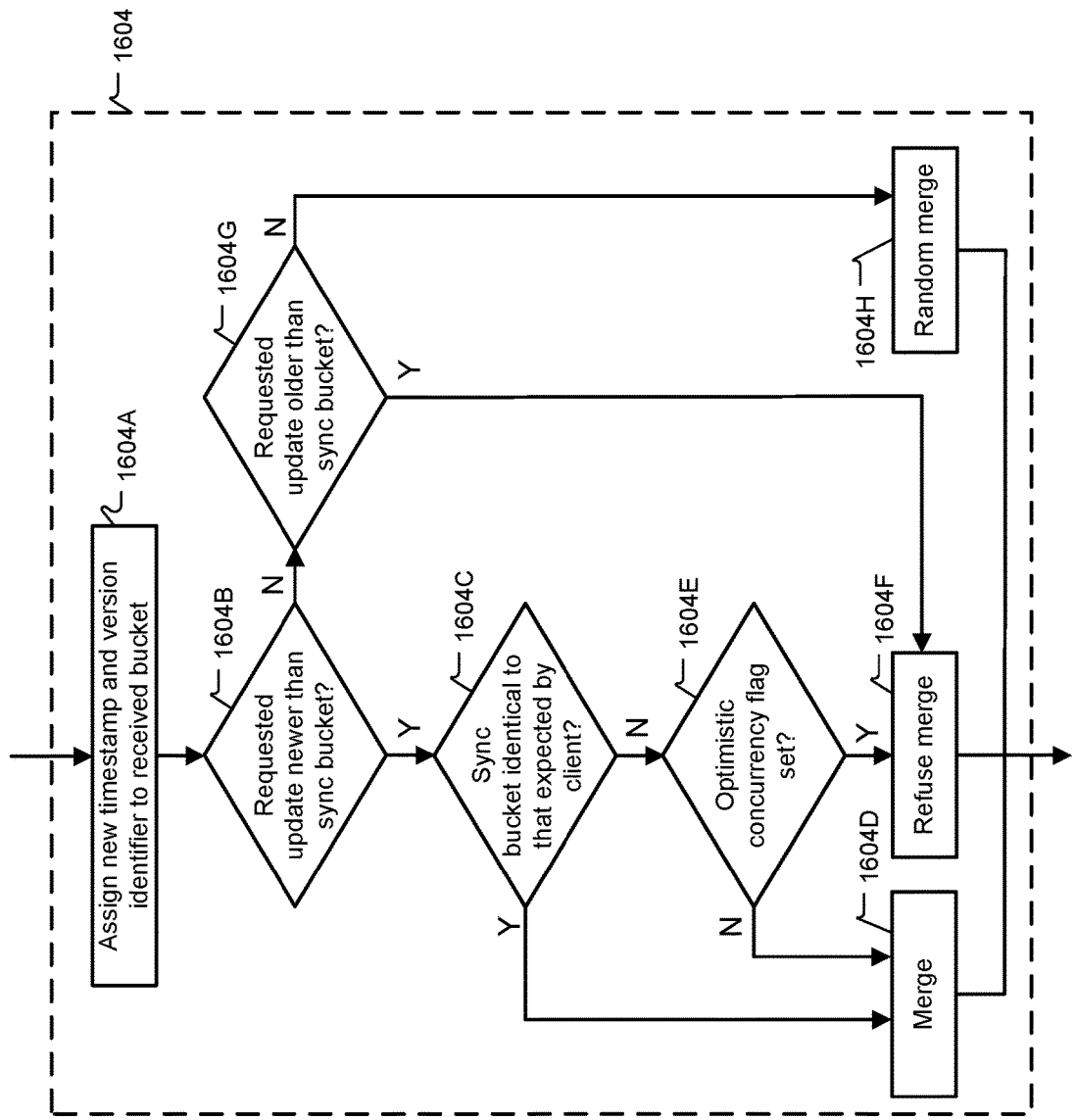
FIG. 23B is a flowchart of a process for performing operation 1604 described with reference to FIG. 23A according to an embodiment.

FIG. 23B is a flowchart of a process for performing operation 1604 described with reference to FIG. 23A. That is, FIG. 23B depicts a particular embodiment for reconciling a desired bucket update received from a client device with one or more corresponding buckets at the synchronization server.

In operation 1604A, the synchronization server assigns a new timestamp and version identifier to the received bucket. This may be done, e.g., by first using the timestamp generator 172 to generate a timestamp indicating the time that the update request was received, and using the version generator 170 to generate a new unique version identifier. The newly generated timestamp and version identifier may be assigned to the received bucket for subsequent use.

Once a new timestamp and version identifier have been assigned, processing continues to operation 1604B. In operation 1604B, the synchronization server determines whether the requested update is newer than the bucket at the synchronization server that corresponds to the requested update. For example, the synchronization server may compare the newly assigned timestamp with the stored timestamp of the corresponding bucket at the synchronization server. If the newly assigned timestamp is newer than the stored timestamp of the corresponding bucket (which, in most cases, it should be), then processing continues to operation 1604C.

In operation 1604C, the synchronization server determines whether the corresponding bucket at the synchronization server is identical to (i.e., of the same state as) that expected by the client device. That is, the client device expects the contents of the corresponding bucket at the synchronization server to be identical to the contents of the corresponding bucket at the client device, as the desired update is a desired change to the state of the bucket at the client device. In one embodiment, to make such a determination, the synchronization server may compare the version identifier received from the client device with the version identifier for the corresponding bucket stored at the synchronization server. If they are identical, then the synchronization server determines that the bucket at the synchronization server is identical to that expected by the client. In such a case, processing may continue to operation 1604D.

In operation 1604D, the synchronization server merges the contents of the bucket in the desired update with the contents of the corresponding bucket at the synchronization server. In this fashion, the contents of the bucket at the synchronization server are made identical to those of the corresponding bucket at the client device. It should be recognized that in some embodiments, instead of merging, the synchronization server may overwrite all contents of the corresponding bucket at the synchronization server with the contents of the bucket in the desired update.

Returning to operation 1604C, when the synchronization server determines that the corresponding bucket at the synchronization server is not identical to that expected by the client device (e.g., the version identifier of the buckets is different), then the synchronization server may decide whether to (nevertheless) accept the desired update or refuse the update. In many embodiments, the synchronization server may be configured to perform one or the other by default. For example, processing may continue from operation 1604C to operation 1604D or operation 1604F. In some embodiments, however, the client device may indicate whether or not the synchronization server should accept the update in such a situation. To do so, the client device may communicate an optimistic concurrency flag to the synchronization server together with the update request. If the optimistic concurrency flag is set, or otherwise if the client device indicates that it does not want the update to be accepted if the corresponding bucket at the synchronization server is not identical to that expected by the client device, then processing may continue to operation 1604F, where the synchronization server refuses to merge the desired update with its corresponding bucket or otherwise refuses to accept the desired update. In contrast, if the optimistic concurrency flag is not set, or otherwise if the client device indicates that it does want the update to be accepted even if the corresponding bucket at the synchronization server is not identical to that expected by the client device, then processing may continue to operation 1604D. In this particular example, the synchronization server's default operation is to merge desired updates even if the corresponding bucket at the synchronization server is not identical to that expected by the client device. The optimistic concurrency flag thus operates to override this default operability.

Returning to operation 1604B, in some cases the synchronization server may determine that the requested update is not newer than the bucket at the synchronization server that corresponds to the requested update. This may occur, for example, if prior to operation 1604B but after operation 1604A another client device requests a change and is assigned a timestamp (newer than or the same as that issued in operation 1604A), and the requested change for the other client device is accepted (such that the timestamp for the other client device is stored at the synchronization server). As a result, the timestamp issued in operation 1604A is not newer than that stored at the synchronization server, and in which case processing may continue to operation 1604G.

In operation 1604G, the synchronization server determines whether the requested update is older than the bucket at the synchronization server that corresponds to the requested update. Again, this may be done by comparing timestamps. If the requested update is older than the bucket at the synchronization server that corresponds to the requested update, then this may indicate that the synchronization server has a newer bucket than that at the client device requesting the update. In this particular embodiment, in such a case processing continues to operation 1604F where the requested update is refused.

On the hand, at operation 1604G the synchronization server may determine that the requested update is not older than the bucket at the synchronization server that corresponds to the requested update. In this case, the requested update is the 'same age' as the bucket at the synchronization server. For example, the buckets may have identical timestamps. In this situation, processing may continue to operation 1604H.

In operation 1604H, the synchronization server merges the desired update with the corresponding bucket at the synchronization server at random. This may be implemented in a number of different fashions. For example, the synchronization server may look to the version identifiers of the bucket at the client device requesting the update (e.g., the version identifier may be sent as part of the update) and of the corresponding bucket at the synchronization server. Since version identifiers for a given bucket are always unique, the version numbers will be different. The synchronization server may then arbitrarily choose to merge or not merge by comparing the version identifiers. For example, the synchronization server may choose to merge the requested update with the corresponding bucket at the synchronization server only when the version identifier of the client device bucket is a numeric value higher than a numeric value of the version identifier of the corresponding bucket at the synchronization server. For another example, the synchronization server may choose to merge the requested update with the corresponding bucket at the synchronization server only when the version identifier of the client device bucket is a numeric value lower than a numeric value of the version identifier of the corresponding bucket at the synchronization server. It should be recognized that although the synchronization server merges the desired update with the corresponding bucket at "random", in many embodiments the same merge algorithm will be used by all of the synchronization servers 114A through 114M. In this fashion, the system 100 may advantageously achieve eventual consistency.

Figure 23C:
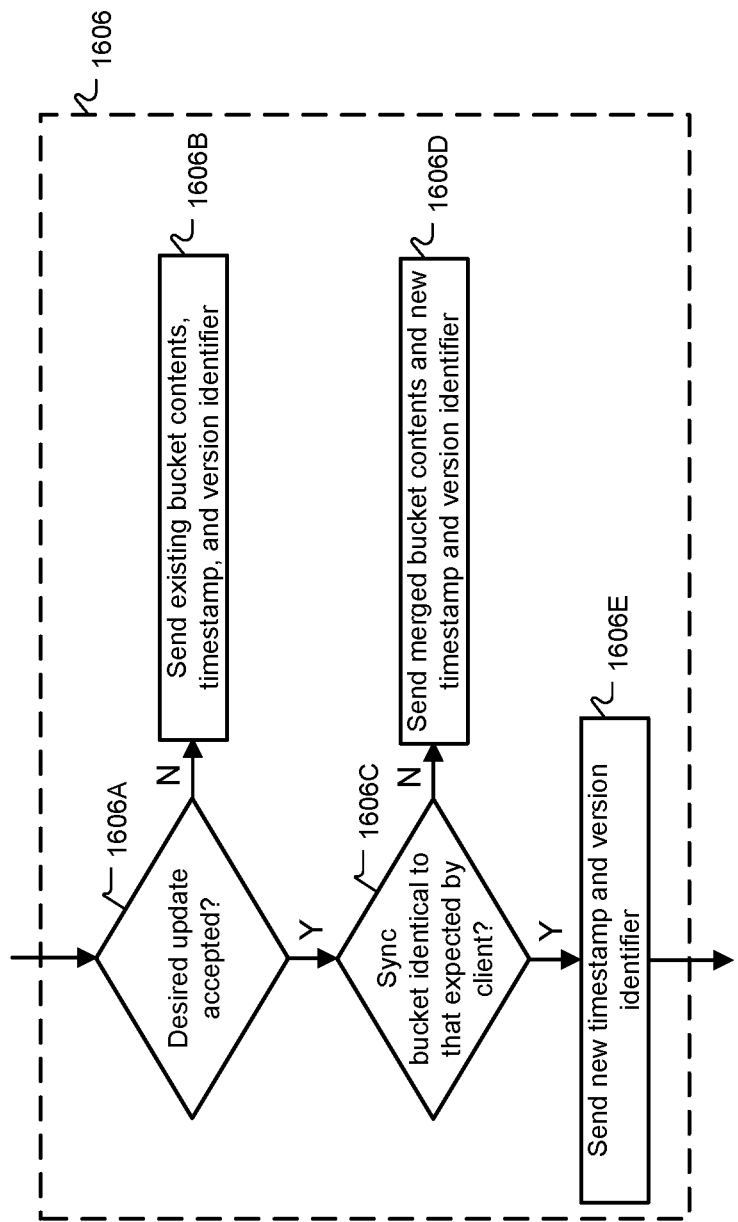
FIG. 23C is a flowchart of a process for performing operation 1606 described with reference to FIG. 23A according to an embodiment.

FIG. 23C is a flowchart of a process for performing operation 1606 described with reference to FIG. 23A. That is, FIG. 23C depicts a particular embodiment for sending information to reconcile the client device with the synchronization server.

In operation 1606A, the synchronization server determines whether a desired bucket update communicated from the client device has been accepted. If a desired bucket update has not been accepted, e.g., the synchronization server has decided to refuse merging the desired update with the corresponding bucket at the synchronization server (such as in operation 1604F), then this may indicate that the state of the bucket at the synchronization server is different than that expected by the client device. Accordingly, processing may continue to operation 1606B where the synchronization server communicates its existing bucket contents, timestamp, and/or version identifier (i.e., those of the bucket at the synchronization server that correspond to the bucket in the update request) to the client device. Otherwise, processing may continue to operation 1606C.

In operation 1606C, the synchronization server determines whether its bucket is identical to that expected by the client device. To make such a determination, the synchronization server may compare a version identifier included in the request to a version identifier of the corresponding bucket at the synchronization server. If they are the same, the synchronization server may determine that its bucket is identical to that expected by the client device. Otherwise, the synchronization server may determine that its bucket is not identical to that expected by the client device.

If the synchronization server determines that its bucket is not identical to that expected by the client device, then processing may continue to operation 1606D where the synchronization server communicates the merged bucket contents and new timestamp and/or version identifier (e.g., those generated in operation 1604A) to the client device. This may be useful for situations where a desired update is accepted by the synchronization server even though the bucket at the synchronization server is not as expected by the client device. In such a case, to ensure that client device bucket is at the same state as the corresponding bucket of the synchronization server, the entire bucket contents may be communicated to the client device.

On the other hand, if the synchronization server determines that its bucket is identical to that expected by the client device, then processing may continue to operation 1606E where the synchronization server communicates only the new timestamp and version identifier (e.g., those generated in operation 1604A) to the client device. In this case, the merged bucket contents need not be communicated to the client device since the contents are already identical. Of course, in some embodiments the synchronization server may nevertheless also send the merged bucket contents to the client device.

It should be appreciated that the specific operations illustrated in FIG. 23A to FIG. 23C provide particular processes for operating a synchronization server to synchronize changes to buckets requested by a client device with corresponding buckets at the synchronization server and with corresponding buckets at other client devices according to an embodiment. Other sequences of operations may also be performed according to alternative embodiments. For example, alternative embodiments of the present invention may perform the operations outlined above in a different order. Moreover, the individual operations illustrated in FIG. 23A to FIG. 23C may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

FIG. 24A through FIG. 26C illustrate various examples of synchronizing the state of corresponding buckets at a client device and a remote server in response to a client device communicating a desired update to the remote server. In particular, FIG. 24A and FIG. 24B depict a situation where the client device 104 has a bucket 1700 that is older than a bucket 1702 at the remote server 102, the client device 104 attempts to change its bucket, but that change is rejected by the remote server 102 since the client device 104 is unaware of the newer bucket at the remote server 102. Specifically, as shown in FIG. 24A, the client device 104 stores a bucket B1 having contents A and B, version v1, and timestamp t1. The client device 104 changes A to A'. The requested change 1704 is sent to the remote server 102 and includes the bucket identifier B1, version identifier v1, and desired change A'. On receipt the remote server 102 generates (although may not ever assign) a new timestamp t3 and version v3 for B1. As shown in FIG. 24B, the remote server's pre-existing bucket B1 has data A and B', version v2 and timestamp t2, where t2 is newer than t3. Since t2 is newer than t3, the remote server 102 has a newer bucket B1 than that which is sent by the client device 104. In this case, the remote server 102 rejects the proposed change, sends a bucket 1706 defining the state of its own bucket (B1, A and B', v2, t2) to the client device 104, and disposes of t3 and v3. The client device 104 replaces its bucket B1 with that received from the remote server 102, so that its bucket B1 changes state from bucket 1708 to bucket 1710.

FIG. 25A to FIG. 25D depict situations where the client device 104 sends a bucket that is newer than that stored at the remote server 102 (i.e., the timestamp assigned to the proposed change received by the client device 104 is newer than the timestamp of the corresponding bucket stored by the remote server 102), and the bucket stored at the remote server 102 may be as expected or different than that expected by the client device 104.

FIG. 25A and FIG. 25B depict the situation where the remote server's bucket is as expected by the client device 104. In this case, when the client device 104 attempts to change its bucket, the remote server 102 merges that change with its existing bucket and acknowledges the successful merge to the client device 104. Specifically, as shown in FIG. 25A, the client device 104 stores a bucket 1712 having bucket identifier B1, contents A and B, version v1, and timestamp t1. The client device 104 changes A to A'. The requested change is sent in bucket 1714 to the remote server 102 and includes B1, v1, and A'. On receipt the remote server 102 generates a new timestamp t2 and version v2 for B1. As shown in FIG. 25B, the remote server's pre-existing bucket 1716 having bucket identifier B1 is identical to that at the client device 104. Since the version v1 of the remote server's bucket B1 is the same as the version v1 of the client device's bucket B1, the remote server's B1 is as expected by the client device 104. And, since the timestamp t2 is newer than t1, the client device's requested change is newer than the remote server's stored bucket. In this case, the remote server 102 accepts the proposed change by merging A' into B1, assigning the new timestamp t2 and version v2 to B1, and storing the new bucket 1718. The remote server 102 then sends, for the bucket 1720, only the identifier B1, v2, and t2 to the client device 104. The client device 104 replaces A with A', and replaces its old version/timestamp v1/t1 with that sent by the remote server 102 (i.e., v2/t2), so that its bucket B1 changes state from bucket 1722 to bucket 1724.

FIG. 25A and FIG. 25C depict the situation where the remote server's bucket is different than that expected by the client device 104. In this case, when the client device 104 attempts to change its bucket, the remote server 102 merges that change with its existing bucket and, in addition to acknowledging the successful merge to the client device 104, also sends the contents of the merged bucket to the client device 104 since the contents of the remote server's bucket (and possibly the resulting merged bucket) were different than that expected by the client device 104. Specifically, as shown in FIG. 25A, the client device 104 stores a bucket 1712 having bucket identifier B1, contents A and B, version v1, and timestamp t1. The client device 104 changes A to A'. The requested change is sent to the remote server 102 and includes B1, v1, and A'. On receipt the remote server 102 generates a new timestamp t3 and version v3 for B1. As shown in FIG. 25C, the remote server's pre-existing bucket 1726 having bucket identifier B1 is different than the client device's, and has contents A and B', timestamp t2, and version v2. Since v2 is different than v1, the remote server's B1 is different than the client device's B1. And, since the timestamp t3 is newer than t2, the client device's requested change is newer than the remote server's stored bucket. Nevertheless, in this case the remote server 102 again accepts the proposed change by merging A' into B1, assigning the new timestamp t3 and version v3 to B1, and storing the new bucket 1728. In contrast to the preceding example, instead of sending only a bucket identifier, timestamp and version, in this case the remote server 102 also sends, for the bucket 1730, the contents A' and B' to the client device 104. The client device 104 replaces the entire contents of its bucket B1 with those received from the remote server 102, and also uses the received timestamp t3 and version v3, so that its bucket B1 changes state from bucket 1732 to bucket 1734.

FIG. 25A and FIG. 25D depict the situation where the remote server's bucket is different than that expected by the client device 104, but an optimistic concurrency flag (i.e., an override flag) is set. By setting the optimistic concurrency flag, the remote server 102 will refuse to accept any requested changes (by merge, overwrite, or otherwise) if the remote server's bucket does not have the same version as the client device's. This is because in some situations, merging requested changes with unknown data may generate undesirable or unpredictable results. Specifically, as shown in FIG. 25A, the client device 104 stores a bucket 1712 having bucket identifier B1, contents A and B, version v1, and timestamp t1. The client device 104 changes A to A'. The requested change is sent to the remote server 102 and includes B1, v1, and A'. On receipt the remote server 102 generates a new timestamp t3 and version v3 for B1. As shown in FIG. 25D, the remote server's pre-existing bucket 1736 having bucket identifier B1 is different than the client device's, and has contents A and B', timestamp t2, and version v2. Since v2 is different than v1, the remote server's B1 is different than the client device's B1. And, since the timestamp t3 is newer than t2, the client device's requested change is newer than the remote server's stored bucket. In contrast to the previous example where the remote server 102 merged the requested changes, however, since the optimistic concurrency flag is set, the remote server 102 here refuses to accept the proposed changes. Instead, the remote server 102 maintains its existing version of B1 and sends, in bucket 1738, a copy of B1 (including identifier B1, contents A and B', version v2, and timestamp t2) to the client device 104. The client device 104 then replaces the entire contents of its bucket B1 with those received from the remote server 102, and also uses the received timestamp t2 and version v2, so that its bucket B1 changes state from bucket 1740 to bucket 1742.

Figures 26A, 26B, 26C:
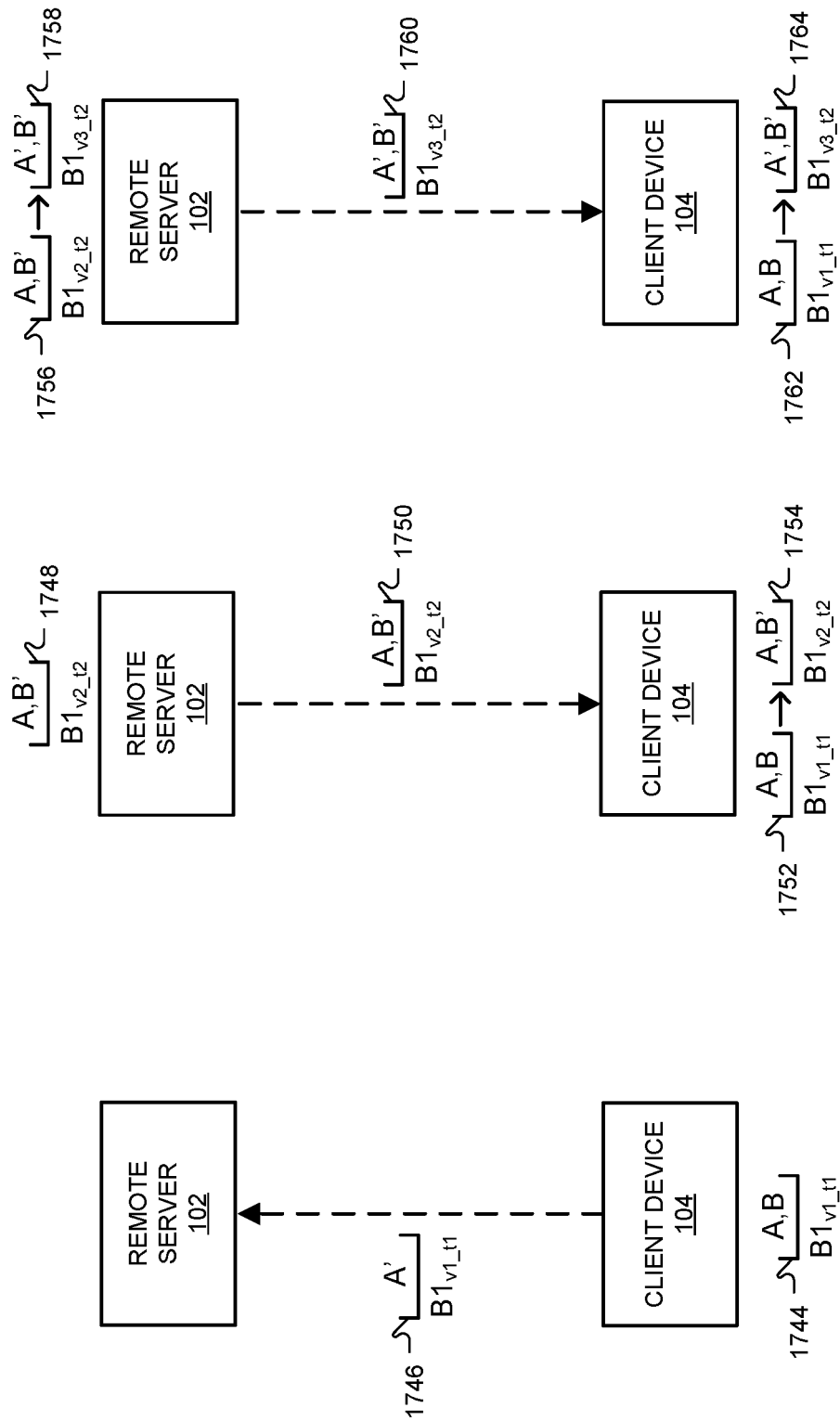
FIG. 26A through FIG. 26C illustrate an example of synchronizing the state of corresponding buckets at a client device and a remote server where the client device sends a bucket at the exact same time that the remote server had generated or received (from another device) a change to the same bucket.

FIG. 26A to FIG. 26C depict situations where the client device 104 sends a bucket at the exact same time that the remote server 102 had generated or received (from another device) a change to the same bucket. Thus, the timestamps of the bucket at the remote server 102 and the bucket received from the client device 104 are identical, but the versions are different since versions are randomly generated. The contents of the buckets may also be different. In this case, in response to the client device's request to change the contents of the bucket, the remote server 102 must determine whether to refuse the change request or accept the change request. In embodiment, the remote server 102 implements an algorithm wherein the rule is that the bucket having the highest version number 'wins'. Since the version numbers are randomly generated, whether the content change is accepted is also randomly determined.

FIG. 26A and FIG. 26B depict the situation where the remote server's bucket timestamp is identical to the assigned timestamp of the client device's requested change, and the remote server's bucket version is greater than the client device's bucket version so that the remote server 102 'wins'. In this case, when the client device 104 attempts to change its bucket, the remote server 102 refuses the change and instead sends its bucket to the client device 104. Specifically, as shown in FIG. 26A, the client device 104 stores a bucket 1744 having bucket identifier B1, contents A and B, version v1, and timestamp t1. The client device 104 changes A to A'. The requested change 1746 is sent to the remote server 102 and includes B1, v1, and A'. On receipt the remote server 102 generates a new timestamp t2 and version v3 for B1. As shown in FIG. 26B, the remote server's pre-existing bucket 1748 having bucket identifier B1 has a timestamp t2 equal to the newly assigned timestamp t2 of the client device's requested change. Since the timestamps are the same, the remote server 102 must choose a 'winner'. In this example, the remote server's bucket version v2 is greater than the client device's bucket version v1, and thus the remote server 102 'wins'. As a result, the remote server 102 refuses the proposed change and instead sends back bucket 1750 including bucket identifier B1, contents A and B', version v2 and timestamp t2. The client device 104 then replaces the entire contents of its bucket B1 with those received from the remote server 102, and also uses the received timestamp t2 and version v2, so that its bucket B1 changes state from bucket 1752 to bucket 1754.

FIG. 26A and FIG. 26C depict the situation where the remote server's bucket timestamp is identical to the assigned timestamp of the client device's requested change, and the remote server's bucket version is less than the client device's bucket version so that the client device 104 'wins'. In this case, when the client device 104 attempts to change its bucket, the remote server 102 accepts the change, merges the change into its existing bucket, and sends the resulting merged bucket to the client device 104. Specifically, as shown in FIG. 26A, the client device 104 stores a bucket 1744 having bucket identifier B1, contents A and B, version v1, and timestamp t1. The client device 104 changes A to A'. The requested change is sent to the remote server 102 and includes B1, v1, and A'. On receipt the remote server 102 generates a new timestamp t2 and version v3 for B1. As shown in FIG. 26C, the remote server's pre-existing bucket 1756 having bucket identifier B1 has a timestamp t2 equal to the newly assigned timestamp t2 of the client device's requested change. Since the timestamps are the same, the remote server 102 must choose a 'winner'. In this example, the remote server's bucket version v2 is less than the client device's bucket version v1, and thus the client device 104 'wins'. As a result, the remote server 102 accepts the proposed change, merging the change into B1 so that its bucket B1 changes state from bucket 1756 to bucket 1758, and assigning v3 to B1. The remote server 102 then sends the merged bucket 1760 (including identifier B1, the bucket contents A and B', version v3 and timestamp t2) back to the client device 104. The client device 104 then replaces the entire contents of its bucket B1 with those received from the remote server 102, and also uses the received timestamp t2 and version v3, so that its bucket B1 changes state from bucket 1762 to bucket 1764.

It should be recognized that the concept of an optimistic concurrency flag discussed with reference to FIG. 25D may also be used in the situation of equal timestamps discussed with reference to FIG. 26A through FIG. 26C. That is, if the optimistic concurrency flag is set, instead of merging the requested change when the client device 104 'wins' as discussed with reference to FIG. 25C, since the contents of the remote server's bucket may be different than that expected by the client device 104, the remote server 102 may refuse to perform the merge. In such a case, the remote server 102 would return its existing bucket to the client device 104 as discussed with reference to FIG. 26B.

Further, it should be appreciated that the specific operations illustrated in FIG. 24A to FIG. 26C provide particular examples for synchronizing the state of corresponding buckets at a client device and a remote server in response to a client device communicating a desired update to the remote server. These examples are merely for explanatory purposes. One of ordinary skill in the art would recognize and appreciate many variations, modifications, and alternatives.

Processes for Authenticating Devices for Communicating with a Remote Server

Overview. When communicating with the remote server 102, a client device 104 may authenticate itself using an identity and a matching secret. This pair, collectively called device credentials, form the basis of the trust relationship between the client device and the remote server. From the perspective of the remote server, anyone who possesses a valid device identity and secret is that device, and will be afforded the same privilege.

While device credentials provide a way for a client device to authenticate itself to the remote server, in some embodiments they may not provide a way for the remote server to authenticate itself to the client device. Thus device credentials may be used in the context of another protocol (e.g., SSL) that can affirm the identity of the service.

At any point in time a client device may possess up to two sets of credentials: a set of default credentials, and optionally, a set of assigned credentials. Default credentials are given to a device at manufacturing time and remain with it throughout its life. For example, FIG. 27A is a block diagram illustrating the communication of default credentials to a client device. A manufacturer 101 sends default credentials to the client device 104. In response, the client device 104 stores the received default credentials in its storage element 128.

Assigned credentials are given to the client device by the remote server 102 during the normal course of remote server/client device interaction. For example, FIG. 27B is a block diagram illustrating the communication of assigned credentials to a client device. The remote server 102 sends assigned credentials to the client device 104. In response, the client device 104 stores the received assigned credentials in its storage element 128, resulting in the client device 104 having both default credentials and assigned credentials.

Default credentials provide a means for a client device to assert that it is a legitimate device manufactured by an authorized entity. Assigned credentials provide a means for a client device to assert that it has been deemed trustworthy by the service and should be granted full privilege in all interactions.

Once a client device 104 is in possession of a set of assigned credentials it uses those exclusively when authenticating to the remote server 102. The client device 104 may fall back on its default credentials only when it has no assigned credentials, or when authentication using its assigned credentials fails.

The device credentials may be designed to be compatible with a wide variety of protocols. Any protocol that employs a user name and password, and provides acceptable length limits on those fields, should allow the use of device credentials for authentication. In many embodiments device credentials are used in the context of the HTTPS protocol. Accordingly, further description of the device credentials is provided in the context of the HTTPS protocol, although one of skill in the art would recognize the similar application of device credentials to other protocols, such as FTP, SMTP, TELNET, SSH, X400, X500, CMIP, etc.

Structure of Device Credentials. Device credentials may take the form of structured ASCII strings of variable length. In some embodiments, care is taken to ensure that these strings are reasonably small and that their character set is as neutral as possible with respect to inclusion in other protocols. The structured nature of device credentials, in some embodiments, allows them to convey information about how they were formed and the algorithms needed to verify them.

Device credentials in some embodiments are made up of multiple component strings separated by periods. Each component string is limited to the ASCII characters A-Z, a-z, 0-9, dash and underbar. Thus the legal character set for credential strings as a whole is those characters plus period. Component values that fall outside of the allowable character set (such as binary hash values) are encoded in URL64 format, a variant of Base64 designed for inclusion in URLs. The use of URL-64 may be particularly beneficial as it provides for a syntactically-neutral identity string, thereby allowing the deice credentials to be passed in URLs or other text contexts without a lot of special escaping. It should be recognized, however, that device credentials in other embodiments may take on different forms including one or more different character sets, such as EBCDIC, ISO 8859, ISCII, TSCII, VISCII, etc.

In one embodiment, the first component of the device credentials is called the scheme. The scheme is a short string that identifies the type of the credentials and the process by which they were formed. Schemes allow the remote server 102 to immediately recognize the type of credentials being presented. As new authentication mechanisms are introduced schemes help to distinguish old and new forms of credentials. In other embodiments, such as when only a single type of authentication mechanism is used or when other mechanisms are implemented to notify the remote server 102 as to the type of credentials being presented, the scheme component may be omitted.

The number and meaning of other components of the device credentials generally vary from one credential type to another and, in embodiments where a scheme component is included, may be determined by the scheme.

Default Credentials. During manufacturing the client device 104 is given a unique set of default credentials. A device's default credentials are used to authenticate it during its initial interactions with the remote server 102. They are also used in the case where a device is "wiped" or reset to factory defaults, either by direct action of the end user, or indirectly via the remote server 102. The default credentials remain with the physical device throughout its lifetime, and care is taken to ensure they are never lost (e.g. during a firmware upgrade).

Default credentials are produced computationally from a master key. During the manufacturing process, provisioning equipment on the manufacturing line generates the credentials from the master key and injects them into the device's persistent memory. In some embodiments, this may occur at the same time the client device 104 is assigned a serial number. In some embodiments, default credentials have the following structure:

```
<default-scheme> := 'd'
<default-id> := <default-scheme> + '.' + <serial-num> + '.' + <manufacturing-key-id>
<default-secret> := <default-scheme> + '.' + URL64( <default-MAC> )
```

Here, <serial-num> is the user visible serial number of the client device 104, <default-MAC> is a 256-bit message authentication code (MAC), and <manufacturing-key-id> is a string identifying the particular master key used to produce the MAC. The URL64( ) function signifies the encoding of a sequence of bytes in URL-64 format.

The MAC used in a default secret is produced from the default identity and a master manufacturing key using the following algorithm:

<default-MAC>:=HMAC-SHA256(<manufacturing-key>, ASCII(<default-id>))

Here, HMAC-SHA256( ) is the SHA-256 variant of the Hash-based Message Authentication Code algorithm, and <manufacturing-key> is a randomly generated 512-bit sequence assigned to the manufacturing line on which the device was produced. The ASCII( ) function signifies the encoding of a string as a sequence of bytes in ASCII form, not including a terminating null character.

It should be recognized that embodiments are not limited to default credentials having this particular structure. For example, the default scheme may be omitted. The <default-id> need not include the manufacturing-key-id, nor even the serial-num, but rather may use other strings or sequences of data that uniquely identify the client device. Further, the <default-secret> need not include the default scheme, and need not include a URL-64 encoded MAC, but rather may use other strings or sequences of data that form a secret known only to the client device 104 and the remote server 102.

Assigned Credentials. In addition to its default credentials, a client device 104 can acquire a second set of credentials called its assigned credentials. These credentials are given to the client device 104 by the remote server 102 over a secure connection. Once a client device 104 is in possession of a set of assigned credentials it uses those in preference to its default credentials until such time as it loses them (e.g. in a reset-to-factory state scenario), they are replaced, or they become invalid. To limit the opportunity for attack, the remote server 102 periodically assigns new credentials to client devices during its normal course of operation.

In some embodiments, assigned credentials have the following structure:

```
<assigned-scheme> := 'a'
<assigned-id> := <assigned-scheme> + '.' + <serial-num>
<assigned-secret> := <assigned-scheme> + '.' + URL64( <random-128> )
```

Here, <serial-num> is the user visible serial number of the client device 104 and <random-128> is a randomly generated 128-bit sequence that has been assigned to the device by the remote server.

It should be recognized, however, that embodiments are not limited to assigned credentials having this particular structure. For example, the default scheme may be omitted. The <assigned-id> need not include the serial-num, but rather may use other strings or sequences of data that uniquely identify the client device. Further, the <assigned-secret> need not include the default scheme, and need not include a URL-64 encoded random number, but rather may use other strings or sequences of data that form a secret known only to the client device 104 and the remote server 102.

Validation of Credentials. In some embodiments, default and assigned credentials are validated using a common process. The remote server 102 maintains a database of credentials for each known device; for example, the database may be stored in storage element 118, or in a storage element (not shown) remote from storage element 118. To guard against loss, the remote server 102 stores the secret portion of the credentials in hashed form using a one-way hash function, such as the SHA-256 one-way hash function. At validation time, the secret offered by the client device is hashed using the same function and the resultant value compared against the corresponding value stored in the database. If the two values match the offered credentials are considered authentic.

Secret hashes may be generated as follows:

```
<hashed-secret>:=SHA256(ASCII(<secret>))
```

Because the hashed form of the secret is irreversible, front end servers performing device authentication may cache the hashed credentials locally to improve performance. For example, the registration server 112, synchronization server 114, and/or the logging server 116 may store hashed credentials where the non-hashed credentials are stored in the storage element 118 or in a storage element (not shown) remote from storage element 118. Where this occurs, the cached credentials may be revalidated periodically. For example, at least every 6 hours, 12 hours, 18 hours, 24 hours, 30 hours, 36 hours, in a range from 6 hours to 36 hours, at time periods less than 6 hours, or at time periods greater than 36 hours. By revalidating the cached credentials the front end servers performing device authentication confirm that the hashed credentials are still accurate. Further, the cached credentials may be revalidated at non-periodic intervals. For example, the hashed credentials may be revalidated in response to an authentication failure.

To guard against information leakage, in some embodiments, the remote server 102 may use a constant-time comparison algorithm when comparing secret hashes.

Authentication Protocol. Authentication between a client device 104 and the remote server 102 may occur within the context of any number of different communication protocols such as such as FTP, SMTP, TELNET, SSH, X400, X500, CMIP, etc. For explanation purposes, the following description describes device authentication within the context of an HTTP interaction.

In the context of HTTP, a client device 104 uses the HTTP Basic Access Authentication protocol (as described in, e.g., RFC-2617) to orchestrate the authentication interaction with the remote server 102. When forming the HTTP Authorization header, the device's identity and secret are used as the userid and password, respectively.

The client device 104 and remote server 102 implement the standard authentication interchange defined by the HTTP protocol. Specifically, at any time the service may respond to a request from a device with a 401 (Unauthorized) response demanding authentication. The 401 response may contain a WWW-Authenticate header requesting the use of basic authentication. Upon receiving the 401 response, the client device 104 re-issues the request including an Authorization header containing the device credentials. Upon receiving a request with an Authorization header, the remote server 102 unpacks the device credentials and validates them as described in the section on Validation of Credentials.

Because the client device 104 is always in possession of a set of credentials (either default or assigned), it may, in some embodiments, anticipate the need for authentication by including an Authorization header in a request without waiting for the remote server 102 to respond with a 401 response. This can be used to avoid an extra initial round-trip between the device and remote server 102.

In the event that the credentials supplied by the device are invalid, the remote server 102 will respond to the request with a 401 (Unauthorized) response. The device distinguishes a 401 denoting authentication failure by observing whether it sent an Authorization header in the associated request—if it did, then the credentials used in the request are bad.

If an authentication failure occurs while the device is using its assigned credentials, the device will discard the credentials from its persistent memory and repeat the authentication using its default credentials. Note that this will likely result in a loss of privilege for the device (see the section on Security Implications of Assigned Credentials).

If an authentication failure occurs while the device is using its default credentials, the device may wait for a short period and retry the request using the same credentials. If failures continue to occur, in some embodiments the device may wait for progressively longer periods between retries. The periods may reach a maximum duration, such as once every 5 minutes, once every 10 minutes, once every 15 minutes, a range of once every 5 minutes to once every 15 minutes, once in a time period less than 5 minutes, or once in a time period greater than 15 minutes.

In some embodiments, all authentication interactions between a client device 104 and the remote server 102 take place over a secure connection using, e.g., SSL. During SSL connection negotiation, the client device 104 authenticates the remote server 102 using, e.g., standard certificate-based SSL server authentication. At no time will the client device 104 send an Authorization header containing its credentials over an unsecured connection, or to a server that is not properly authenticated as belonging to a particular entity. Similarly, the remote server 102 may reject with a permanent failure any attempt to authenticate a client device 104 over an unsecured connection.

Credential Assignment Protocol. When the remote server 102 assigns new credentials to a client device 104, the credentials may be conveyed to the device as part of a normal HTTP interaction. Specifically, new credentials may be conveyed in a X-nl-set-client-credentials header that is included in the HTTP response from the remote server 102. The syntax for such a header is:

'X-nl-set-client-credentials' ':' 1*SP <device-id>1*SP <device-secret>

Here, <device-id>and <device-secret>are character strings representing the device's new identity and secret, where "1*SP" represents one or more ASCII space characters. The contents of the identity and secret strings are, in some embodiments, limited to the ASCII characters A-Z, a-z, 0-9, colon, dash, underbar and period. In other embodiments, the identity and/or secret strings may take on different forms including one or more different character sets, such as EBCDIC, ISO 8859, ISCII, TSCII, VISCII, etc.

The X-nl-set-client-credentials header may be included in any response generated by the remote server 102. Once received by the client device 104, the client device 104 discards any existing assigned credentials it possesses and stores the new credentials in its persistent memory. From that point on, the device uses the new credentials in any subsequent authenticated interactions with the remote server 102.

As mentioned, in some embodiments the client device 104 only accepts new assigned credentials over a secure connection (e.g., SSL) where the party at the other end of the connection is known to be the remote server 102 (as established by, e.g., the SSL server authentication). Similarly the remote server 102 may only send an X-nl-set-client-credentials header containing new credentials to a device over a secure connection. Additionally, the remote server 102 will only send new credentials in response to a request that has been authenticated with a valid set of device credentials (using the mechanism described in Authentication Protocol).

Management of Assigned Credentials. When a client device 104 first connects to the remote server 102 it uses its default credentials to authenticate itself. During this initial interaction the device is given a new set of assigned credentials which it must use in further communication with the remote server 102. Thereafter, in some embodiments, the remote server 102 assigns new credentials to the device during subsequent interactions. Rotation of assigned credentials may occur periodically, e.g., every week, every month, every year, after a time period in a range from a week to a year, in a time period less than a week, or in a time period greater than a year. Rotation of assigned credentials may also or alternatively occur non-periodically. For example, after the client device 104 connects to the remote server 102 a certain number of times.

Assigned credentials remain valid until they are replaced by the remote server 102. Because credential rotation typically occurs at a point where the client device 104 and remote server 102 are interacting, devices that are unable to communicate with the remote server 102 for long periods of time do not lose their ability to authenticate.

The remote server 102 may, in some embodiments, strive to assign new credentials according to its own schedule. In particular, an outside entity cannot induce the remote server 102 to generate new assigned credentials other than by authenticating with a set of valid default credentials. To restrict repeated attempts to generate new assigned credentials using a stolen set of default credentials, the remote server 102 may limit the rate at which a client device 104 can authenticate with a particular set of default credentials to a small number of times per hour (e.g., 5, 10, 15, in a range from 5 to 15, less than 5 or greater than 15).

Due to communication failures it is possible for the credentials assigned to the client device 104 to be out of sync with the those stored in the remote server 102. Specifically, if the message conveying a new set of credentials to a client device 104 is lost, the remote server 102 will possess the new credentials while the client device 104 will still be operating with the old credentials. To allow the client device 104 to recover from this state, the remote server 102 implements a grace period wherein it allows a client device 104 to authenticate using either new or old credentials. The grace period typically begins at the point where the client device 104 authenticates using the old credentials and the remote server 102 determines that it is time to assign a new set, although in other embodiments different starting points may be selected. Once the grace period starts, any use of the old credentials will trigger the remote server 102 to re-send the new credentials to the client device 104. Once the grace period ends, the remote server 102 discards the old credentials and any further attempt to authenticate with them is rejected. The duration of the grace period may be, e.g., 12 hours, 24 hours, 36 hours, in a range from 12 hours to 36 hours, less than 12 hours, or greater than 36 hours. In some embodiments, even if the grace period ends, the client device 104 may still authenticate itself using default credentials.

Generation of Default Secret Hashes. Within the remote server 102, device authentication is supported by a credentials database (provided, e.g., at registration server 112, synchronization server 114, logging server 116, etc.) that contains the secret hashes for each known client device 104. Prior to new devices connecting to the remote server 102, the default secret hashes for the new devices may be generated and loaded into the credentials database. The secret hash generation process takes as input a list of device identifiers, such as device serial numbers. The secret hash generation process employs the same encryption algorithm as used by the manufacturer uses to provide default credentials to a client device 104. For example, the remote server 102 may apply the HMA-SHA256 algorithm using a manufacturing key (e.g., the key identified by the default credentials provided by a client device 104) and the serial number(s) of the client device(s) associated with that manufacturing key.

Security Implications of Assigned Credentials. It should be recognized that possession of a valid set of assigned credentials does not necessarily imply that a client device 104 is trustworthy in any way, or that it should be granted access to any privileged information or services. The trustworthiness of a client device 104 rather may be established by means outside of the device authentication mechanism-- for example, by prompting the owner to enter a passcode to associate (e.g., pair) the client device 104 with their account. Once trust has been established, a device's assigned credentials serve to prove to the remote server 102 that the client device 104 in question is indeed the one with which the trust relationship exists.

From this it can be seen that the trust relationship may be a relationship between a user's account and the device's credentials. After trust is established, anyone having the trusted device's credentials is for all intents and purposes that client device 104, regardless of whether they actually have physical possession of the client device 104. Conversely, if a client device 104 loses its credentials, it may be forced to reestablish the trust relationship by the same (or stronger) means as used when it first became trusted (i.e., the client device 104 may need to be re-paired with the user's account).

Security Implications of Default Credentials. The ability for a client device 104 to present a valid set of default credentials provides confidence to the remote server 102 that the client device 104 is indeed an authentic piece of hardware manufactured by a particular entity. This confidence is not absolute, however. A malicious person with legitimate access to the client device 104—say a person on involved in the manufacturing process, or an employee of a third-party device installer/distributor—could extract a device's default credentials and use them later to spoof the device. Furthermore the master keys used to create default credentials may be vulnerable to direct or social engineering attacks.

For these reasons, a client device 104 that is authenticated via its default credentials is, in some embodiments, never granted significant privilege with respect to the remote server 102. The primary privilege that the remote server 102 grants to such a client device 104 is the ability to acquire new assigned credentials, which is the first step towards establishing trust.

The relative strength of default credentials also allows the remote server 102 to trust certain types of information it receives from the client device 104. For example the remote server 102 can record and monitor log data from a client device 104 authenticated with default credentials, allowing customer support personnel to diagnose connection or authentication problems that prevent a client device 104 from becoming fully trusted. Despite this, the remote server 102 must still take reasonable precautions against abuse of this privilege, as a malicious person could extract a set of default credentials from a client device 104 and use them to flood the system with bogus log information.

Device Behavior When Authenticating to the Remote Server

Initial Contact and Normal Operation. When a new client device 104 starts, in many embodiments its first request is to the registration server 112. This interaction is authenticated using the device's default credentials, which, in some embodiments, are presented to the remote server 102 in the HTTP Authorization header.

When the registration server 112 responds to this request, it returns an initial set of assigned credentials for the client device 104 in, e.g., the X-nl-set-client-credentials response header. Upon receiving this header, the client device 104 extracts the new credentials and stores them in persistent storage, such as storage element 128.

Subsequently, the client device 104 presents its assigned credentials on every request to the remote server 102. The assigned credentials remain in effect until 1) they are rotated out by the remote server, 2) the client device is reset to factory defaults, or 3) an error occurs that forces the client device it to reset its credentials.

Credential Rotation. On a periodic (or non-periodic) basis the remote server 102 delivers to the client device 104 a new set of assigned credentials to replace its existing credentials. As in the initial contact case, the new credentials may be returned via the X-nl-set-client-credentials response header. Credential rotation can occur on any interaction with one of the remote server 102 end-points, such as registration server 112, synchronization server 114, or logging server 116.

When the client device 104 receives new assigned credentials it updates its copy of the assigned credentials it has stored in its persistent storage. In many embodiments, this occurs as soon as it receives the X-nl-set-client-credentials header from the remote server 102. In at least one embodiment, the client device 104 may use long-polling where it communicates a request to subscribe to all relevant buckets (see, e.g., step 326 described with reference to FIG. 10). In such cases, the client device 104 may update its credentials as soon as the head of the long-poll response is received, not when the body of the response (if any) comes in.

Handling Authentication Failures. In certain rare situations the client device 104 may end up with a set of assigned credentials that the remote server 102 considers invalid. When this happens, the remote server 102 will reject requests using these credentials with, e.g., an HTTP 401 Unauthorized response. Whenever the client device 104 receives this error from the remote server 102, it immediately discards its local copy of the assigned credentials and returns to the registration server 112 using its default credentials. This behavior may occur for any request made from the client device 104 to any remote server 102 end-point.

In some embodiments, during the time between an authentication failure and the point at which the client device 104 successfully receives new assigned credentials from the registration server 112, the client device 104 suppresses all communication with the remote server 102 other than those with the registration server 112 and, in some cases, with the logging server 116. In other embodiments, the client device 104 may attempt one or more retries before discarding its credentials and returning to the registration server 112.

Since all client devices should be manufactured with valid default credentials, the remote server 102 should never return an HTTP 401 Unauthorized response to a client device 104 using default credentials. However, in some situations (e.g., stolen devices, stolen default credentials, etc.) this may occur. In the event the remote server 102 rejects the default credentials of a client device 104, the client device 104 may implement a back-off algorithm where it waits for progressively longer periods between retries until it succeeds.

In the event that a user invokes the device's reset to factory defaults feature, the client device 104 clears its assigned credentials and reverts to the initial contact behavior described above.

Remote Server Behavior When Authenticating a Client Device

Registration Server Authentication Behavior. Client devices are allowed to authenticate to the registration server 112 using either default or assigned credentials. When a client device 104 authenticates using default credentials, the behavior of the remote server 102 depends on whether the client device 104 has contacted the remote server 102 previously.

Initial Contact. When the registration server 112 receives a request from a client device 104, if no assigned credentials exist for the client device 104 in, e.g., the assigned credentials 198 of storage element 118, the remote server 102 considers the request to be the first contact between the client device 104 and the remote server 102. In this case the remote server 102 immediately generates a new set of assigned credentials and returns them to the client device 104. The client device 104 is then expected to use these credentials for further interactions with the remote server 102.

Device Return. Under normal situations, when a client device 104 returns to the registration server 112, it authenticates using its assigned credentials. During this interaction, the device's assigned credentials may be subject to periodic rotation as previously described and further described below.

Lost Credentials. Under some circumstances a client device 104 that had previously been given assigned credentials may return to the registration server 112 using its default credentials. This situation can arise in at least two cases: (1) The client device 104 contacts the registration server 112 for the first time and presents its default credentials. The registration server 112 responds with a new set of assigned credentials, however the response is lost, e.g. due to connectivity problems. Subsequently the client device 104 retries the request to the registration server 112, again using its default credentials. This is the 'initial contact' scenario. (2) The client device 104 contacts the remote server 102 using out-of-date assigned credentials. The remote server 102 detects the out-of-date credentials and assigns a new set of credentials, however the response is lost. Subsequently the client device 104 is off-line for a period longer than the assigned credentials grace period. When connectivity is restored, the client device 104 attempts to connect using old credentials which the remote server 102 rejects with, e.g., an HTTP 401 Unauthorized response. Upon receiving this the client device 104 discards its assigned credentials and returns to the registration server 112 using its default credentials. This is the 'lost credentials' scenario.

The remote server 102 may distinguish the lost credentials scenario from the initial contact scenario by detecting the presence of assigned credentials in, e.g., the storage element 118. When the remote server 102 detects that a client device 104 has lost its credentials, it resets the device's authentication state in, e.g., the storage element 118, discarding any old credential information in the process, and generates a new set of assigned credentials for the client device 104. At the same time, the remote server 102 unpairs the client device 104 from its structure (i.e., unpairs the client device 104 from a previously paired user account), forcing the client device 104 through the pairing process to prove its authorization to access user data.

Bad Credentials. Any attempt by a client device 104 to authenticate to the registration server 112 using invalid credentials (either default or assigned) may be logged (e.g., by logging server 116) and immediately rejected with, e.g., an HTTP 401 Unauthorized response.

Synchronization Server Authentication Behavior. In many embodiments, all interactions between the client device 104 and its assigned synchronization server 114 use assigned credentials. Any attempt by a client device 104 to authenticate to synchronization server 114 using default credentials may be immediately logged (using, e.g., the logging server 116) and rejected with, e.g., an HTTP 401 Unauthorized response. Similarly, any attempt by a client device 104 to authenticate to the synchronization server 114 using invalid credentials (default or assigned) may be logged and immediately rejected with, e.g., an HTTP 401 Unauthorized response.

During its interactions with the synchronization server 114, a device's assigned credentials may be subject to rotation as previously described and further described below.

Logging Server Authentication Behavior. Client devices 104 can authenticate to the logging server 116 using either assigned credentials or default credentials. In both cases the logging server 116 will accept and store a log file upload from the client device 104. In some embodiments, in order to ensure that client devices can always upload logs, the logging server 116 also accepts log files from a client device 104 that authenticates with invalid credentials (either assigned or default).

The logging server 116 may, however, characterize any uploaded log files based on the type of authentication credentials presented and/or the validity of the authentication credentials. For example, the logging server 116 may characterize all uploaded log files as being unauthenticated unless the client device 104 authenticates with valid assigned credentials. For another example, the logging server 116 may characterize uploaded log files as being unauthenticated unless the client device 104 authenticates with valid assigned credentials or valid default credentials. Further, in some embodiments there may be additional types of characterization other than 'unauthenticated' and 'authenticated'. For example, there may be three layers of characterization, where valid assigned credentials are associated with the highest level of authentication, valid default credentials are associated with a middle level of authentication, and any invalid credentials are associated with a lowest level of authentication.

In some embodiments, whenever the client device 104 presents valid assigned credentials to the logging server 116 the credentials are subject to normal rotation as previously described and further described below.

Further, in some embodiments, unlike the registration server 112, when a client device 104 authenticates to the logging server 116 using default credentials the remote server 102 does not generate new assigned credentials for the client device 104. This may avoid a race condition in the lost credentials scenario where the client device 104 goes back to the registration server 112 to acquire new credentials while simultaneously uploading logs to the logging server 116.

Credential Rotation. Once assigned credentials exist for a client device 104, they may be subject to periodic rotation on each contact with the remote server 102. Rotation happens when a client device 104 authenticates to a remote server 102 end-point and the remote server 102 determines that the current device credentials have exceeded their configured lifetime. Rotation of assigned credentials may occur periodically, e.g., every week, every month, every year, after a time period in a range from a week to a year, in a time period less than a week, or in a time period greater than a year. Rotation of assigned credentials may also or alternatively occur non-periodically. For example, after the client device 104 connects to the remote server 102 a certain number of times. Credential rotation may occur with any one or more end points of the remote server 102.

Use of Old Assigned Credentials. Once credential rotation happens, it is possible for a client device 104 to make a request to the remote server 102 using old credentials—specifically, using the credentials that were in effect immediately prior to the most recent rotation. This can happen in at least two situations: (1) If the remote server 102 generates a response containing new credentials, but the response is lost (e.g. due to communication errors) before it gets to the client device 104. In this case the client device 104 still has the old credentials while the remote server 102 is expected new credentials. (2) If the client device 104 makes multiple simultaneous requests to the remote server 102 (e.g. a request to the synchronization server 114 and a request to the logging server 116), network or server processing latencies can result in a request containing old credentials being processed by the remote server 102 after another request from the same client device 104 has caused a credential rotation.

To handle these situations, whenever the remote server 102 rotates a device's assigned credentials, the remote server 102 may retain the information needed to authenticate the device's old credentials. Thereafter, for a configurable period of time (i.e., a grace period which may be, e.g., 12 hours, 24 hours, 36 hours, in a range from 12 hours to 36 hours, less than 12 hours, or greater than 36 hours), the remote server 102 will allow a client device 104 to authenticate using either its current or old credentials. Every time a client device 104 authenticates using its old credentials during this grace period the remote server 102 may (once again) instruct the client device 104 to update its credentials to the current ones. In many embodiments, once the grace period expires further attempts to authenticate using the old credentials are immediately rejected by the remote server 102 with an HTTP 401 Unauthorized response.

Figure 28A:
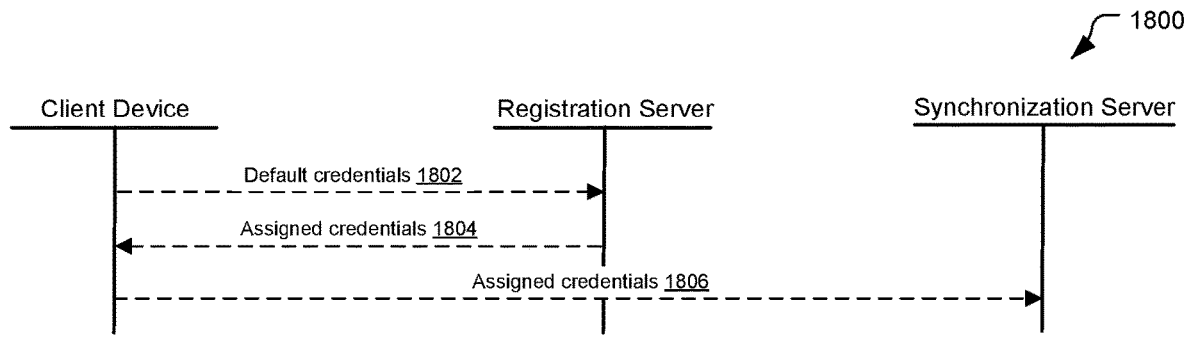
FIG. 28A illustrates a communication sequence of a process for authenticating a client device to communicate with its assigned synchronization server according to an embodiment.

Turning now to the Figures, FIG. 28A to FIG. 32C graphically depict some of the various aforementioned authentication processes. Specifically, FIG. 28A illustrates a communication sequence 1800 of a process for authenticating a client device to communicate with its assigned synchronization server according to an embodiment. The process 1800 may be performed in a variety of situations. For example, the process 1800 may be performed on the initial connection of the client device 104 to the remote server 102, subsequent connection after the client device 104 has lost its assigned credentials, etc. In operation 1802, the client device 104 communicates its default credentials to the registration server 112. In response, the registration 112 server generates and sends assigned credentials to the client device 104. The client device may then use those assigned credentials to establish communications with other elements of the remote server 102, such as its assigned synchronization server 114A.

Figure 28B:
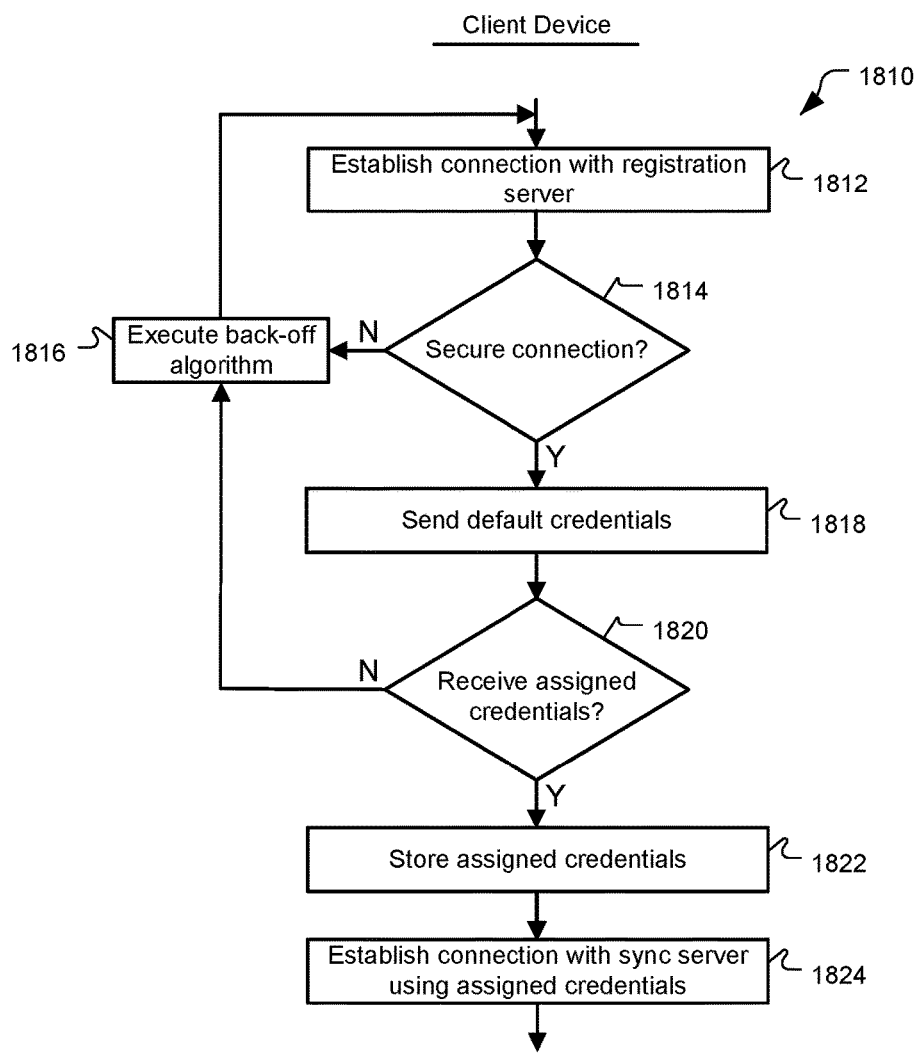
FIG. 28B is a flowchart of a process for a client device to communicate with its assigned synchronization server according to an embodiment.

FIG. 28B is a flowchart of a process 1810 for a client device to communicate with its assigned synchronization server according to an embodiment. In operation 1812, the client device 104 establishes a connection with the registration server 112. The client device 104 may establish its connection using, e.g., the registration server location 128A provided in the storage element 128. Once connected and prior to sending its default credentials, in operation 1814 the client device 104 may determine whether the connection it has established with the registration server 112 is a secure (e.g., SSL, TSL, etc.) connection. If the connection is not secure, processing may continue to operation 1816 where the client device 104 executes a back-off algorithm. In performing the back-off algorithm the client device 104 may wait for progressively longer periods before attempting to establish a secure connection with the registration server 112. In some embodiments, however, the client device 104 may not implement a back-off algorithm, but rather may continuously attempt to re-establish a secure connection with the registration server 112 at, e.g., periodic intervals.

If the connection however, is determined to be secure, processing may continue to operation 1818. In operation 1818 the client device 104 communicates its default credentials (e.g., default credentials 128E) to the registration server 112. The default credentials typically include a device identifier and a device secret.

Once the default credentials are sent, the client device 104 expects the registration server 112 to provide assigned credentials to the client device 104. Accordingly, in operation 1820, the client device 104 determines whether or not it has received assigned credentials from the registration server 112. If the client device 104 does not receive the assigned credentials (e.g., after a certain period of time), this may be indicative of a communication failure or other type of failure. Accordingly, processing may continue to operation 1816.

Otherwise, processing continues to operation 1822, where the client device 104 stores the received assigned credentials. For example, the client device 104 may stored the received credentials as the assigned credentials 128F in storage element 128.

Once the client device 104 has acquired assigned credentials, it may then successfully communicate with one or more elements of the remote server 102. In this particular embodiment, in operation 1824 the client device 104 establishes a connection with its assigned synchronization server 114 using the assigned credentials 128F. It should be recognized, however, that the client device 104 may also or alternatively establish connections with other elements of the remote server 102 using its assigned credentials, such as the registration server 112, the logging server 116, etc.

Figure 28C:
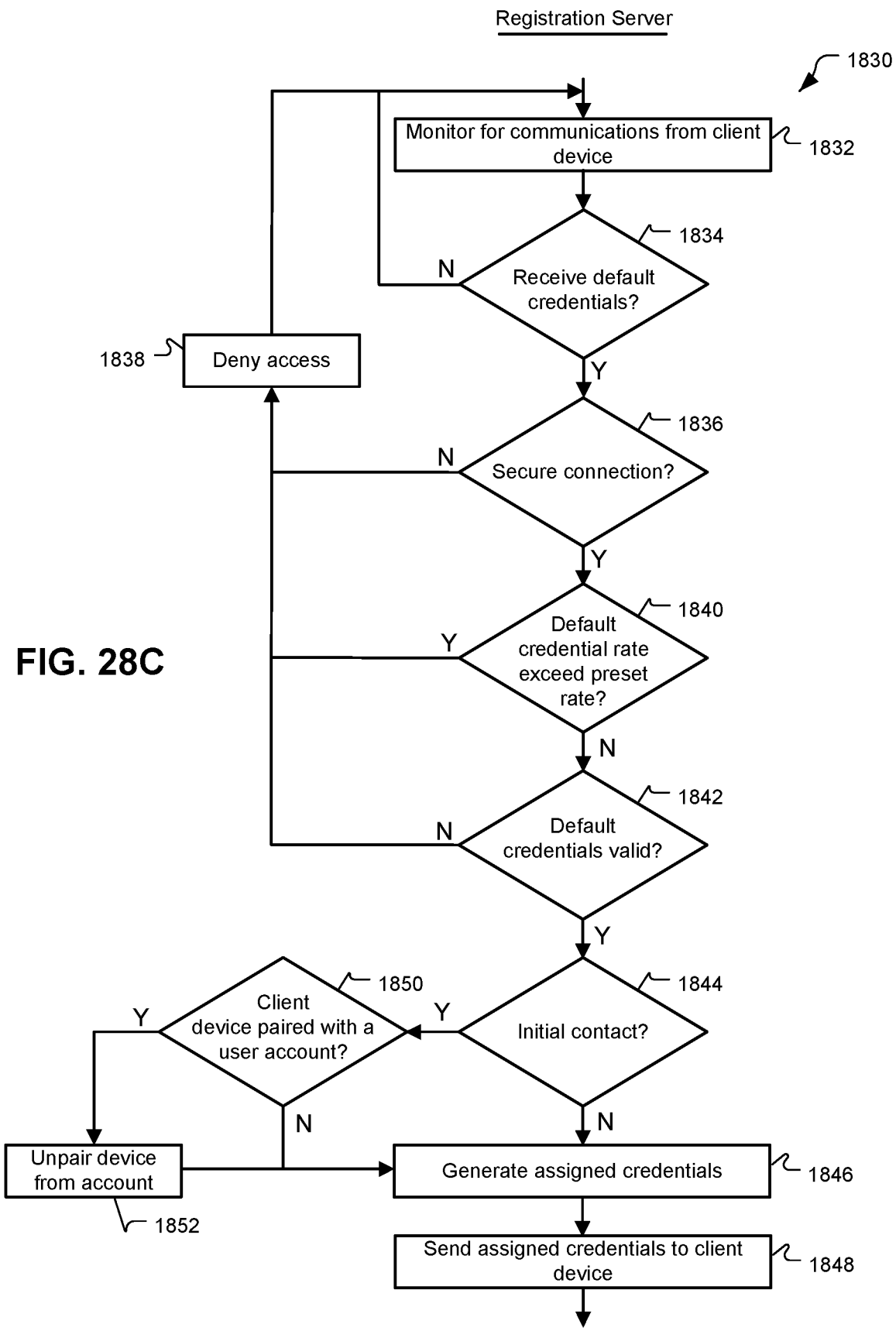
FIG. 28C is a flowchart of a process for a registration server to generate assigned credentials for a client device according to an embodiment.

FIG. 28C is a flowchart of a process 1830 for a registration server to generate assigned credentials for a client device according to an embodiment. In operation 1832 the registration server 112 monitors for communications from one or more clients devices. Upon receiving a communication from a client device 104, processing continues to operation 1834, where the registration server 112 determines whether or not it received default credentials from the client device 104. If not, then the registration server 112 may continue to monitor for communications from the client device 104, optionally disconnecting from the client device after a certain period of time. Otherwise, the processing may continue to operation 1836.

In operation 1836, the registration server 112, prior to sending any assigned credentials to the client device, determines whether or not its connection with the client device 104 is secure. If not, then processing may continue to operation 1838 where the registration server 112 denies the client device 104 access to one or more resources (e.g., assigned credentials) provided by the registration server 112. In denying access to resources, the registration server 112 may optionally disconnect from the client device after, e.g., a certain period of time. If the registration server 112 determines that its connection with the client device 104 is secure, then processing may continue to operation 1840.

In operation 1840, the registration server 112 determines whether the rate at which default credentials have been communicated to the registration server 112 from a particular client device exceed a preset rate. For example, the registration server 112 may determine whether a particular client device 104 has presented default credentials a rate of 5 times per hour, 10 times per hour, 15 times per hour, a range in the range of 5 to 15 times per hour, a rate of less than 5 times per hour, or a rate greater than 15 times per hour. If a client device 104 has presented its default credentials at such a rate, this may be indicative of a security breach such as repeated attempts to generate new assigned credentials using a stolen set of default credentials. Accordingly, if the preset rate is exceeded, then processing may continue to operation 1838. Otherwise, processing may continue to operation 1842.

In operation 1842, the registration server 112 determines whether the default credentials are valid. For example, the registration server 112 may compare the received default credentials with default credentials stored by the registration server 112 associated with the connected client device 104 (e.g. one of the default credentials 198 stored by the registration server 112 into storage element 118). In one particular embodiment, the received default credentials may include a default identifier and a default secret, where the default identifier uniquely identifies the client device and the default secret is a unique string or data sequence associated with the client device that is known only to the client device and the registration server. On receiving the default credentials, the registration server 112 uses the default identifier to identify the default secret (stored at, e.g., the storage element 118) that corresponds to the client device. The registration server 112 then compares the received default secret with its stored default secret. If they match, then the default credentials are considered to be valid. Otherwise, they're considered to be invalid.

In some embodiments, the default identifier may include a manufacturing key identifier that identifies the manufacturing key used to encrypt the default secret. The default secret may, e.g., be the default identifier encrypted using the manufacturing key identified by the manufacturing key identifier. Accordingly, the registration server may first identify the manufacturing key identified by the received manufacturing key identifier, use the key to encrypt (e.g., perform a one-way hash using an algorithm such as HMAC-SHA256) the default identifier, and compare the result with the received default secret to determine whether the default credentials are valid. In such a case, while default secrets corresponding to various devices 104 may be pre-stored at the registration server 112, in some embodiments they may not be pre-stored but rather generated from the received default identifier and a stored manufacturing key.

In some embodiments, the default credentials may also include a scheme identifier that identifies the type of credentials being communicated from the client device. In this particular embodiment, the scheme indicates that the credentials are default credentials. Such a scheme may be used by the registration server 112 (and other elements of the remote server 102) to allow the registration server 112 to quickly and effectively determine whether default credentials, assigned credentials, or another type of device credentials are being communicated from the client device.

If the registration server 112 determines that the received default credentials are valid, then processing continues to operation 1844 where the registration server 112 determines whether the contact from the client device 104 is an initial contact (e.g., the first time the client device is requesting assigned credentials) or a subsequent contact (e.g., the second, third, or subsequent time the client device is requesting assigned credentials).

The registration server 112 may make such a determination using one or more of a number of different techniques. In one embodiment, the registration server 112 may look to see whether it has any assigned credentials (e.g., one of assigned credentials 150G) stored for the connected client device 104. In another embodiment, the registration server 112 may check to see if an initial contact flag for the connected client device 104 has been set, where the initial contact flag may be set the first time the client device 104 presents default credentials to the registration server 112.

If the registration server 112 determines that the contact from the client device 104 is an initial contact, then processing may continue to operation 1846. In operation 1846, the registration server 112 generates assigned credentials for the connected client device 104 and stores the assigned credentials in a storage element accessible by various elements of the remote server 102. For example, the registration server 112 may store the assigned credentials as the assigned credentials 199 in the storage element 118. The assigned credentials may include, e.g., an assigned identifier that uniquely identifies the client device 104. In one embodiment, the assigned identifier includes a device serial number extracted from the received default credentials. The assigned credentials may also include an assigned secret where the assigned secret is a unique string or data sequence associated with the client device that is known only to the client device and the registration server and is provided by the remote server 102. The assigned secret in one embodiment is a random number, e.g., a randomly generated 128-bit sequence. Once the assigned credentials are generated, in operation 1848, the assigned credentials are communicated to the client device 104.

On the other hand, at operation 1844 if the registration server 112 determines that the contact from the client device 104 is not an initial contact (i.e., it is a subsequent contact), then processing may continue to operation 1850. In cases where the registration 112 determines that the contact from the client device 104 is not an initial contact, this may indicate that the client device 104 somehow lost its assigned credentials. This may be indicative of a security breach, and thus the registration server 112 may force the client device 104 to re-pair with a user account as necessary. Accordingly, in operation 1850, the registration server 112 determines whether the client device is paired with a user account. If it is, then processing may continue to operation 1852, where the registration server 112 unpairs the device from the account, effectively forcing the user of the client device 104 to re-pair the device with the account, after which processing continues to operation 1846. Otherwise, processing may continue to operation 1846 without un-pairing the device.

Figure 28D:
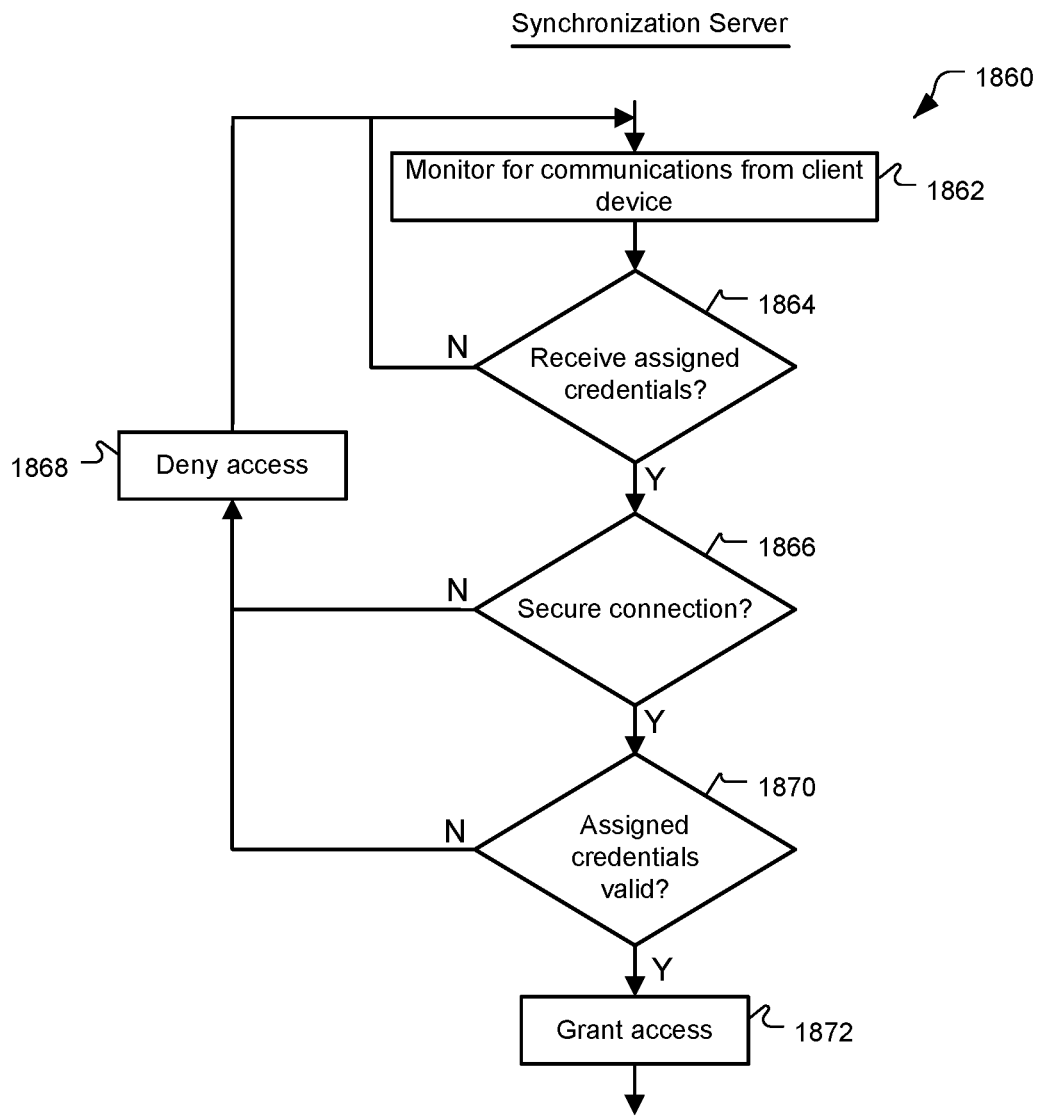
FIG. 28D is a flowchart of a process for a synchronization server to communicate with an assigned client device according to an embodiment.

FIG. 28D is a flowchart of a process 1860 for a synchronization server to communicate with an assigned client device according to an embodiment. It should be recognized that while process 1860 is described in the context of communication with a synchronization server 114, a similar process may be used to facilitate communication with other elements of the remote server 102 using assigned credentials, such as the registration server 112, the logging server 116, etc.

In operation 1862, the synchronization server monitors for communications from one or more clients devices. Upon receiving a communication from a client device 104, processing continues to operation 1864, where the synchronization server 114 determines whether or not it received assigned credentials from the client device 104. If not, then the synchronization server 114 may continue to monitor for communications from the client device 104, optionally disconnecting from the client device after a certain period of time. Otherwise, processing may continue to operation 1866.

In operation 1866, the synchronization server 114, prior to granting access to one or more secure resources, determines whether or not its connection with the client device 104 is secure. If not, then processing may continue to operation 1868 where the synchronization server 114 denies the client device 104 access to one or more resources (e.g., data buckets) provided by the synchronization server 114. In denying access to resources, the synchronization server 114 may optionally disconnect from the client device after, e.g., a certain period of time. If the synchronization server 114 determines that its connection with the client device 104 is secure, then processing may continue to operation 1870.

In operation 1870, the synchronization server 114 determines whether the assigned credentials presented by the client device are valid. If they are valid, processing may continue to operation 1872 where the synchronization server 114 grants the client device access to secure resources (e.g., data buckets associated with device). Otherwise, processing may continue to operation 1868 where access is denied.

Figure 28E:
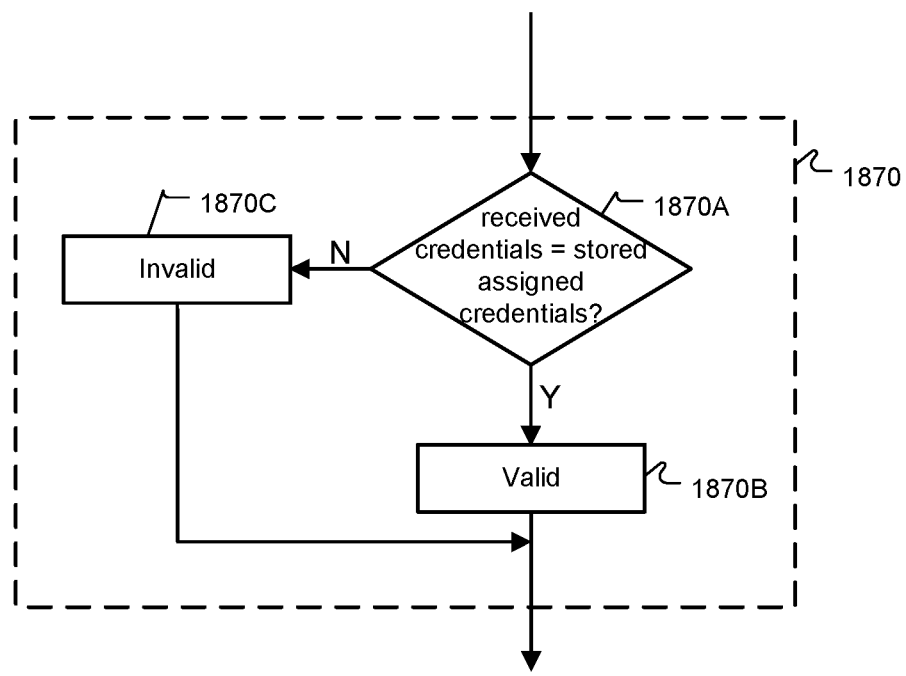
FIG. 28E is a flowchart of a process for determining whether or not assigned credentials are valid according to a first embodiment.

Turning briefly to FIG. 28E, FIG. 28E is a flowchart of a process 1870 for determining whether or not the assigned credentials are valid according to a first embodiment. In operation 1870A, the synchronization server 114 compares the received assigned credentials with previously stored assigned credentials, where the previously stored assigned credentials were generated and stored by the registration server 112 as described in, for example, operation 1846. If the received assigned credentials are identical to the previously stored assigned credentials associated with the connected client device 104, then processing continues to operation 1870B where the received credentials are determined to be valid. Otherwise, processing continues to operation 1870C, where the received credentials are determined to be invalid.

In one particular embodiment, the received assigned credentials may include an assigned identifier and an assigned secret, where the assigned identifier uniquely identifies the client device and the assigned secret is a unique string or data sequence associated with the client device that is known only to the client device and the remote server and are assigned by the remote server. On receiving the assigned credentials, the synchronization server 114 uses the assigned identifier to identify the assigned secret (stored at, e.g., the storage element 118) that corresponds to the client device. The synchronization server 114 then compares the received assigned secret with its stored assigned secret. If they match, then the assigned credentials are considered to be valid. Otherwise, they're considered to be invalid.

In some embodiments, the assigned credentials may include a scheme identifier that identifies the type of credentials being communicated from the client device. In this particular embodiment, the scheme indicates that the credentials are assigned credentials. Such a scheme may be used by the synchronization server 114 (and other elements of the remote server 102) to allow the synchronization server 114 to quickly and effectively determine whether default credentials, assigned credentials, or other type of device credentials are being communicated from the client device.

Figure 28F:
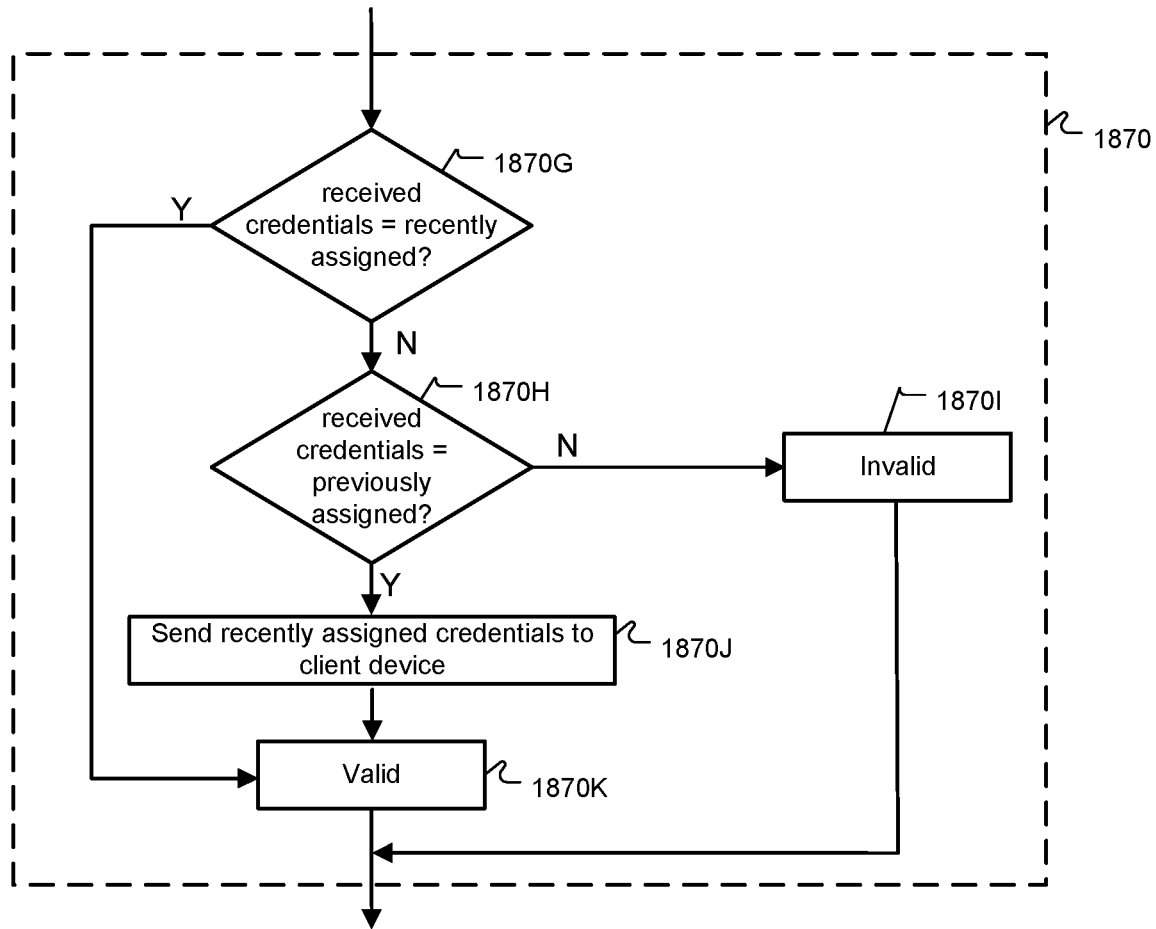
FIG. 28F is a flowchart of a process for determining whether or not assigned credentials are valid according to a second embodiment.

Turning now to FIG. 28F, FIG. 28F is a flowchart of a process 1870 for determining whether or not the assigned credentials are valid according to a second embodiment. To be sure, the embodiment described with reference to FIG. 28E may be applicable in cases where credential rotation is not used, and may be applicable in cases where credential rotation is used but the synchronization server 114 determines that new assigned credentials have not recently been generated. That is, operation 1870 is outside of the grace period described, e.g., in the section titled "Management of Assigned Credentials". In contrast, the embodiment depicted in and described with reference to FIG. 28F may be applicable in cases where credential rotation is used and a new set of assigned credentials has recently (e.g., within the last 24 hours) been generated and communicated to the client device. Accordingly, the remote server 102 may, at least temporarily, have two sets of assigned credentials which the client device 104 may use to gain access to entities of the remote server 102. These include 'previously assigned credentials' and 'recently assigned credentials', where the previously assigned credentials were generated and used to authenticate the client device prior to generation of the recently assigned credentials, both the previously assigned credentials and the recently assigned credentials may be used to authenticate the client device during the grace period, and only the recently assigned credentials may be used to authenticate the client device after the grace period expired.

In operation 1870G, upon receiving assigned credentials from the client device 104, the synchronization server 114 compares the received assigned credentials with the recently assigned credentials stored in, e.g., storage element 118. If the received credentials are the same as those recently assigned, then the client device is using the correct credentials during the grace period and thus processing may continue to operation 1870K where the synchronization server 114 determines that the received credentials are valid.

In contrast, if the received credentials are different than those recently assigned, processing may continue to operation 1870H where the received credentials are compared to the previously assigned credentials stored in, e.g., storage element 118. If the received credentials are not the same as the previously assigned credentials at this point, then the received credentials are not the same as either the recently assigned or previously assigned credentials and thus processing continues to operation 1870I where the synchronization server 114 determines that the received credentials are invalid.

If the synchronization server 114 determines that the received credentials are the same as those previously assigned, then this may indicate that although new assigned credentials were generated for the client device, the client device has not yet received or begun to use them (e.g., due to a communication failure). Processing may thus continue to operation 1870I where the synchronization server 114 (again) sends the recently assigned credentials to the client device 104, followed by operation 1870K where the synchronization server 114 determines that the received credentials are valid.

Figure 28G:
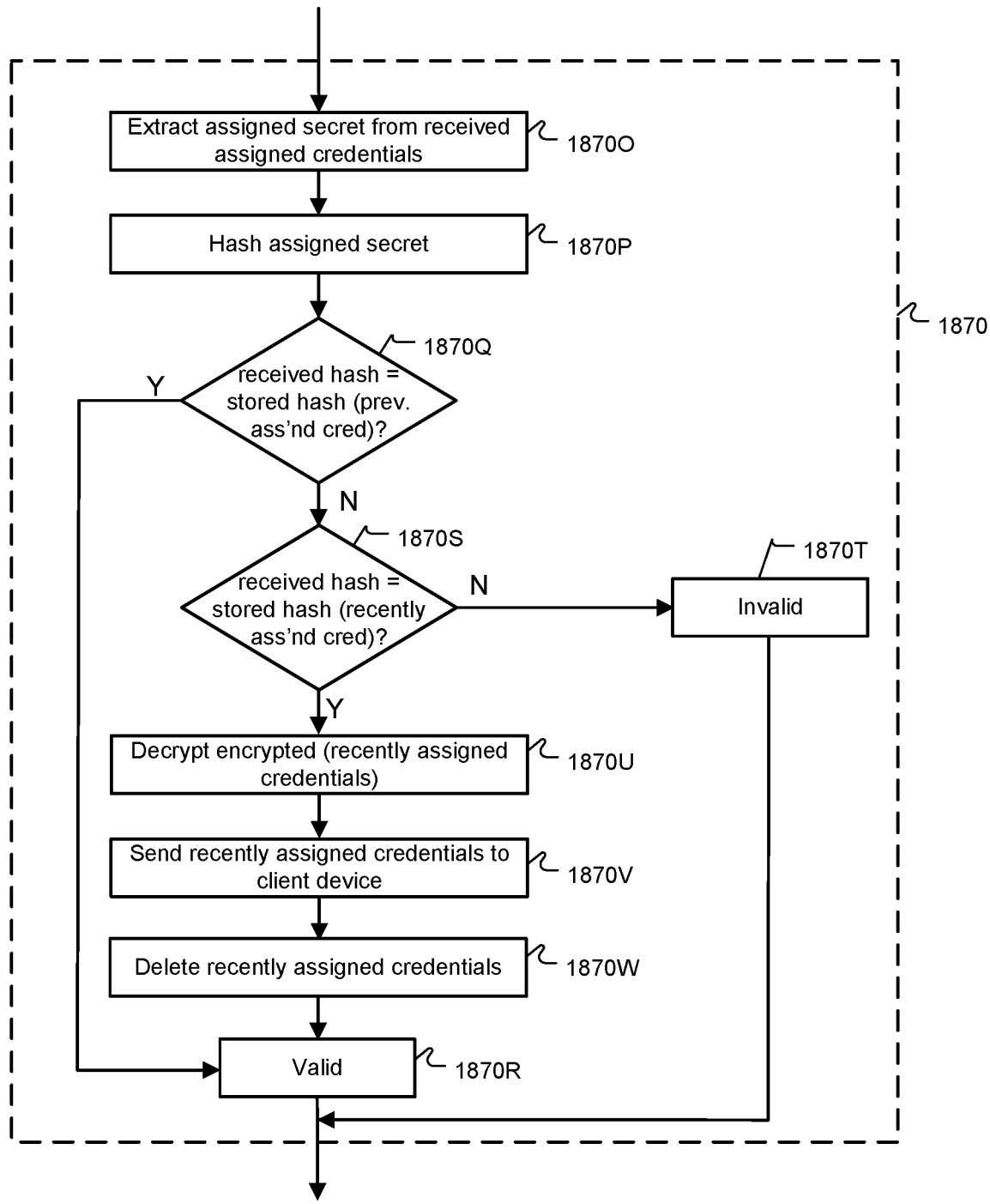
FIG. 28G is a flowchart of a process for determining whether or not assigned credentials are valid according to a third embodiment.

Turning now to FIG. 28G, FIG. 28G is a flowchart of a process 1870 for determining whether or not the assigned credentials are valid according to a third embodiment. Like the embodiment described with reference to FIG. 28F, this embodiment may be applicable in cases where credential rotation is used and a new set of assigned credentials has recently been generated and communicated to the client device. Further, this embodiment may be applicable in cases where the secret portion of the credentials is stored in a hashed form at the front end servers (e.g., at registration server 112, synchronization server 114, and/or logging server 116) and (in some cases) the non-hashed form is stored in remote storage (e.g., storage element 118). In such cases, new challenges arise in that the synchronization server 114, having only stored the hashed version of assigned secret, generally cannot re-generate the assigned credentials to send back to the client device when the client device needs them. To re-generate the assigned credentials, the synchronization server 114 may access the remotely stored non-hashed credentials (potentially increasing security risks) if they exist or, in some embodiments, perform additional processing as described herein.

In operation 1870O, the synchronization server 114 extracts the assigned secret from the received assigned credentials. In operation 1870P, the synchronization server 114 hashes the extracted assigned secret. The synchronization server 114 may apply any suitable hashing function, such as the SHA-256 one-way hash function, as long as the hashing function is the same as that previously used when the assigned credentials were generated for the client device.

Processing then continues to operation 1870Q where the synchronization server 114 compares the hash of the extracted assigned secret with the hash of the assigned secret for the previously assigned credentials (which, as mentioned, may be cached in a front-end server). If they are the same, then the client device is using the correct credentials during the grace period and thus processing may continue to operation 1870R where the synchronization server 114 determines that the received credentials are valid.

In contrast, if they are different, processing may continue to operation 1870N where the hash of the extracted assigned secret are compared to the hash of the assigned secret for the recently assigned credentials (which, as mentioned, may also be cached in a front-end server). If they are not the same at this point, then the received credentials are not the same as either the recently assigned or previously assigned credentials and thus processing continues to operation 1870T where the synchronization server 114 determines that the received credentials are invalid.

If the synchronization server 114 determines that they are the same, then this may indicate that although new assigned credentials were generated for the client device, the client device has not yet received or begun to use them (e.g., due to a communication failure). Processing may thus continue to operation 1870U where the synchronization server 114 decrypts an encrypted version of the recently assigned credentials. As later discussed with reference to FIG. 29C, when assigned credentials are newly generated (during a rotation), an encrypted version of the assigned credentials may be temporarily stored (e.g., during the grace period) in the front-end server together with the hashed version. While the assigned credentials may not be determined from the hashed version (due to, e.g., the one-way hash function), they may be determined from an encrypted version. In this fashion, the front-end server can re-generate the assigned credentials without storing (relatively insecurity) an unencrypted version of the assigned credentials and without relying on remotely stored copies (e.g., at storage element 118) of the unencrypted version.

As also discussed with reference to FIG. 29C, the recently assigned credentials that are stored at the front-end server may be encrypted using any suitable key known to both the remote server 102 and the client device 104. This may be a symmetric key, an asymmetric key, or any other suitable key. In one particular embodiment, the recently assigned credentials are encrypted using the previously assigned credentials. In this fashion, the front-end server need not permanently store the key, but rather quite conveniently receives the key from the client device as a matter of course in authenticating the device (i.e., in operation 1870O).

Once the encrypted recently assigned credentials are decrypted, processing continues to operation 1870V where the synchronization server 114 communicates the (now decrypted) recently assigned credentials to the client device 104. Processing may then continue to operation 1870W where the synchronization server 114 (or the front-end server where the encrypted credentials were stored) deletes the recently assigned credentials (i.e., the decrypted credentials). By deleting the recently assigned credentials from the front-end server this may advantageously reduce the risk of the recently assigned credentials being misappropriated. Processing then continues to operation 1870R, where the synchronization server 114 determines that the received credentials are valid.

It should be appreciated that the specific operations illustrated in FIG. 28A to FIG. 28G provide particular processes for authenticating a client device to communicate with its assigned synchronization server according to various embodiments. Other sequences of operations may also be performed according to alternative embodiments. For example, alternative embodiments of the present invention may perform the operations outlined above in a different order. Moreover, the individual operations illustrated in FIG. 28A to FIG. 28G may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 29A:
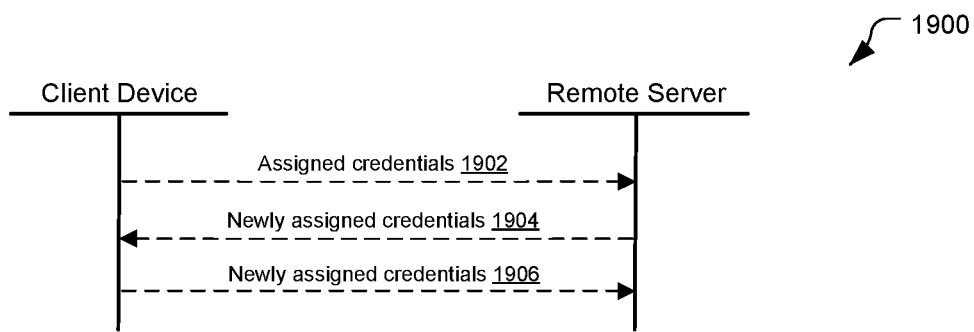
FIG. 29A illustrates a communication sequence of a process for rotating assigned credentials according to an embodiment.

FIG. 29A illustrates a communication sequence 1900 of a process for rotating assigned credentials according to an embodiment. In operation 1902, a client device 104 establishes communications with the remote server 102. The communications may be with any entity of the remote server 102, such as the registration server 112, the assigned synchronization server 114, the logging server 116, etc. In operation 1904, the remote server 102 communicates newly assigned credentials to the client device 104. In response, in operation 1906 the client device 104 begins to use the newly assigned credentials in subsequent communicates with the remote server 102.

Figure 29B:
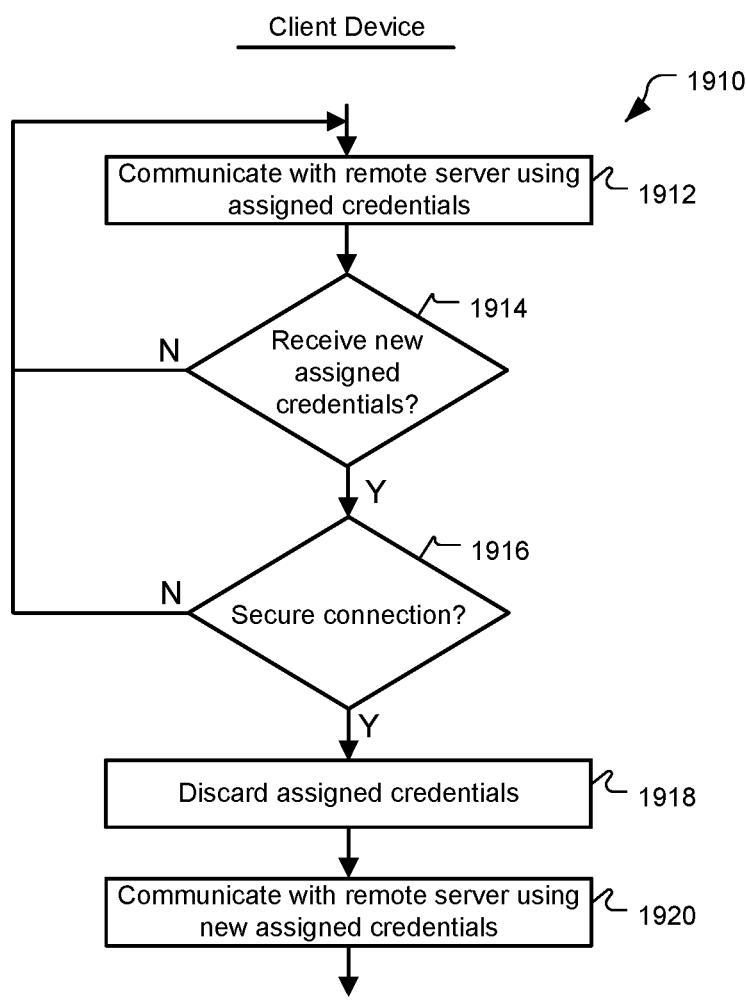
FIG. 29B is a flowchart of a process for a client device to rotate its assigned credentials according to an embodiment.

FIG. 29B is a flowchart of a process 1910 for a client device to rotate its assigned credentials according to an embodiment. In operation 1912, the client device 104 communicates with the remote server 102 using its assigned credentials. For example, the assigned credentials may have been sent to the client device 104 from the registration server 112 as part of an initialization process such as that described with reference to operation 306.

During its communications with the remote server 102, processing continues to operation 1914 where the client device 104 determines whether it has received new assigned credentials. If not, then processing returns to operation 1912 where the client device 104 continues to communicate with the remote server 102 using its assigned credentials. Otherwise, processing continues to operation 1916.

In operation 1916, the client device 104 determines whether it is communicating with the remote server 102 over a secure connection. In some embodiments, the client device accepts new assigned credentials only over a secure connection. In other embodiments, however, the client device may accept new assigned credentials over a non-secure connection. This particular embodiment describes the former, where if the client device 104 determines that it is communicating with the remote server 102 over an insecure connection, it refuses the assigned credentials. In this particular case, processing returns to operation 1912 where the client device 104 continues to communicate with the remote server 102 using its previously assigned credentials, but in other cases the client device 104 may respond differently, such as by attempting to establish a secure connection, closing its current connection, establishing a connection with the registration server 112, etc.

If, on the other hand, the client device 104 determines that it is communicating with the remote server 102 over a secure connection, then processing continues to operation 1918, where the client device 104 discards its previously assigned credentials, and continues to operation 1920, where the client device 104 then continues its communications with the remote server 102 using the newly assigned credentials received from the remote server 102.

Figure 29C:
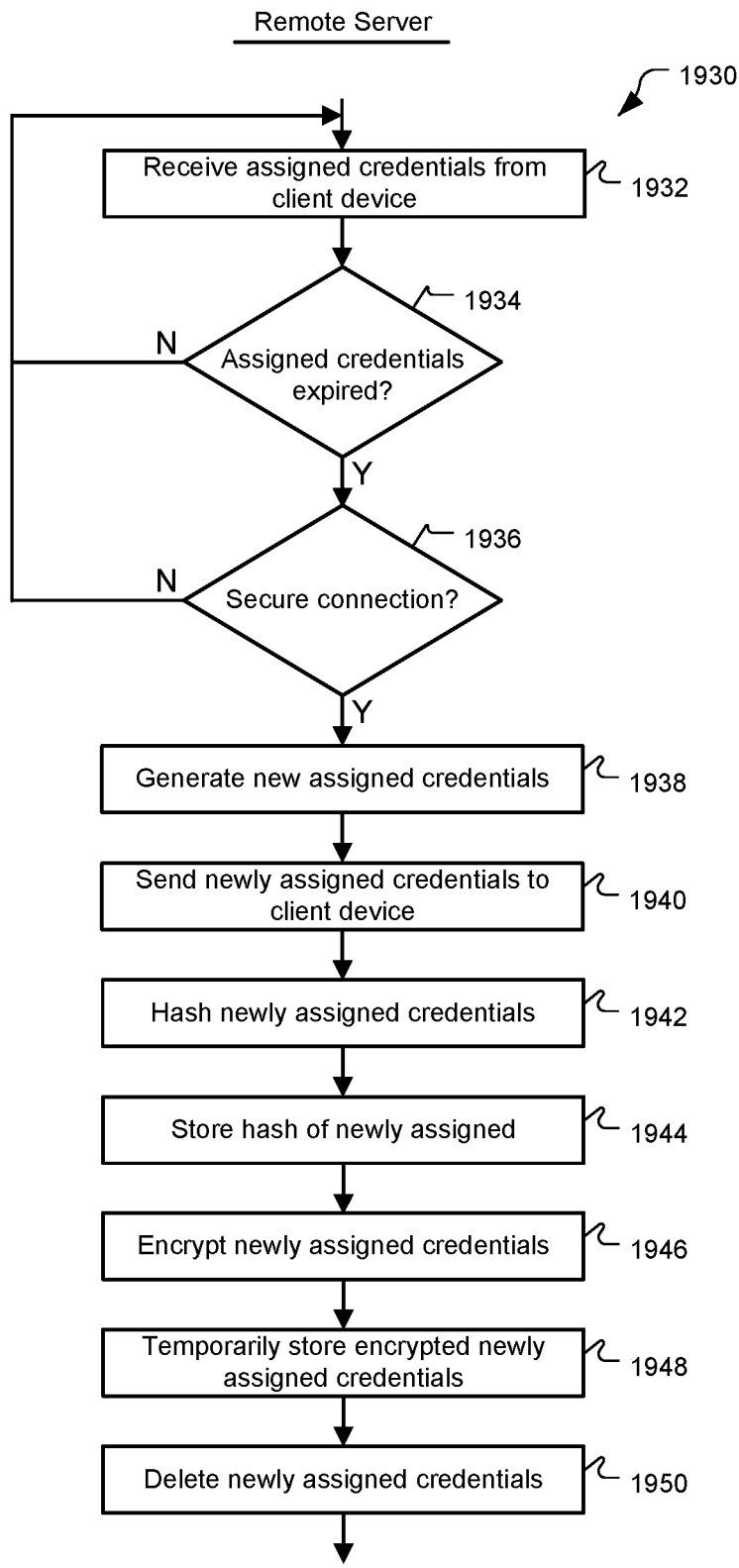
FIG. 29C is a flowchart of a process for a remote server to rotate the assigned credentials for a client device according to an embodiment.

FIG. 29C is a flowchart of a process 1930 for a remote server to rotate the assigned credentials for a client device according to an embodiment. In operation 1932, the remote server 102 receives assigned credentials from the client device 104 and uses those to authenticate the client device 104. In operation 1934, the remote server 102 determines whether the assigned credentials currently being used by the client device are expired. In some embodiments, the assigned credentials expire periodically, e.g., every week, every month, every year, after a time period in a range from a week to a year, in a time period less than a week, or in a time period greater than a year. In other embodiments, the assigned credentials expire non-periodically, for example after the client device 104 connects to the remote server 102 a certain number of times.

If the remote server 102 determines that the assigned credentials have not expired, then processing will return to operation 1932 where the remote server 102 will continue to receive and authenticate communications from the client device 104 using its currently assigned credentials. Otherwise, processing may continue to operation 1936.

In operation 1936, the remote server 102 determines whether it is communicating with the client device 104 over a secure connection. In some embodiments, the remote server generates and sends new assigned credentials only over a secure connection. In other embodiments, however, the remote server may generate and send new assigned credentials over a non-secure connection. This particular embodiment describes the former, where if the remote server 102 determines that it is communicating with the client device 104 over an insecure connection, it refuses to generate and send new assigned credentials. In this particular case, processing returns to operation 1932 where the remote server 102 continues to communicate with the client device 104 using its previously assigned credentials, but in other cases the remote server 102 may respond differently, such as by attempting to establish a secure connection, closing its current connection, causing the client device to establish a connection with the registration server 112, etc.

If, on the other hand, the remote server 102 determines that it is communicating with the client device 104 over a secure connection, then processing continues to operation 1938, where the remote server 102 generates new assigned credentials for the connected client device 104. As mentioned, the assigned credentials may include an assigned identifier and an assigned secret. The assigned identifier may include, for example, the serial number of the client device. In one particular embodiment, the serial number may be extracted from the assigned credentials presented to the remote server 102. Further, the assigned secret may include a random number which may be generated, for example, by the remote server 102. The remote sever 102 may then, in operation 1940, send the new assigned credentials to the client device and, in some cases, store the new assigned credential at the remote server 102.

In a particular embodiment, measures may be taken to reduce the risk of the newly assigned credentials being misappropriated. For example, the newly assigned credentials may be stored in remote storage, such as storage element 118, whereas encrypted and hashed versions of the newly assigned credentials may be stored at a front-end server (e.g., the assigned synchronization sever 114).

Accordingly, in operation 1942, the remote server 102 may hash the newly assigned credentials. In particular, the remote server 102 may hash an assigned secret included in the credentials, using any of the previously discussed hashing algorithms. In operation 1944, the remote server 102 stores the hash of the newly assigned credentials in a front-end server, such as in the storage element 178 of the synchronization server 114. In this fashion, the hash can be quickly accessed and compared to hashes of received credentials as discussed with reference to FIG. 28F.

In operation 1946, the remote server 102 encrypts the newly assigned credentials. As also discussed with reference to FIG. 28F, the newly assigned credentials may be encrypted using any suitable encryption algorithm where the key(s) are commonly known to both the remote server 102 and the client device 104. In operation 1948, the encrypted version of the newly assigned credentials is also stored at the front-end server, in some embodiments together with the hash of the assigned credentials. The encrypted version, however, may be temporarily stored, where they are stored only for the duration of the grace period. In this fashion, during the grace period where the client device 104 can be authenticated using either previously generated credentials or newly generated credentials, the remote server 102 may use the encrypted version of the newly assigned credentials to generate the newly assigned credentials. The newly assigned credentials (unencrypted) can then be sent to the client device 104 in the event the client device 104 authenticates itself during the grace period using its previously assigned credentials.

Once the encrypted newly assigned credentials are stored, in operation 1950 the remote server 102 may delete the newly assigned credentials. In some embodiments, although the remote server deletes the newly assigned credentials from its front end-servers, it may maintain (for backup purposes) a copy of the (unencrypted, unhashed) newly assigned credentials in a remote storage.

It should be appreciated that the specific operations illustrated in FIG. 29A to FIG. 29C provide particular processes for rotating assigned credentials according to various embodiments. Other sequences of operations may also be performed according to alternative embodiments. For example, alternative embodiments of the present invention may perform the operations outlined above in a different order. Moreover, the individual operations illustrated in FIG. 29A to FIG. 29C may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 30A:
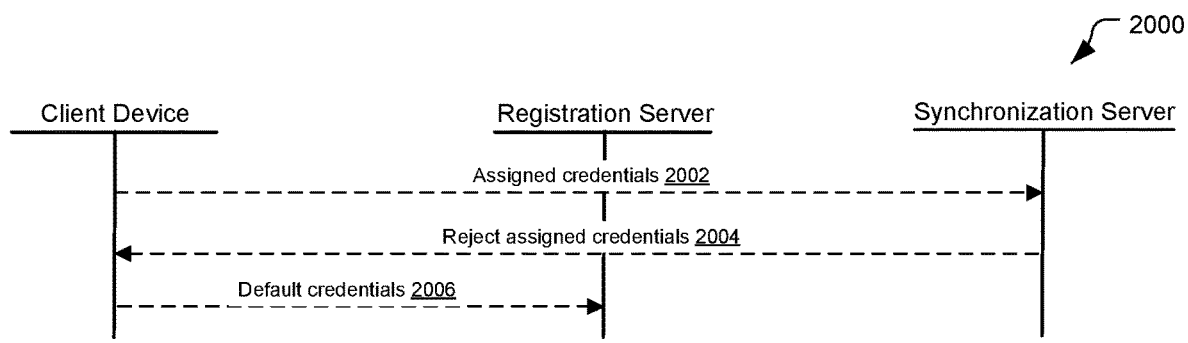
FIG. 30A illustrates a communication sequence of a process for dealing with rejected assigned credentials according to an embodiment.

FIG. 30A illustrates a communication sequence 2000 of a process for dealing with rejected assigned credentials according to an embodiment. In operation 2002, a client device 104 attempts to establish communications with the synchronization server 114 (or other entities of the remote server 102) by sending the synchronization server 114 its assigned credentials. In operation 2004, those assigned credentials are rejected, and thus the synchronization server 114 communicates a rejection of the assigned credentials to the client device 104. In response to receiving that rejection, the client device 104 returns to the registration server in an attempt to re-acquire assigned credentials, and does this by communicating its default credentials in operation 2006 to the registration server 112.

Figure 30B:
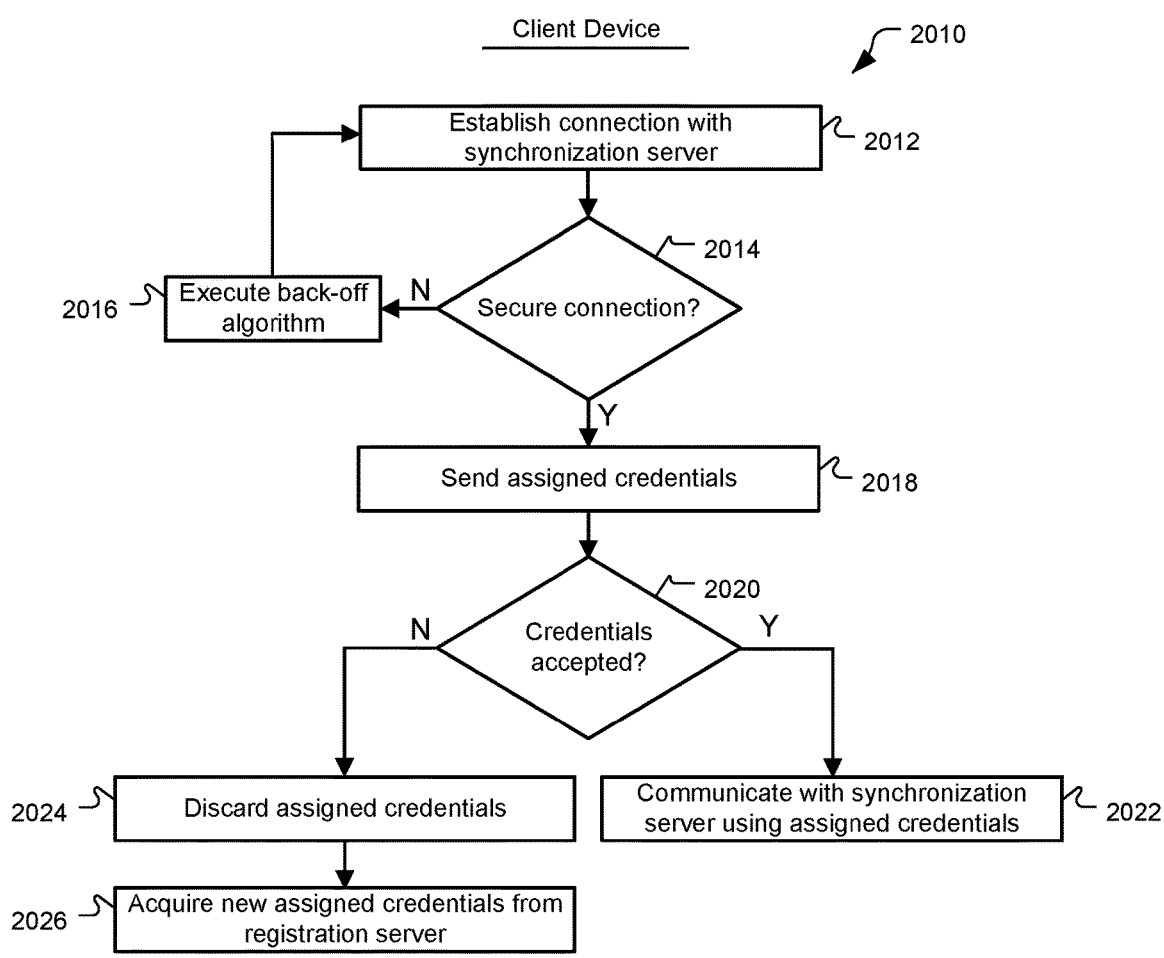
FIG. 30B is a flowchart of a process for a client device to deal with rejected assigned credentials according to an embodiment.

FIG. 30B is a flowchart of a process 2010 for a client device to deal with rejected assigned credentials according to an embodiment. In operation 2012, the client device 104 establishes a connection with the synchronization server 114 (or other entity of the remote server 102). The client device 104 may establish its connection using, e.g., the synchronization server identifier received in, e.g., operation 312. Once connected and prior to sending its assigned credentials, in operation 214 the client device 104 may determine whether the connection it has established with the synchronization server 114 is a secure (e.g., SSL, TSL, etc.) connection. If the connection is not secure, processing may continue to operation 2016 where the client device 104 executes a back-off algorithm. In performing the back-off algorithm the client device 104 may wait for progressively longer periods before attempting to establish a secure connection with the synchronization server 114. In some embodiments, however, the client device 104 may not implement a back-off algorithm, but rather may continuously attempt to re-establish a secure connection with the synchronization server 114 at, e.g., periodic intervals.

If the connection however, is determined to be secure, processing may continue to operation 2018. In operation 2018 the client device 104 communicates its assigned credentials (e.g., assigned credentials 128F) to the synchronization server 114. The assigned credentials typically include a device identifier and a device secret.

Processing may then continue to operation 2020, where the client device determines whether the assigned credentials it communicated to the synchronization server 114 were successfully accepted (i.e., determined to be valid) by the synchronization server 114. For example, if the client device receives a rejection from the synchronization server 114, it may determine that the credentials were not accepted. Otherwise, it may determine that the credentials were accepted.

If the assigned credentials were accepted, processing may continue to operation 2022, where the client device communicates with the synchronization server using its assigned credentials. Otherwise, processing may continue to operation 2024, where the client device 104 discards its assigned credentials. In this case, the client device 104 expects that its assigned credentials are invalid and that it needs to acquire new assigned credentials. Accordingly, the client device disconnects from the synchronization server 114 and, in operation 2026, acquires new assigned credentials from the registration server. To acquire new assigned credentials, the client device may perform processing, e.g., such as that described with reference to FIG. 28B.

It should be recognized that in some embodiments the client device 104 may attempt to use its assigned credentials with the synchronization server more than once prior to discarding its assigned credentials and acquiring new credentials. Further, processing of the registration server and the synchronization server is not further described for this particular embodiment as the processing may be similar to that described in FIG. 28C and FIG. 28D, respectively.

It should be appreciated that the specific operations illustrated in FIG. 30A to FIG. 30B provide particular processes for dealing with rejected assigned credentials. Other sequences of operations may also be performed according to alternative embodiments. For example, alternative embodiments of the present invention may perform the operations outlined above in a different order. Moreover, the individual operations illustrated in FIG. 30A to FIG. 30B may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 31A:
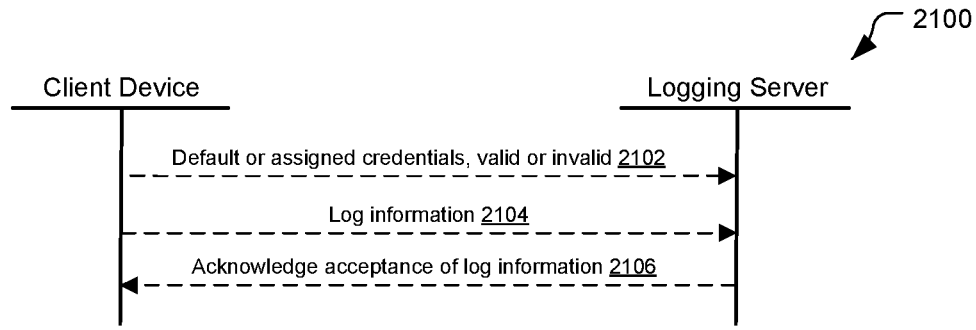
FIG. 31A illustrates a communication sequence of a process for communicating information to a logging server according to an embodiment.

FIG. 31A illustrates a communication sequence 2100 of a process for communicating information to a logging server according to an embodiment. In operation 2102, a client device 102 establishes communications with the logging server 116 by sending default or assigned credentials, where those credentials may be valid or invalid. After providing such credentials, in operation 2104 the client device 104 communicates log information to the logging server 116. In response, in operation 2106, the logging server 116 sends an acknowledgment that the log information has been accepted.

Figure 31B:
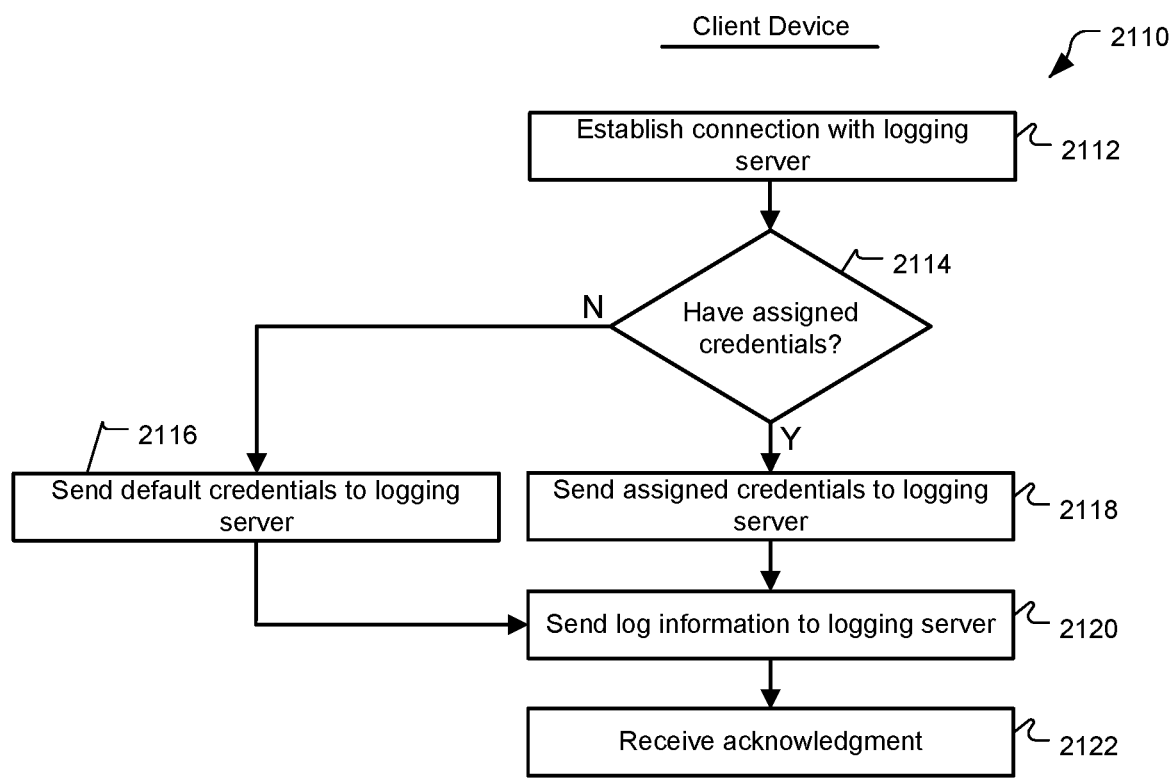
FIG. 31B is a flowchart of a process for a client device to communicate log information to a logging server according to an embodiment.

FIG. 31B is a flowchart of a process 2110 for a client device to communicate log information to a logging server according to an embodiment. In operation 2112, the client device 104 establishes a connection with the logging server 116. In establishing a connection, the client device may establish a secure connection (e.g., an SSL, TSL, or other secure connection), or an insecure connection.

Once the client device 104 has connected to the logging server 116 (or, in some cases before), the client device 104 determines whether or not it has assigned credentials (e.g., assigned credentials 128F). If it does not, then processing may continue to operation 2116, where the client device 104 communicates its default credentials (e.g., default credentials 128E) to the logging server 116. If it does, then processing may continue to operation 2118, where the client device 104 communicates its assigned credentials (e.g., assigned credentials 128F) to the logging server 116. In either case, processing then continues to operation 2120, where the client device sends its log information to the logging server 116, and in some cases operation 2122, where the client device receives an acknowledgment that the log information was successfully communicated.

It should be recognized that while the embodiments described with reference to FIG. 31A and FIG. 31B are in the context of a client device communicates log information to a logging server, similar operations may be performed when the client device communicates any information to any of the entities of the remote server 102. For example, when the client device 104 desires to send buckets of information to its assigned synchronization server 114, the client device 104 may first attempt to send assigned credentials and, if it has none, send default credentials.

Figure 31C:
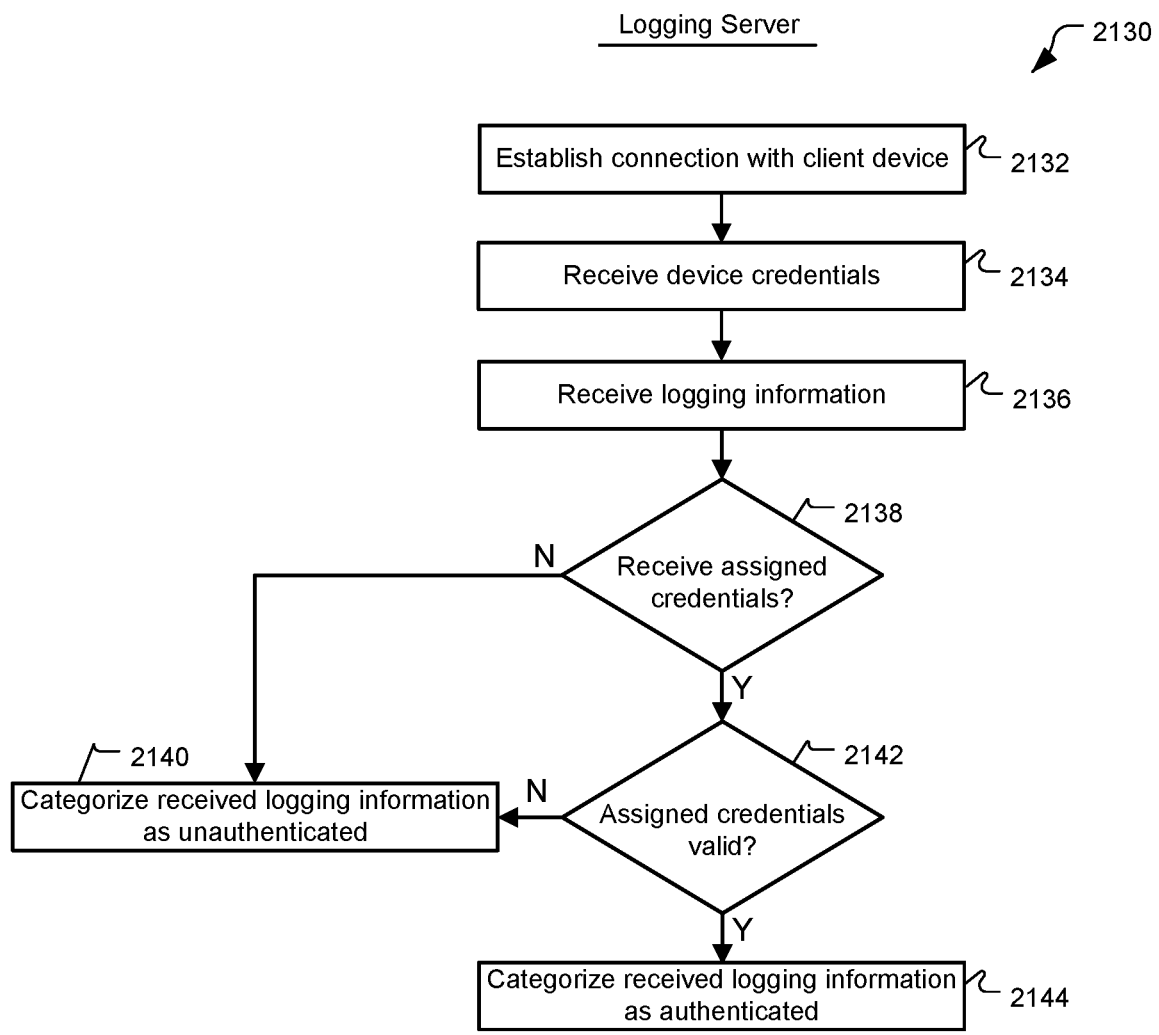
FIG. 31C is a flowchart of a process for a logging server to receive and categorize information communicated from a client device according to an embodiment.

Turning to FIG. 31C, FIG. 31C is a flowchart of a process 2130 for a logging server to receive and categorize information communicated from a client device according to an embodiment. The logging server, in this embodiment, categorizes information based on the client device's level of authentication. In operation 2132, the logging server 116 establishes a connection with the client device 104. In some embodiments, the connection is secure, while in other embodiments, the connection may be insecure.

In operation 2134, the logging server 116 receives device credentials from the client device 104. The device credentials may be default credentials, assigned credentials, or some other type of credentials. In operation 2136, the logging server receives logging information from the client device 104.

Once the logging server 116 has received device credentials and logging information, the logging server 116 determines, in operation 2138, whether the received device credentials are assigned credentials. If they are not, then processing continues to operation 2140 where the logging server categorizes the received logging information as coming from an 'unauthenticated' device. Otherwise, processing continues to operation 2142, where the logging server 116 determines whether the assigned credentials received from the client device 104 are valid. Various techniques for making such a determination have been described herein, and any of such techniques may be applied here. If the logging server 116 determines that the assigned credentials are not valid, processing continues to operation 2140 where it categorizes received logging information as coming from an 'unauthenticated' device. Otherwise, processing continues to operation 2144 where it categorizes received logging information as coming from an 'authenticated' device.

It should be recognized that in some embodiments there may be additional types of characterization other than 'unauthenticated' and 'authenticated'. For example, there may be three layers of characterization, where valid assigned credentials are associated with the highest level of authentication, valid default credentials are associated with a middle level of authentication, and any invalid credentials are associated with a lowest level of authentication. For another example, the logging information may be characterized (additionally or alternatively) based on whether the logging information was communicated over a secure or insecure connection, where a secure connection is indicative of a higher level of authentication than an insecure connection.

It should be appreciated that the specific operations illustrated in FIG. 31A to FIG. 31C provide particular processes for communicating and categorizing logging information. Other sequences of operations may also be performed according to alternative embodiments. For example, alternative embodiments of the present invention may perform the operations outlined above in a different order. Moreover, the individual operations illustrated in FIG. 31A to FIG. 31C may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

FIG. 32A illustrates a communication sequence 2200 of a process for a client device to access different types of information according to an embodiment. When a client device has been paired with a particular user account, the client device may obtain access to information associated with that account. Otherwise, the client device may be denied access to such information. In operation 2202, the client device 104 establishes communications with the synchronization server 114 using its assigned credentials. In response and in operation 2204, the synchronization server 114 provides the client device 104 with access to either a user account paired with the client device 104 or an arbitrary account.

FIG. 32B is a flowchart of a process 2210 for a client device to access different types of information according to an embodiment. In operation 2212, the client device 104 sends it assigned credentials to the synchronization server. In operation 2214, the client device 104 determines whether it has obtained access to a user account associated with the client device 104. If not, then the client device 104 may access an arbitrary account in operation 2216. In some embodiments, instead of accessing an arbitrary account, the client device 104 may otherwise be limited in the type of information it may communicate and/or receive from the synchronization server 114. If in operation 2214 the client device 104 determines that it has obtained access to a user account, then processing continues to operation 2218 where the client device obtains access to the user account.

FIG. 32C is a flowchart of a process 2220 for a synchronization server to provide a client device with access to different types of information according to an embodiment. In operation 2222, the synchronization server 114 receives valid assigned credentials from the client device 104. In some embodiments, the valid assigned credentials must be received over a secure connection. In operation 2224, the synchronization server 114 determines whether the client device is paired with a user account. For example, the synchronization server 114 may compare a received device identifier (e.g., a device identifier included in the assigned credentials) with the device identifier/user account map 178D to determine whether a user account is associated with the device identifier. If not, then processing may continue to operation 2226 where the synchronization server 114 provides the client device with access to an arbitrary account that, in most embodiments, does not include any sensitive information. In contrast, if there is a user account associated with the device identifier, then in operation 2228 the synchronization server 114 provides the client device 104 with access to that user account.

It should be appreciated that the specific operations illustrated in FIG. 32A to FIG. 32C provide particular processes for a client device to access different types of information. Other sequences of operations may also be performed according to alternative embodiments. For example, alternative embodiments of the present invention may perform the operations outlined above in a different order. Moreover, the individual operations illustrated in FIG. 32A to FIG. 32C may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Exemplary Devices, Servers, and Systems

Figure 33:
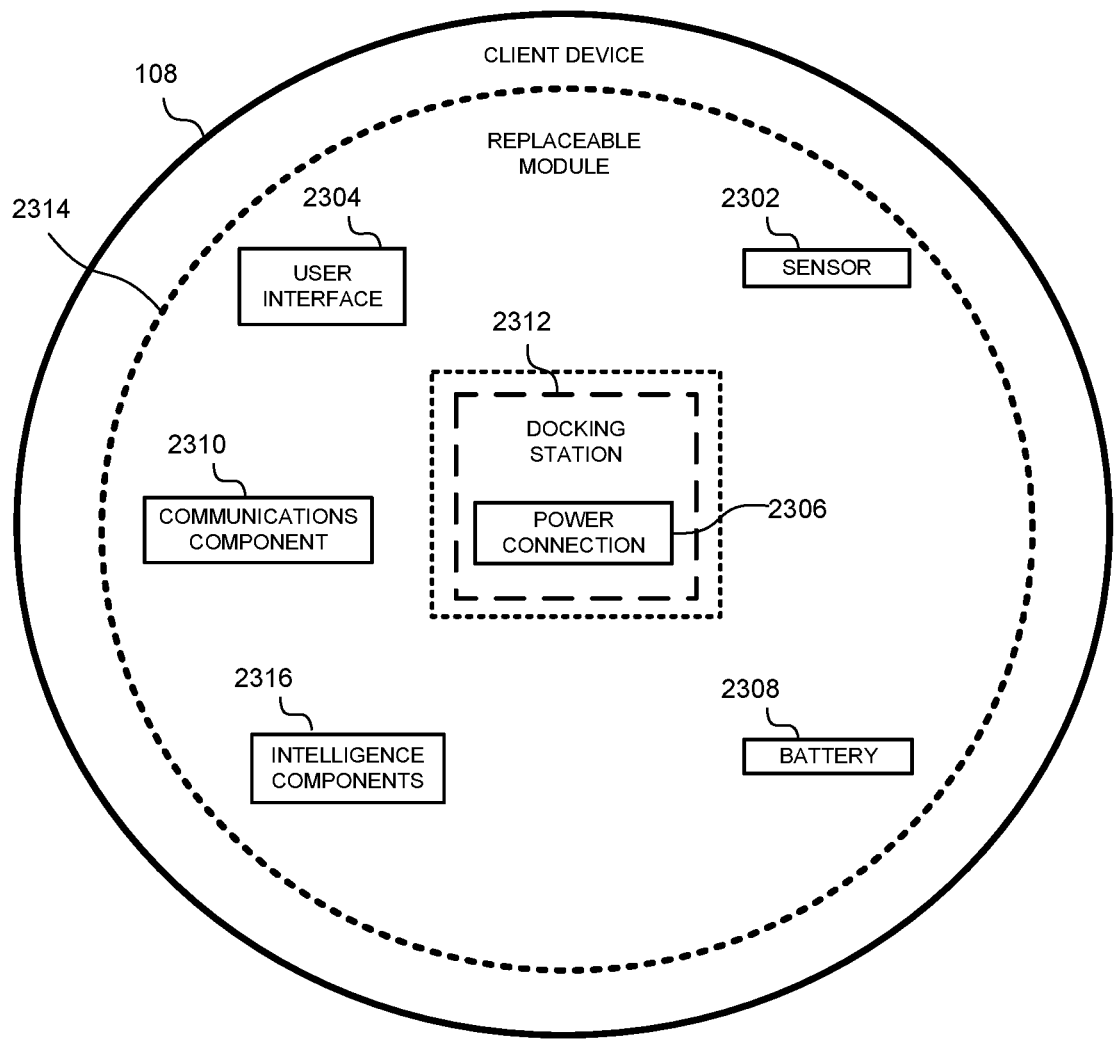
FIG. 33 illustrates components of a monitoring device according to an exemplary embodiment.

FIG. 33 illustrates components of a monitoring device 108 according to an exemplary embodiment. It should be recognized that the components described with reference to FIG. 33 may be in addition or alternative to those components described for the client device 104 with reference to FIG. 4. In this particular example, the monitoring device 108 is an intelligent, multi-sensing, network-connected device. The monitoring device 108 can include one or more sensors 2302, a user-interface component 2304, a power supply (e.g., including a power connection 2306 and/or battery 2308), a communications component 2310, a modularity unit (e.g., including a docking station 2312 and replaceable module 2314) and intelligence components 2316. Particular sensors 2302, user-interface components 2304, power-supply configurations, communications components 2310, modularity units and/or intelligence components 2316 can be the same or similar across devices 108 or can vary depending on device type or model.

By way of example and not by way of limitation, one or more sensors 2302 in a device 108 may be able to, e.g., detect acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF) or other electromagnetic signals or fields. Thus, for example, sensor 2302 can include temperature sensor(s), humidity sensor(s), hazard-related sensor(s) or other environmental sensor(s), accelerometer(s), microphone(s), optical sensor(s) up to and including camera(s) (e.g., charge-coupled-devices or video cameras), active or passive radiation sensor(s), GPS receiver(s) or radio-frequency identification detector(s). While FIG. 33 illustrates an embodiment with a single sensor, many embodiments will include multiple sensors. In some instances, device 108 includes one or more primary sensors and one or more secondary sensors. The primary sensor(s) can sense data central to the core operation of the device (e.g., sensing a temperature in a thermostat or sensing smoke in a smoke detector). The secondary sensor(s) can sense other types of data (e.g., motion, light or sound), which can be used for energy-efficiency objectives or smart-operation objectives. In some instances, an average user may even be unaware of an existence of a secondary sensor.

One or more user-interface components 2304 in device 108 may be configured to present information to a user via a visual display (e.g., a thin-film-transistor display or organic light-emitting-diode display) and/or an audio speaker. User-interface component 2304 can also include one or more user-input components to receive information from a user, such as a touchscreen, buttons, scroll component (e.g., a movable or virtual ring component), microphone or camera (e.g., to detect gestures). In one embodiment, user-input component 2304 includes a click-and-rotate annular ring component, wherein a user can interact with the component by rotating the ring (e.g., to adjust a setting) and/or by clicking the ring inwards (e.g., to select an adjusted setting or to select an option). In another embodiment, user-input component 2304 includes a camera, such that gestures can be detected (e.g., to indicate that a power or alarm state of a device is to be changed).

A power-supply component in device 108 may include a power connection 2306 and/or local battery 2308. For example, power connection 2306 can connect device 108 to a power source such as a line voltage source. In some instances, connection 2306 to an AC power source can be used to repeatedly charge a (e.g., rechargeable) local battery 2308, such that battery 2308 can later be used to supply excess DC power if needed in the event of an AC power disconnection or other power deficiency scenario.

A communications component 2310 in device 108 can include a component that enables device 108 to communicate with a central server or a remote device, such as another device described herein or a portable user device. Communications component 2310 can allow device 108 to communicate via, e.g., Wi-Fi, ZigBee, 3G/4G wireless, CAT6 wired Ethernet, HomePlug or other powerline communications method, telephone, or optical fiber, by way of non-limiting examples. Communications component 2310 can include a wireless card, an Ethernet plug, or other transceiver connection.

A modularity unit in device 108 can include a static physical connection, and a replaceable module 2314. Thus, the modularity unit can provide the capability to upgrade replaceable module 2314 without completely reinstalling device 108 (e.g., to preserve wiring). The static physical connection can include a docking station 2312 (which may also be termed an interface box) that can attach to a building structure. For example, docking station 2312 could be mounted to a wall via screws or stuck onto a ceiling via adhesive. Docking station 2312 can, in some instances, extend through part of the building structure. For example, docking station 2312 can connect to wiring (e.g., to 120V line voltage wires) behind the wall via a hole made through a wall's sheetrock. Docking station 2312 can include circuitry such as power-connection circuitry 2306 and/or AC-to-DC powering circuitry and can prevent the user from being exposed to high-voltage wires. In some instances, docking stations 2312 are specific to a type or model of device, such that, e.g., a thermostat device includes a different docking station than a smoke detector device. In some instances, docking stations 2312 can be shared across multiple types and/or models of devices 108.

Replaceable module 2314 of the modularity unit can include some or all sensors 2302, processors, user-interface components 2304, batteries 2308, communications components 2310, intelligence components 2316 and so forth of the device. Replaceable module 2314 can be configured to attach to (e.g., plug into or connect to) docking station 2312. In some instances, a set of replaceable modules 2314 are produced, with the capabilities, hardware and/or software varying across the replaceable modules 2314. Users can therefore easily upgrade or replace their replaceable module 2314 without having to replace all device components or to completely reinstall device 108. For example, a user can begin with an inexpensive device including a first replaceable module with limited intelligence and software capabilities. The user can then easily upgrade the device to include a more capable replaceable module. As another example, if a user has a Model #1 device in their basement, a Model #2 device in their living room, and upgrades their living-room device to include a Model #3 replaceable module, the user can move the Model #2 replaceable module into the basement to connect to the existing docking station. The Model #2 replaceable module may then, e.g., begin an initiation process in order to identify its new location (e.g., by requesting information from a user via a user interface).

Intelligence components 2316 of the device can support one or more of a variety of different device functionalities. Intelligence components 2316 generally include one or more processors configured and programmed to carry out and/or cause to be carried out one or more of the advantageous functionalities described herein. The intelligence components 2316 can be implemented in the form of general-purpose processors carrying out computer code stored in local memory (e.g., flash memory, hard drive, random access memory), special-purpose processors or application-specific integrated circuits, combinations thereof, and/or using other types of hardware/firmware/software processing platforms. The intelligence components 2316 can furthermore be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, intelligence components 2316 can be intelligence components 2316 configured to detect when a location (e.g., a house or room) is occupied, up to and including whether it is occupied by a specific person or is occupied by a specific number of people (e.g., relative to one or more thresholds). Such detection can occur, e.g., by analyzing microphone signals, detecting user movements (e.g., in front of a device), detecting openings and closings of doors or garage doors, detecting wireless signals, detecting an IP address of a received signal, or detecting operation of one or more devices within a time window. Intelligence components 2316 may include image-recognition technology to identify particular occupants or objects.

In some instances, intelligence components 2316 can be configured to predict desirable settings and/or to implement those settings. For example, based on the presence detection, intelligence components 2316 can adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), intelligence components 2316 can initiate an audio or visual indicator of where the person, animal or object is or can initiate an alarm or security feature if an unrecognized person is detected under certain conditions (e.g., at night or when lights are out). As yet another example, intelligence components 2316 can detect hourly, weekly or even seasonal trends in user settings and adjust settings accordingly. For example, intelligence components 2316 can detect that a particular device is turned on every week day at 6:30 am, or that a device setting is gradually adjusted from a high setting to lower settings over the last three hours. Intelligence components 2316 can then predict that the device is to be turned on every week day at 6:30 am or that the setting should continue to gradually lower its setting over a longer time period.

In some instances, devices can interact with each other such that events detected by a first device influences actions of a second device. For example, a first device can detect that a user has pulled into a garage (e.g., by detecting motion in the garage, detecting a change in light in the garage or detecting opening of the garage door). The first device can transmit this information to a second device, such that the second device can, e.g., adjust a home temperature setting, a light setting, a music setting, and/or a security-alarm setting. As another example, a first device can detect a user approaching a front door (e.g., by detecting motion or sudden light-pattern changes). The first device can, e.g., cause a general audio or visual signal to be presented (e.g., such as sounding of a doorbell) or cause a location-specific audio or visual signal to be presented (e.g., to announce the visitor's presence within a room that a user is occupying).

Monitoring device 108 in certain embodiments is an intelligent, multi-sensing, network-connected device including the components described with reference to FIG. 33 (and or the components described with reference to FIG. 4). However, it will be appreciated by those skilled in the art that such a device could operate equally well having fewer or a greater number of components than are illustrated in FIG. 33. Thus, the depiction of device 108 in FIG. 33 should be taken as being illustrative in nature, and not limiting to the scope of the present teachings.

Figure 34:
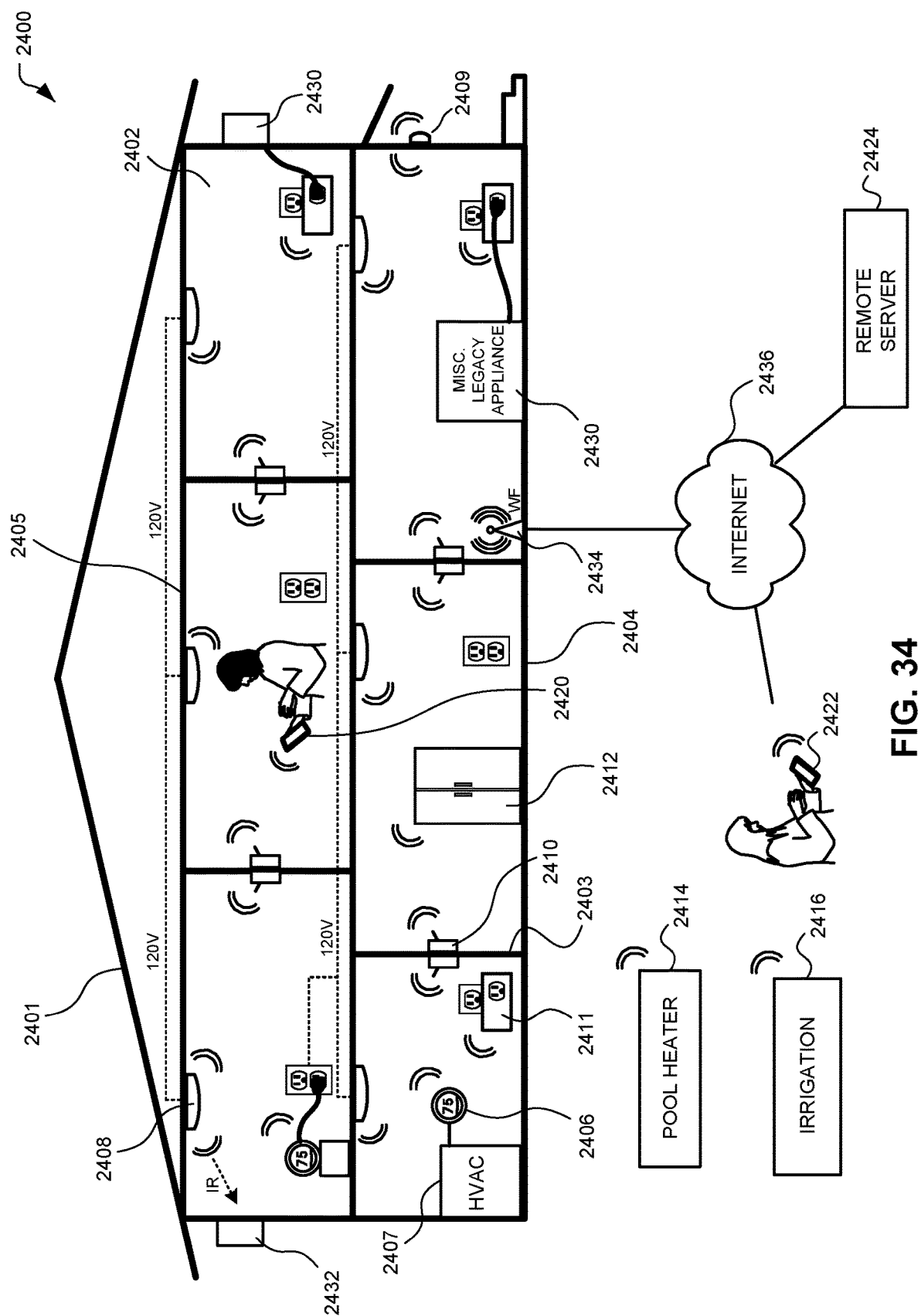
FIG. 34 illustrates an example of a smart home environment within which one or more of the devices, methods, systems, services, and/or computer program products described herein can be applicable.

FIG. 34 illustrates an example of a smart home environment 2400 within which one or more of the devices, methods, systems, services, and/or computer program products described further herein can be applicable. The depicted smart home environment includes a structure 2401, which can include, e.g., a house, office building, garage, or mobile home. It will be appreciated that devices can also be integrated into a smart home environment that does not include an entire structure 2401, such as an apartment, condominium, or office space. Further, the smart home environment can control and/or be coupled to devices outside of the actual structure 2401. Indeed, several devices in the smart home environment need not physically be within the structure 2401 at all. For example, a device controlling a pool heater or irrigation system can be located outside of the structure 2401.

The depicted structure 2401 includes a plurality of rooms 2402, separated at least partly from each other via walls 2403. The walls 2403 can include interior walls or exterior walls. Each room can further include a floor 2404 and a ceiling 2405. Devices can be mounted on, integrated with and/or supported by a wall 2403, floor or ceiling.

The smart home depicted in FIG. 34 includes a plurality of client devices, including intelligent, multi-sensing, network-connected devices that can integrate seamlessly with each other and/or with remote server systems to provide any of a variety of useful smart home objectives. One, more or each of the devices illustrated in the smart home environment and/or in FIG. 34 can include one or more sensors, a user interface, a power supply, a communications component, a modularity unit and intelligence components as described with respect to FIG. 33. Further, one, more or each of the devices illustrated in FIG. 34 can synchronize with one another and/or with a remote server using any of the techniques disclosed herein, and may be operable to authenticate its identity to the remote server using any of the techniques disclosed herein.

An intelligent, multi-sensing, network-connected thermostat 2406 can detect ambient climate characteristics (e.g., temperature and/or humidity) and control a heating, ventilation and air-conditioning (HVAC) system 2407. One or more intelligent, network-connected, multi-sensing hazard detection units 2408 can detect the presence of a hazardous substance and/or a hazardous condition in the home environment (e.g., smoke, fire, or carbon monoxide). One or more intelligent, multi-sensing, network-connected entryway interface devices 2409, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 2410 can detect ambient lighting conditions, detect room-occupancy states and control a power and/or dim state of one or more lights. In some instances, light switches 2410 can further or alternatively control a power state or speed of a fan, such as a ceiling fan. Each of a plurality of intelligent, multi-sensing, network-connected wall plug interfaces 2411 can detect occupancy of a room or enclosure and control supply of power to one or more wall plugs (e.g., such that power is not supplied to the plug if nobody is at home). The smart home may further include a plurality of intelligent, multi-sensing, network-connected appliances 2412, such as refrigerators, stoves and/or ovens, televisions, washers, dryers, lights (inside and/or outside of the structure 2401), stereos, intercom systems, garage-door openers, floor fans, ceiling fans, whole-house fans, wall air conditioners, pool heaters 2414, irrigation systems 2416, security systems, and so forth.

One or more access devices may be operable to communicate with the client devices either through LANs, WANs, or other wireless or wired communication networks. For example, access device 2420 may communicate with one or more client devices within the smart home environment 2400, while access device 2422 may communicate with one or more of the client devices within the smart home environment via the Internet 2400. All client devices and access devices may also communicate with a remote server 2424 which may, as described herein, facilitate the synchronization of states across all devices and/or the authentication of devices. While descriptions of FIG. 34 can identify specific sensors and functionalities associated with specific devices, it will be appreciated that any of a variety of sensors and functionalities (such as those described throughout the specification) can be integrated into the device.

In addition to containing processing and sensing capabilities, each of the devices within the smart home environment 2400 can, as mentioned, be capable of data communications and information sharing with any other devices within the smart home environment 2400, as well as to devices outside of the smart home environment 2400 such as the access device 2422 and/or the remote serer 2424. The devices can send and receive communications via any of a variety of custom or standard wireless protocols (Wi-Fi, ZigBee, 6LoWPAN, etc.) and/or any of a variety of custom or standard wired protocols (CAT6 Ethernet, HomePlug, etc.). The wall plug interfaces 2411 can serve as wireless or wired repeaters, and/or can function as bridges between (i) devices plugged into AC outlets and communicating using Homeplug or other power line protocol, and (ii) devices that not plugged into AC outlets.

For example, a first device can communicate with a second device via a wireless router 2434. A device can further communicate with remote devices via a connection to a network, such as the Internet 2436. Through the Internet 2436, the device can communicate with a central (i.e., remote) server or a cloud-computing system 2424. The remote server or cloud-computing system 2424 can be associated with a manufacturer, support entity or service provider associated with the device. In one embodiment, a user may be able to contact customer support using a device itself rather than needing to use other communication means such as a telephone or Internet-connected computer. Further, software updates can be automatically sent from the remote server or cloud-computing system 2424 to devices (e.g., when available, when purchased, or at routine intervals).

Devices' network connections can further allow a user to interact with the device even if the user is not proximate to the device. For example, a user can communicate with a device (e.g., thermostat 2406) using a computer (e.g., a desktop computer, laptop computer, or tablet) or other portable electronic device (e.g., a smartphone)(e.g., access device 2422). A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home environment 2400 may also include a variety of non-communicating legacy appliances 2430, such as old conventional washer/dryers, refrigerators, and the like which can be controlled, albeit coarsely (ON/OFF), by virtue of the wall plug interfaces 2411. The smart home can further include a variety of partially communicating legacy appliances 2432, such as IR-controlled wall air conditioners or other IR-controlled devices, which can be controlled by IR signals provided by the hazard detection units 2408 or the light switches 2410.

Smart home 2400 in certain embodiments is an environment including a number of client devices and access devices all operable to communicate with one another and perform synchronization via a remote server. However, it will be appreciated by those skilled in the art that such an environment could operate equally well having fewer or a greater number of components than are illustrated in FIG. 34. Thus, the depiction of the smart home environment 2400 in FIG. 34 should be taken as being illustrative in nature, and not limiting to the scope of the present teachings.

Figure 35:
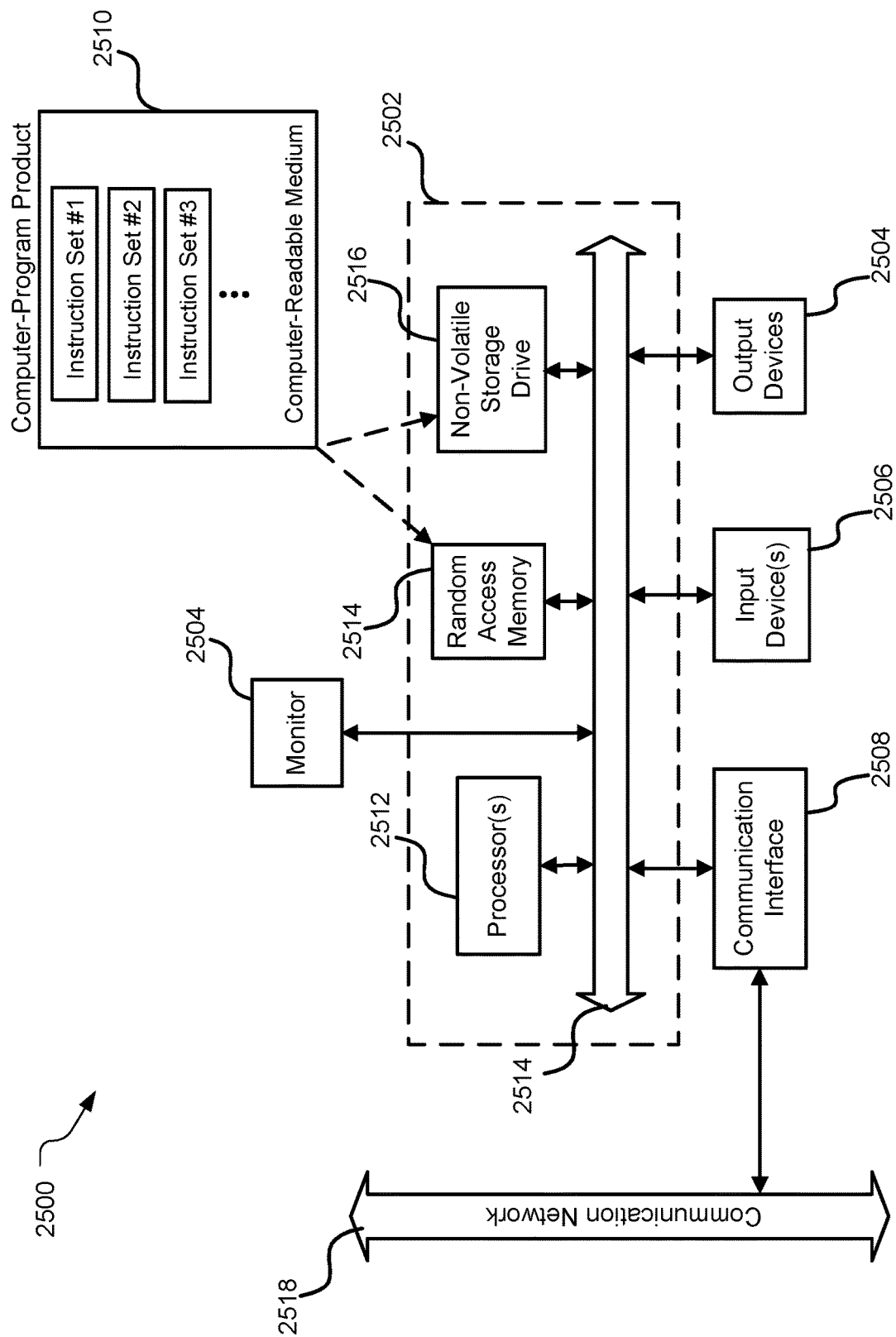
FIG. 35 illustrates a special-purpose computer system according an embodiment.

FIG. 35 illustrates a special-purpose computer system 2500 according an embodiment. Various entities, such as the remote server 102, monitoring device(s) 108, and/or access device(s) 110, described herein may be implemented as such a computer system. The above processes may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof.

Special-purpose computer system 2500 comprises a computer 2502, a monitor 2504 coupled to computer 2502, one or more additional user output devices 2504 (optional) coupled to computer 2502, one or more user input devices 2506 (e.g., keyboard, mouse, track ball, touch screen) coupled to computer 2502, an optional communications interface 2508 coupled to computer 2502, a computer-program product 2510 stored in a tangible computer-readable memory in computer 2502. Computer-program product 2510 directs system 2500 to perform the above-described methods. Computer 2502 may include one or more processors 2512 that communicate with a number of peripheral devices via a bus subsystem 2514. These peripheral devices may include user output device(s) 2504, user input device(s) 2506, communications interface 2508, and a storage subsystem, such as random access memory (RAM) 2514 and non-volatile storage drive 2516 (e.g., disk drive, optical drive, solid state drive), which are forms of tangible computer-readable memory.

Computer-program product 2510 may be stored in non-volatile storage drive 2516 or another computer-readable medium accessible to computer 2502 and loaded into memory 2514. Each processor 2512 may comprise a microprocessor, such as a microprocessor from Intel® or Advanced Micro Devices, Inc.®, or the like. To support computer-program product 2510, the computer 2502 runs an operating system that handles the communications of product 2510 with the above-noted components, as well as the communications between the above-noted components in support of the computer-program product 2510. Exemplary operating systems include Windows® or the like from Microsoft Corporation, Solaris® from Sun Microsystems, LINUX, UNIX, and the like.

User input devices 2506 include all possible types of devices and mechanisms to input information to computer system 2502. These may include a keyboard, a keypad, a mouse, a scanner, a digital drawing pad, a touch screen incorporated into the display, audio input devices such as voice recognition systems, microphones, and other types of input devices. In various embodiments, user input devices 2506 are typically embodied as a computer mouse, a trackball, a track pad, a joystick, wireless remote, a drawing tablet, a voice command system. User input devices 2506 typically allow a user to select objects, icons, text and the like that appear on the monitor 2504 via a command such as a click of a button or the like. User output devices 2504 include all possible types of devices and mechanisms to output information from computer 2502. These may include a display (e.g., monitor 2504), printers, non-visual displays such as audio output devices, etc.

Communications interface 2508 provides an interface to other communication networks 2518 and devices and may serve as an interface to receive data from and transmit data to other systems, WANs and/or the Internet. Embodiments of communications interface 2508 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 2508 may be coupled to a computer network, to a FireWire® bus, or the like. In other embodiments, communications interface 2508 may be physically integrated on the motherboard of computer 2502, and/or may be a software program, or the like.

RAM 2514 and non-volatile storage drive 2516 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 2514 and non-volatile storage drive 2516 may be configured to store the basic programming and data constructs that provide the functionality of various embodiments of the present invention, as described above.

Software instruction sets that provide the functionality of the present invention may be stored in RAM 2514 and non-volatile storage drive 2516. These instruction sets or code may be executed by the processor(s) 2512. RAM 2514 and non-volatile storage drive 2516 may also provide a repository to store data and data structures used in accordance with the present invention. RAM 2514 and non-volatile storage drive 2516 may include a number of memories including a main random access memory (RAM) to store of instructions and data during program execution and a read-only memory (ROM) in which fixed instructions are stored. RAM 2514 and non-volatile storage drive 2516 may include a file storage subsystem providing persistent (non-volatile) storage of program and/or data files. RAM 2514 and non-volatile storage drive 2516 may also include removable storage systems, such as removable flash memory.

Bus subsystem 2514 provides a mechanism to allow the various components and subsystems of computer 2502 communicate with each other as intended. Although bus subsystem 2514 is shown schematically as a single bus, alternative embodiments of the bus subsystem may utilize multiple busses or communication paths within the computer 2502.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Figure 36:
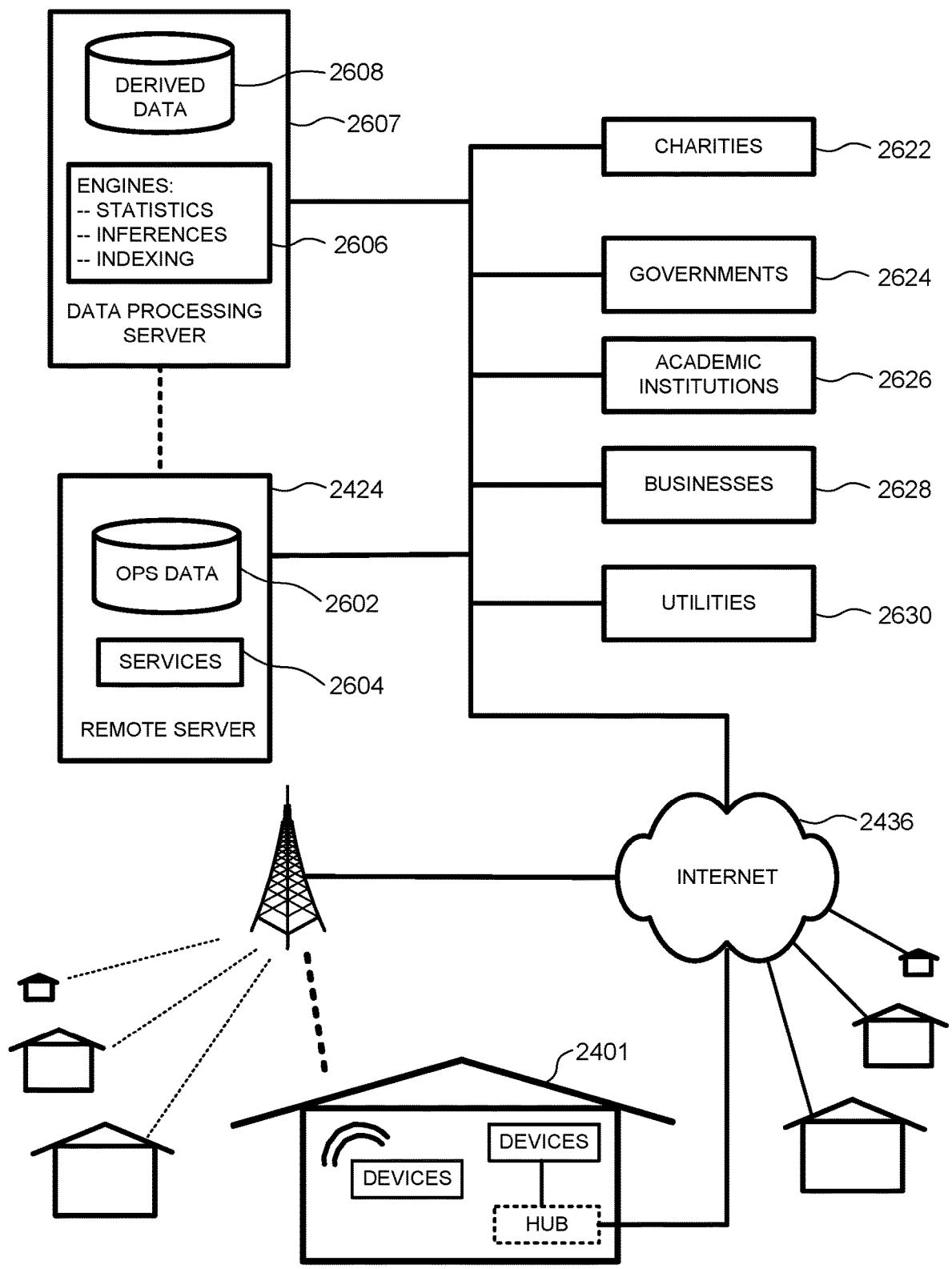
FIG. 36 illustrates a network-level view of an extensible devices and services platform with which a smart home environment can be integrated.

FIG. 36 illustrates a network-level view of an extensible devices and services platform with which the smart home of FIG. 33 can be integrated. Each of the intelligent, network-connected devices discussed with reference to structure 2401 of FIG. 34 can communicate with one or more remote servers or cloud computing system 2424. The communication can be enabled by establishing connection to the Internet 2436 either directly (for example, using 3G/4G connectivity to a wireless carrier), though a hubbed network (which can be scheme ranging from a simple wireless router, for example, up to and including an intelligent, dedicated whole-home control node), or through any combination thereof.

The remote server or cloud-computing system 2424 can collect operation data 2602 from the smart home devices. For example, the devices can routinely transmit operation data or can transmit operation data in specific instances (e.g., when requesting customer support). The remote server or cloud-computing system 2424 can further provide one or more services 2604. The services 2604 can include, e.g., software update, customer support, sensor data collection/logging, remote access, remote or distributed control, or use suggestions (e.g., based on collected operation data 2602 to improve performance, reduce utility cost, etc.). Data associated with the services 2604 can be stored at the remote server or cloud-computing system 2424 and the remote server or cloud-computing system 2424 can retrieve and transmit the data at an appropriate time (e.g., at regular intervals, upon receiving request from a user, etc.).

One salient feature of the described extensible devices and services platform, as illustrated in FIG. 36, is a processing engine 2606, which can be concentrated at a single data processing server 2607 (which may be included in or separate from the remote server 2424) or distributed among several different computing entities without limitation. Processing engine 2606 can include engines configured to receive data from a set of devices (e.g., via the Internet or a hubbed network), to index the data, to analyze the data and/or to generate statistics based on the analysis or as part of the analysis. The analyzed data can be stored as derived data 2608. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the Internet 2436. In this manner, processing engine 2606 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 2606 can generate statistics about device usage across a population of devices and send the statistics to device users, service providers or other entities (e.g., that have requested or may have provided monetary compensation for the statistics). As specific illustrations, statistics can be transmitted to charities 2622, governmental entities 2624 (e.g., the Food and Drug Administration or the Environmental Protection Agency), academic institutions 2626 (e.g., university researchers), businesses 2628 (e.g., providing device warranties or service to related equipment), or utility companies 2630. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 37:
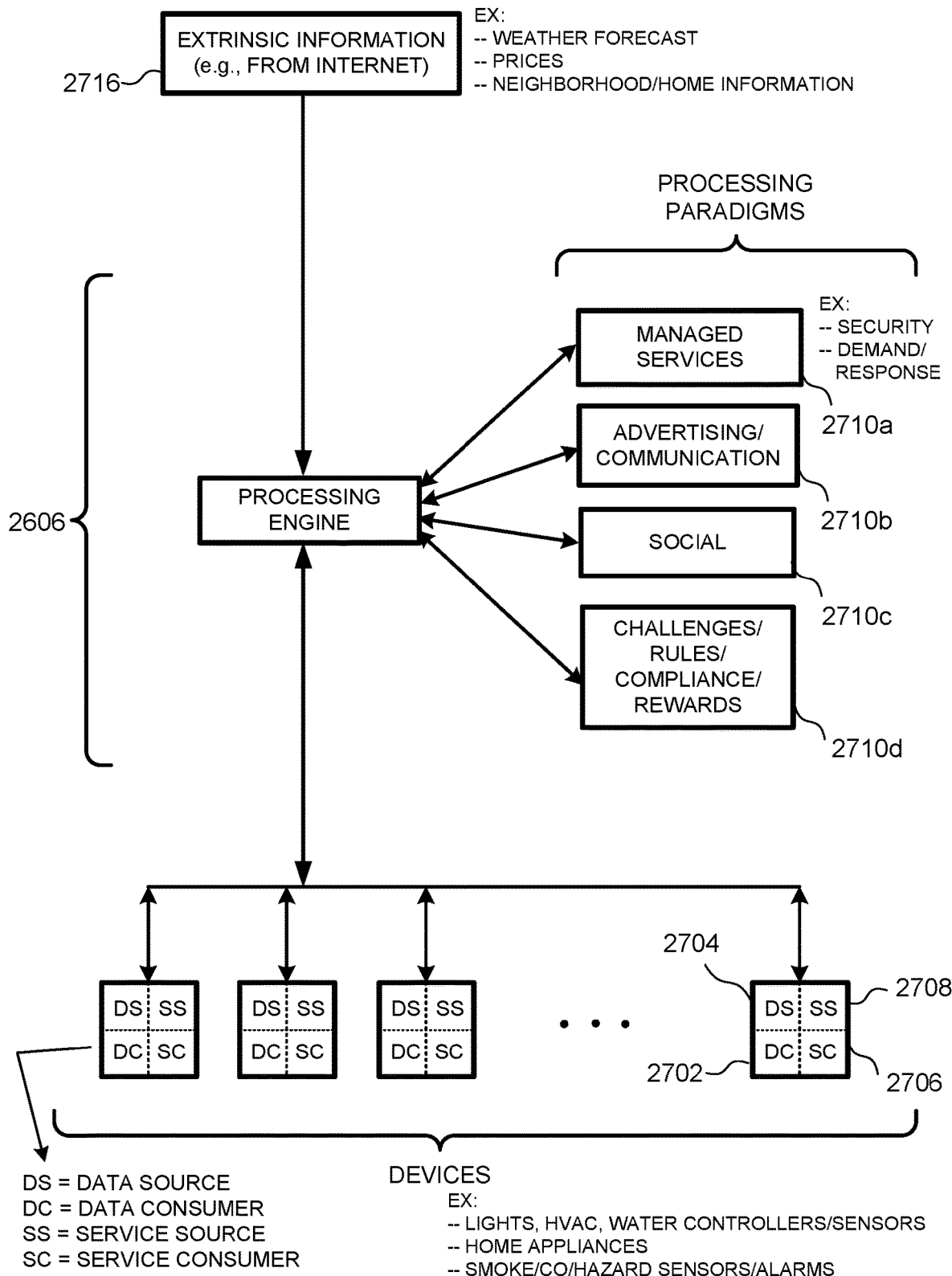
FIG. 37 illustrates an abstracted functional view of the extensible devices and services platform of FIG. 36.

FIG. 37 illustrates an abstracted functional view of the extensible devices and services platform of FIG. 36, with particular reference to the processing engine 2606 as well as the devices of the smart home. Even though the devices situated in the smart home will have an endless variety of different individual capabilities and limitations, they can all be thought of as sharing common characteristics in that each of them is a data consumer 2702 (DC), a data source 2704 (DS), a services consumer 2706 (SC), and a services source 2708 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 37 shows processing engine 2606 as including a number of paradigms 2710. Processing engine 2606 can include a managed services paradigm 2710a that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 2606 can further include an advertising/communication paradigm 2710b that estimates characteristics (e.g., demographic information), desires and/or products of interest of a user based on device usage. Services, promotions, products or upgrades can then be offered or automatically provided to the user. Processing engine 2606 can further include a social paradigm 2710c that uses information from a social network or provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 2606 can include a challenges/rules/compliance/rewards paradigm 2710d that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine can integrate or otherwise utilize extrinsic information 2716 from extrinsic sources to improve the functioning of one or more processing paradigms. Extrinsic information 2716 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also "repurposed" by the processing engine 2606 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

The synchronization/authentication techniques described in the instant patent specification have been found to be particularly desirable when applied in association with many of the smart-home devices described in the instant specification, in that there is an advantageous balance achieved between that which is theoretically achievable versus that which is practical to implement in a cost-effective and customer-friendly manner for everyday home automation and control. Thus, in terms of device synchronization, although the described methods might arguably bring about some degree of latency or some degree of imperfection in "race condition" outcomes (for example, if two smartphones are trying to control the same thermostat at the same time), the described methods are better able to handle and recover from various adverse events, such as home network problems, Wi-Fi interruptions, and the need for some devices (such as energy-buffered power-stealing thermostats) to remain in "sleep" modes for much of the time. Moreover, the methods are advantageously implementable on modest-cost commonly available data service platforms. Likewise, in terms of device authentication, although the described methods might arguably bring about some theoretical vulnerabilities that might result in some unauthorized third party smart devices enjoying the benefits of being serviced by the remote services (but, importantly, no access to sensitive customer data of legitimate customers of the service), the described methods are better able to promote practical, real-world connectivity for new devices and re-connectivity for disconnected devices without extensive manual processes by the users (e.g., entering in MAC addresses, making phone calls to reset passwords, and so forth).

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the present teachings.

What is claimed is:

1. A method of synchronizing a data bucket between a client device and a server, the method comprising:
   receiving, by the server, a request to update a first bucket stored at the server, wherein:
   the first bucket stored at the server corresponds to a second bucket stored at the client device;
   the first bucket comprises a first value and is assigned a first timestamp and a first version identifier; and
   the request comprises a second value and a second version identifier, and the request is associated with a second timestamp;
   determining, by the server, that the second timestamp is more recent than the first timestamp;
   determining, by the server, that the second version identifier matches the first version identifier; and
   after determining that the second timestamp is more recent than the first timestamp and determining that the second version identifier matches the first version identifier:
   replacing, by the server, the first value in the first bucket with the second value from the request;
   assigning, by the server, the second timestamp to the first bucket;
   generating, by the server, a new version identifier;
   assigning, by the server, the new version identifier to the first bucket; and
   sending, by the server, the second timestamp and the new version identifier to the client device.

2. The method of claim 1, wherein the first bucket comprises a plurality of field-value pairs.

3. The method of claim 2, wherein the first value belongs to one of the plurality of field-value pairs, and any remaining ones of the plurality of field-value pairs are not changed by the request.

4. The method of claim 1, wherein determining that the second version identifier matches the first version identifier indicates that contents of the first bucket are currently the same as contents of the second bucket at the client device.

5. The method of claim 1, further comprising generating, by the server, the second timestamp.

6. The method of claim 1, wherein the client device is subscribed through a subscription request to the first bucket at the server.

7. The method of claim 1, further comprising:
   receiving, by the server, a second request to update the first data bucket stored at the server, wherein the second request comprises a third value and a third version identifier, and the second request is associated with a third timestamp;
   determining, by the server, that the second timestamp is more recent than the third timestamp; and
   sending, by the server, contents of the first bucket, the second timestamp, and the new version identifier to the client device after determining that the first timestamp is more recent than the third timestamp.

8. The method of claim 1, further comprising:
   receiving, by the server, a second request to update the first data bucket stored at the server, wherein the second request comprises a third value and a third version identifier, and the second request is associated with a third timestamp;

determining, by the server, that the third timestamp is more recent than the second timestamp;

determining, by the server, that the third version identifier does not match the new version identifier; and after determining that the third timestamp is more recent than the second timestamp and determining that the third version identifier does not match the new version identifier:

replacing, by the server, the second value in the first bucket with the third value from the request;

assigning, by the server, the third timestamp to the first bucket;

generating, by the server, a second new version identifier;

assigning, by the server, the second new version identifier to the first bucket; and sending, by the server, the third timestamp, the second new version identifier, and contents of the first bucket to the client device.

9. The method of claim 8, further comprising determining that a value of an optimistic concurrency flag stored at the server allows the first value in the first bucket to be replaced with the third value from the request.

10. The method of claim 1, further comprising sending, by the server, the second timestamp, the new version identifier, and contents of the first bucket to one or more other client devices that are subscribed to the first bucket.

11. A server for synchronizing a data bucket between a client device and the server, the server comprising:

one or more processors; and one or more memory devices comprising instructions that, when executed by the one or more processors, cause the one or more processors to perform operations comprising:

receiving, by the server, a request to update a first bucket stored at the server, wherein:

the first bucket stored at the server corresponds to a second bucket stored at the client device;

the first bucket comprises a first value and is assigned a first timestamp and a first version identifier; and the request comprises a second value and a second version identifier, and the request is associated with a second timestamp;

determining, by the server, that the second timestamp is more recent than the first timestamp;

determining, by the server, that the second version identifier matches the first version identifier; and after determining that the second timestamp is more recent than the first timestamp and determining that the second version identifier matches the first version identifier:

replacing, by the server, the first value in the first bucket with the second value from the request;

assigning, by the server, the second timestamp to the first bucket;

generating, by the server, a new version identifier;

assigning, by the server, the new version identifier to the first bucket; and sending, by the server, the second timestamp and the new version identifier to the client device.

12. The server of claim 11, wherein the first bucket comprises a plurality of field-value pairs.

13. The server of claim 12, wherein the first value belongs to one of the plurality of field-value pairs, and any remaining ones of the plurality of field-value pairs are not changed by the request.

14. The server of claim 11, wherein determining that the second version identifier matches the first version identifier indicates that contents of the first bucket are currently the same as contents of the second bucket at the client device.

15. The server of claim 11, wherein the operations further comprise generating, by the server, the second timestamp.

16. The server of claim 11, wherein the client device is subscribed through a subscription request to the first bucket at the server.

17. The server of claim 11, further comprising:

receiving, by the server, a second request to update the first data bucket stored at the server, wherein the second request comprises a third value and a third version identifier, and the second request is associated with a third timestamp;

determining, by the server, that the second timestamp is more recent than the third timestamp; and sending, by the server, contents of the first bucket, the second timestamp, and the new version identifier to the client device after determining that the first timestamp is more recent than the third timestamp.

18. The server of claim 11, wherein the operations further comprise:

receiving, by the server, a second request to update the first data bucket stored at the server, wherein the second request comprises a third value and a third version identifier, and the second request is associated with a third timestamp;

determining, by the server, that the third timestamp is more recent than the second timestamp;

determining, by the server, that the third version identifier does not match the new version identifier; and after determining that the third timestamp is more recent than the second timestamp and determining that the third version identifier does not match the new version identifier:

replacing, by the server, the second value in the first bucket with the third value from the request;

assigning, by the server, the third timestamp to the first bucket;

generating, by the server, a second new version identifier;

assigning, by the server, the second new version identifier to the first bucket; and sending, by the server, the third timestamp, the second new version identifier, and contents of the first bucket to the client device.

19. The server of claim 18, wherein the operations further comprise determining that a value of an optimistic concurrency flag stored at the server allows the first value in the first bucket to be replaced with the third value from the request.

20. The server of claim 11, wherein the operations further comprise sending, by the server, the second timestamp, the new version identifier, and contents of the first bucket to one or more other client devices that are subscribed to the first bucket.

* * * * *